United States Patent
Kitada

(10) Patent No.: US 9,722,942 B2
(45) Date of Patent: Aug. 1, 2017

(54) COMMUNICATION DEVICE AND PACKET SCHEDULING METHOD

(71) Applicant: FUJITSU LIMITED, Kawasaki-shi, Kanagawa (JP)

(72) Inventor: Atsushi Kitada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 124 days.

(21) Appl. No.: 14/141,975

(22) Filed: Dec. 27, 2013

(65) Prior Publication Data

US 2014/0286349 A1 Sep. 25, 2014

(30) Foreign Application Priority Data

Mar. 21, 2013 (JP) .................................. 2013-059050

(51) Int. Cl.
*H04L 12/863* (2013.01)
*H04L 12/873* (2013.01)
*H04L 12/851* (2013.01)

(52) U.S. Cl.
CPC ........ *H04L 47/6215* (2013.01); *H04L 47/527* (2013.01); *H04L 47/24* (2013.01)

(58) Field of Classification Search
None
See application file for complete search history.

(56) References Cited

U.S. PATENT DOCUMENTS

| 5,063,562 A | 11/1991 | Barzilai et al. |
| 6,754,215 B1 * | 6/2004 | Arikawa ............. H04L 12/5601 370/395.4 |
| 7,990,858 B2 | 8/2011 | Iny |
| 9,015,019 B1 * | 4/2015 | Kim ..................... H04W 16/22 703/13 |

(Continued)

FOREIGN PATENT DOCUMENTS

| JP | 7-74780 | 3/1995 |
| JP | 2000-295281 | 10/2000 |

(Continued)

OTHER PUBLICATIONS

Office Action issued by the U.S. Patent and Trademark Office on Sep. 1, 2015 in U.S. Appl. No. 14/100,327.

(Continued)

*Primary Examiner* — Vinncelas Louis
(74) *Attorney, Agent, or Firm* — Staas & Halsey LLP

(57) ABSTRACT

A communication device, includes: a plurality of queues each configured to accumulate a packet; a scheduler configured to provide a permissible readout amount to each of the plurality of queues in accordance with an order that is based on a priority of each queue; a read processor configured to read out the packet from the plurality of queues, the permissible readout amount being consumed according to amount of the packets read out; and an accumulation amount counter configured to count an accumulation amount of the packets accumulated in each of the plurality of queues, wherein the accumulation amount counter notifies the sched- (Continued)

uler of a change in the accumulation amount, and wherein the scheduler adjusts the priority of, among the plurality of queues, the queue of which the accumulation amount has changed, in response to the notification from the accumulation amount counter.

1 Claim, 44 Drawing Sheets

(56) References Cited

U.S. PATENT DOCUMENTS

| | | | | |
|---|---|---|---|---|
| 2005/0047425 | A1* | 3/2005 | Liu | H04L 12/5693 |
| | | | | 370/411 |
| 2005/0141424 | A1* | 6/2005 | Lim | H04L 12/5693 |
| | | | | 370/235 |
| 2005/0243853 | A1* | 11/2005 | Bitar | H04L 12/5693 |
| | | | | 370/432 |
| 2007/0121499 | A1* | 5/2007 | Pal | H04L 45/60 |
| | | | | 370/230 |
| 2008/0219165 | A1* | 9/2008 | Kusumoto | H04L 12/5693 |
| | | | | 370/235 |
| 2009/0296729 | A1 | 12/2009 | Urano et al. | |

FOREIGN PATENT DOCUMENTS

| | | |
|---|---|---|
| JP | 2001-223740 | 8/2001 |
| JP | 2005-33408 | 2/2005 |
| JP | 2005-286383 | 10/2005 |
| JP | 2009-290633 | 12/2009 |
| JP | 2011-166342 | 8/2011 |

OTHER PUBLICATIONS

Office Action issued by the U.S. Patent and Trademark Office on Feb. 25, 2016 in U.S. Appl. No. 14/100,327.
Office Action issued by the Japanese Patent Office on Jul. 26, 2016 in corresponding Japanese patent application No. 2013-001557.
Office Action issued by the U.S. Patent and Trademark Office on Sep. 8, 2016 in U.S. Appl. No. 14/100,327.
Office Action issued by the Japanese Patent Office on Oct. 4, 2016 in corresponding Japanese patent application No. 2013-059050.

\* cited by examiner

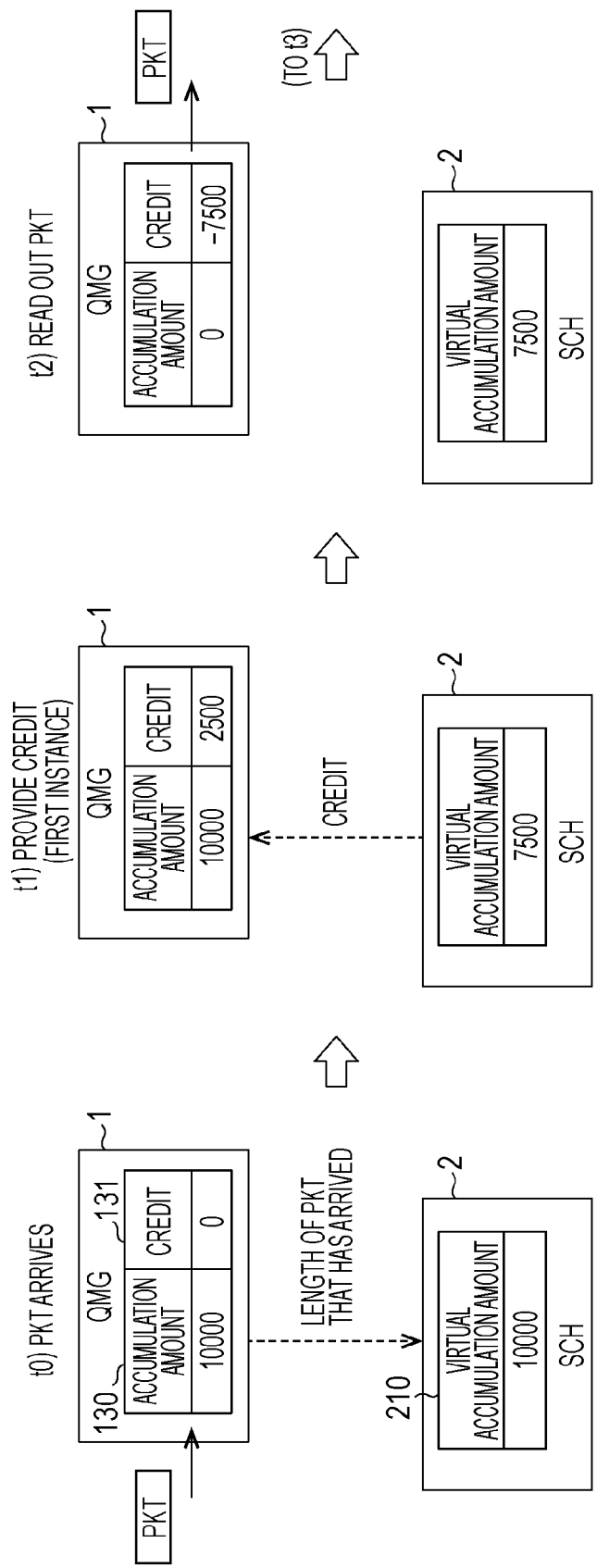

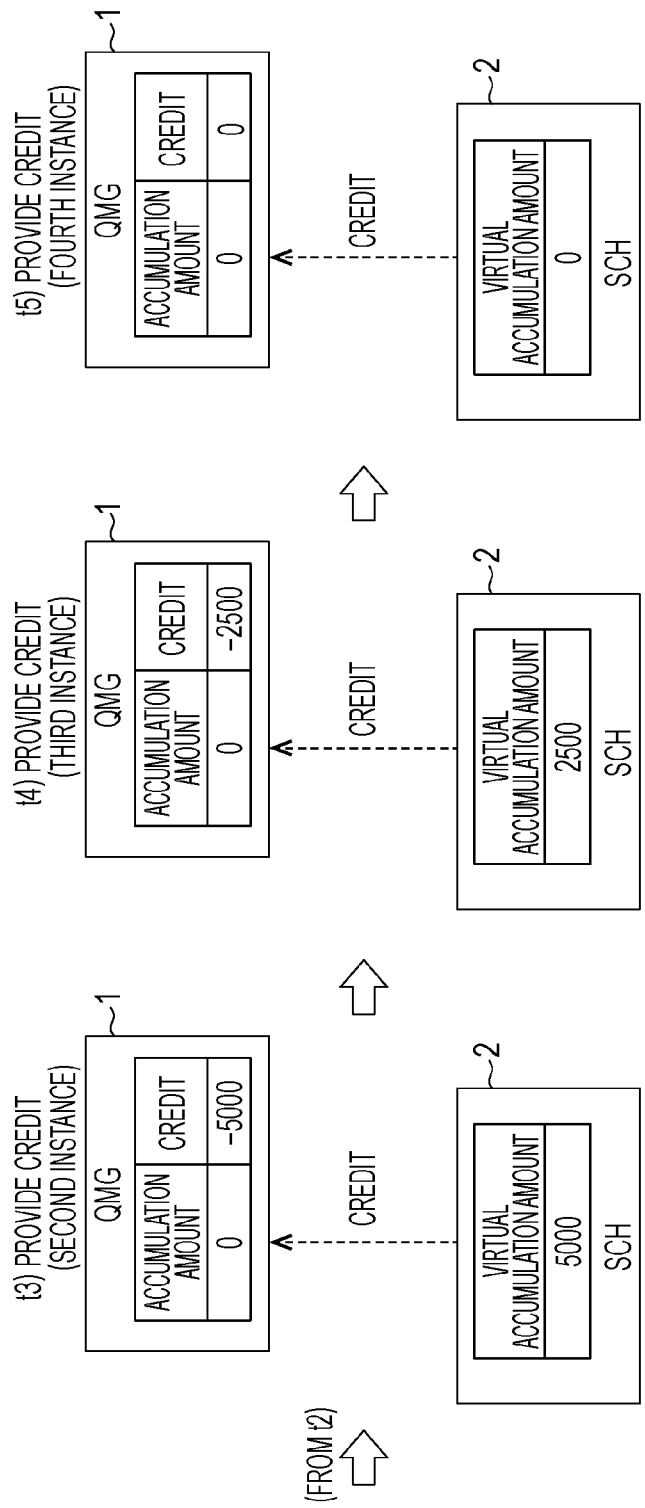

FIG. 10

| ORDER | FLOW ID | VIRTUAL ACCUMULATION AMOUNT [Byte] |
|---|---|---|
| 1 | 0 | 10001 → 7501 |
| 2 | 1 | 8000 → 5500 |
| 3 | N | 200 → −2300 |
| 4 | 1 | 5500 → 3000 |
| 5 | 1 | 3000 → 500 |
| 6 | 1 | 500 → −2000 |
| 7 | 0 | 7501 → 5001 |
| 8 | 0 | 5001 → 2501 |
| 9 | 0 | 2501 → 1 |
| 10 | 0 | 1 → −2499 |

FIG. 11

| ORDER | FLOW ID | VIRTUAL ACCUMULATION AMOUNT [Byte] |
|---|---|---|
| 1 | 0 | 10001 → 7501 |
| 2 | 1 | 8000 → 5500 |
| 3 | N | 200 → −2300 |
| 4 | 0 | 7501 → 5001 |
| 5 | 1 | 5500 → 3000 |
| 6 | 0 | 5001 → 2501 |
| 7 | 1 | 3000 → 500 |
| 8 | 0 | 2501 → 1 |
| 9 | 1 | 500 → −2000 |
| 10 | 0 | 1 → −2499 |

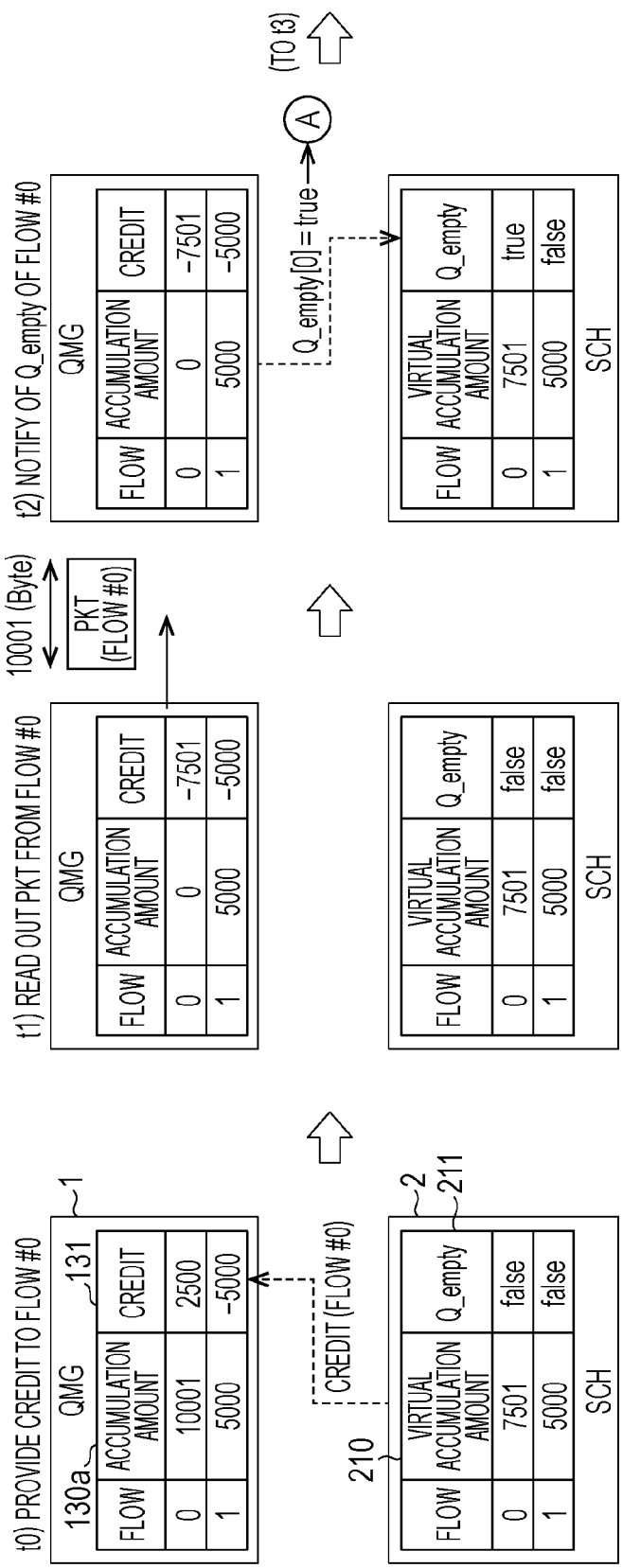

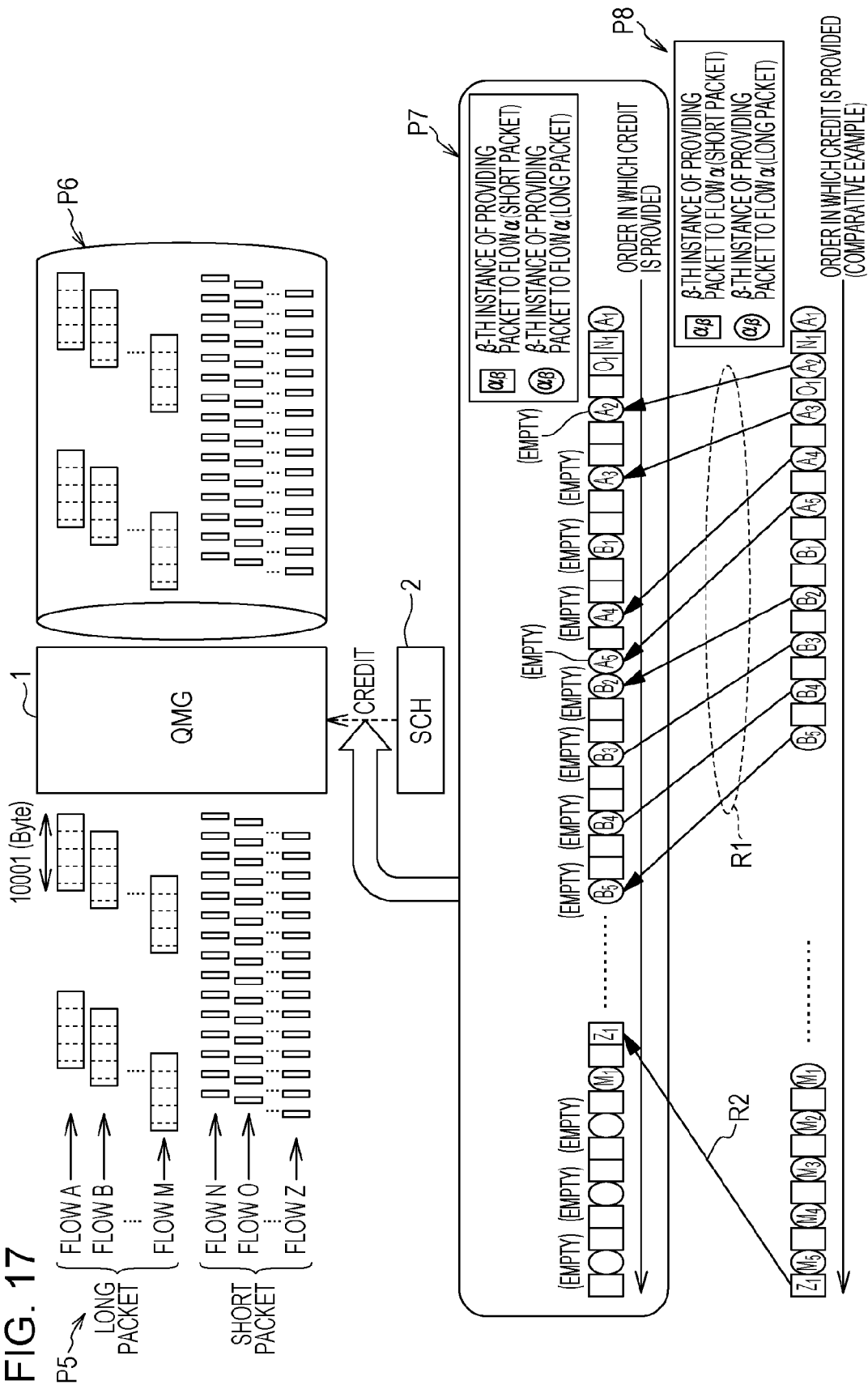

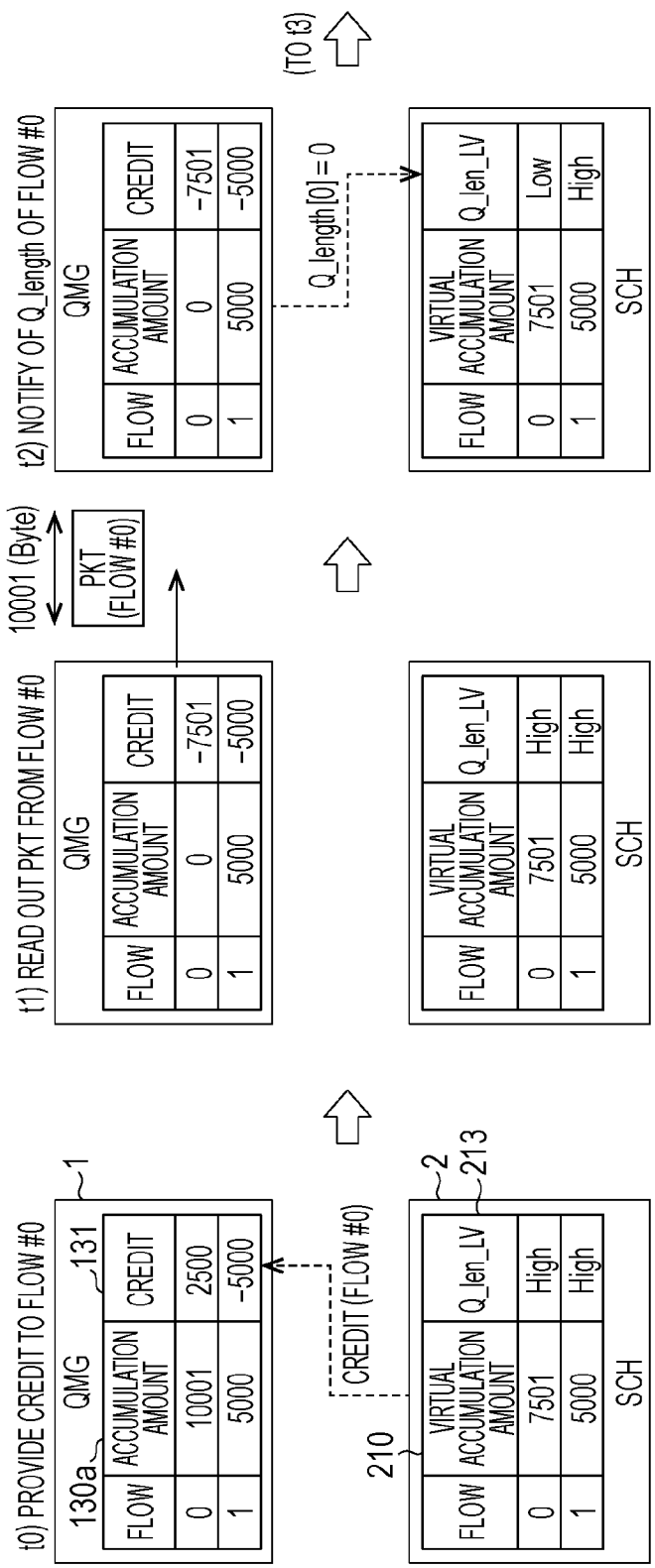

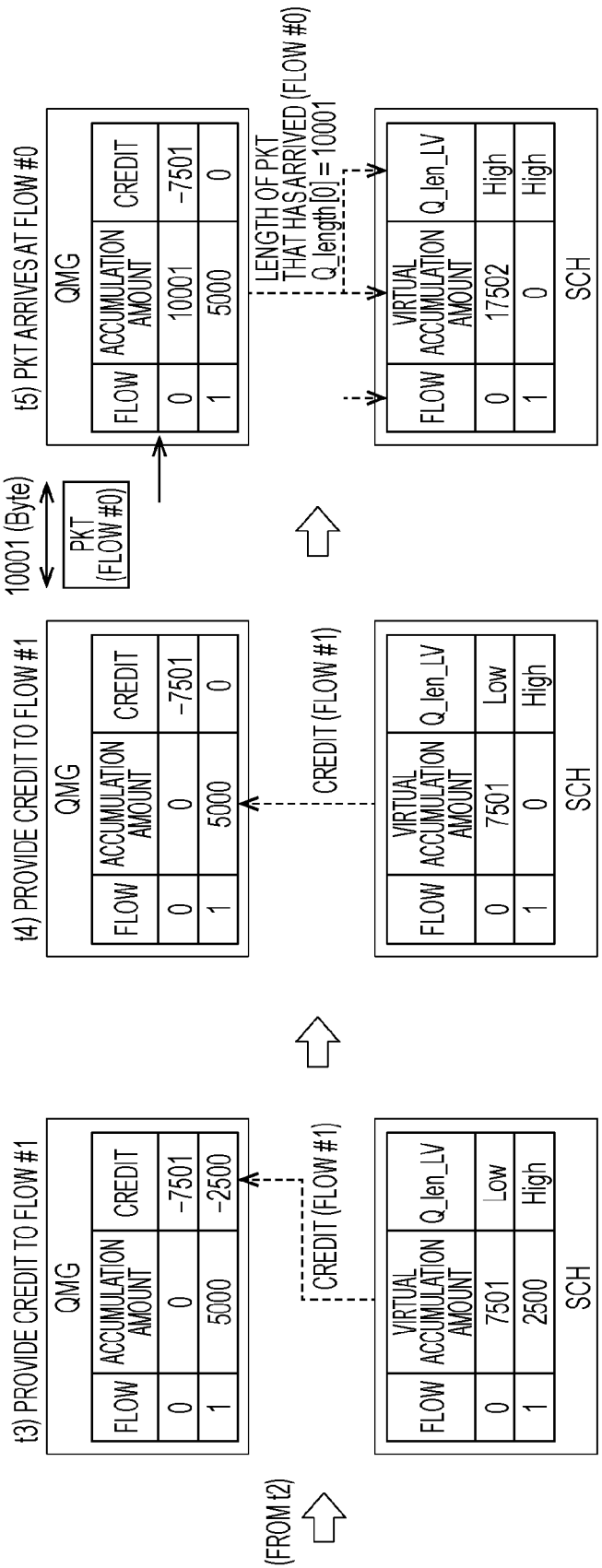

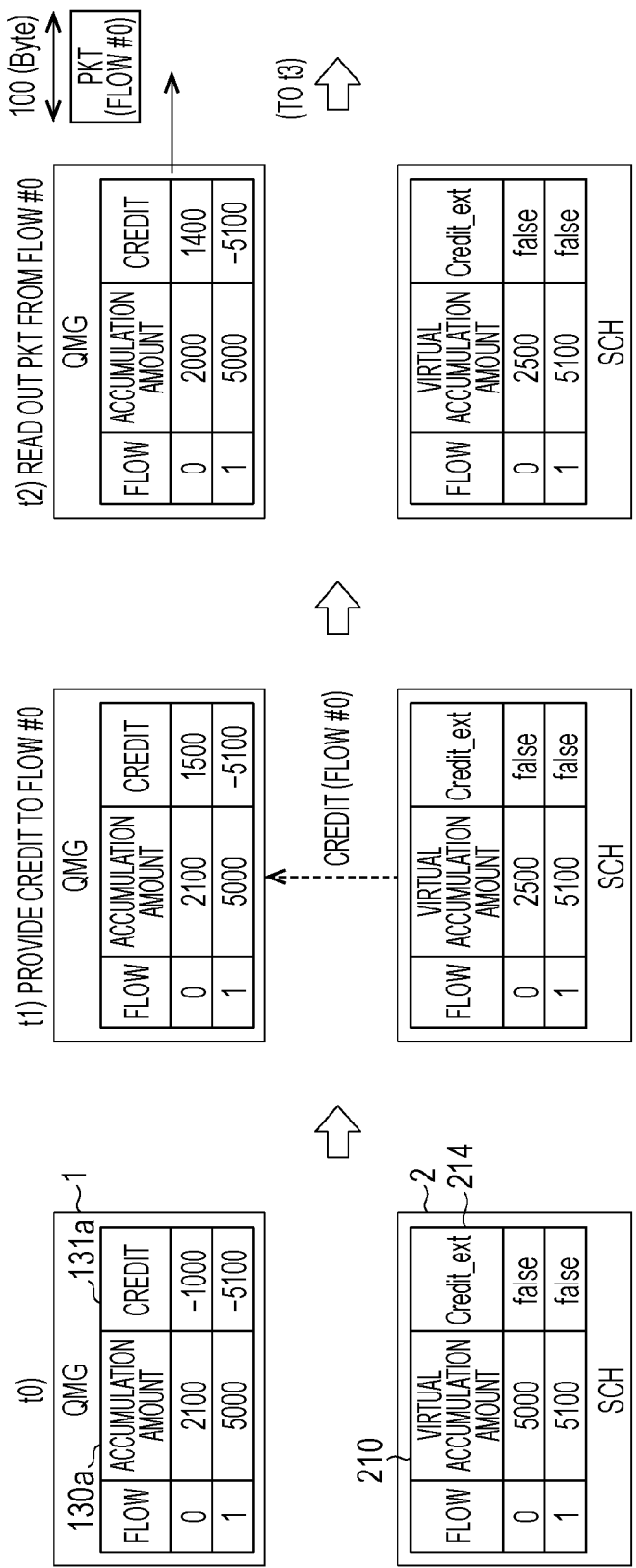

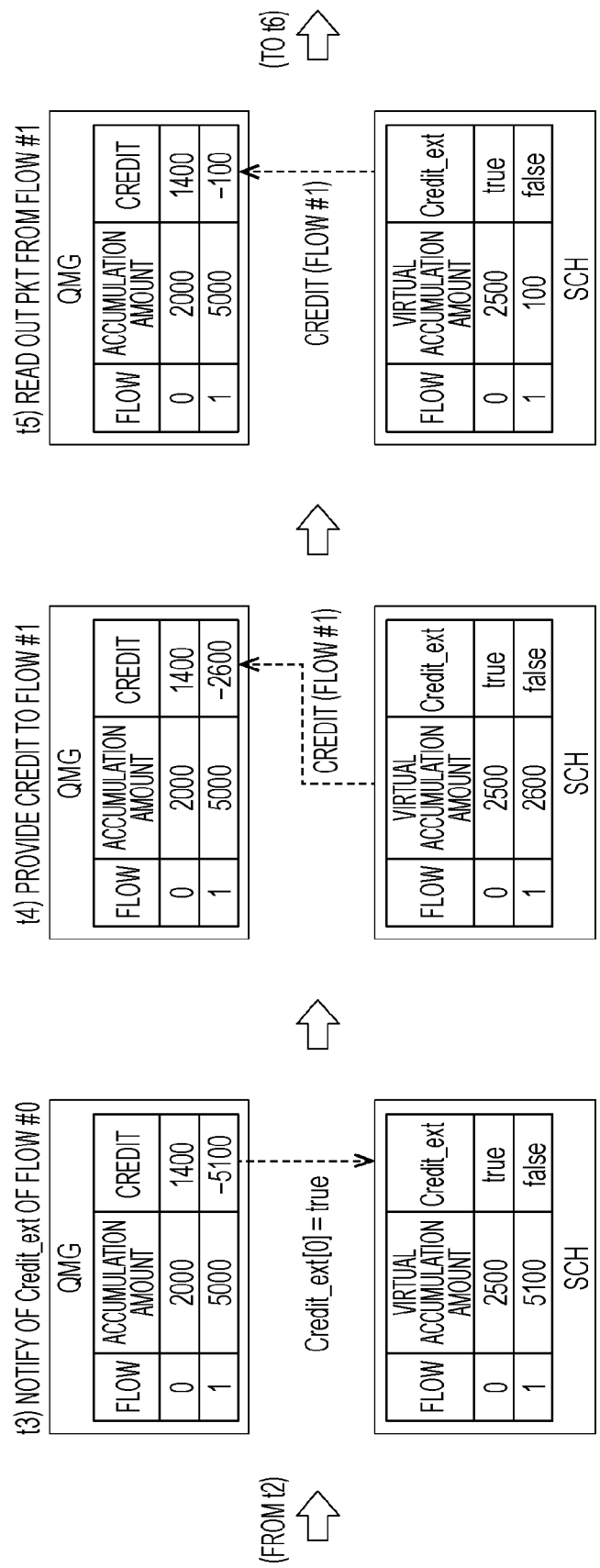

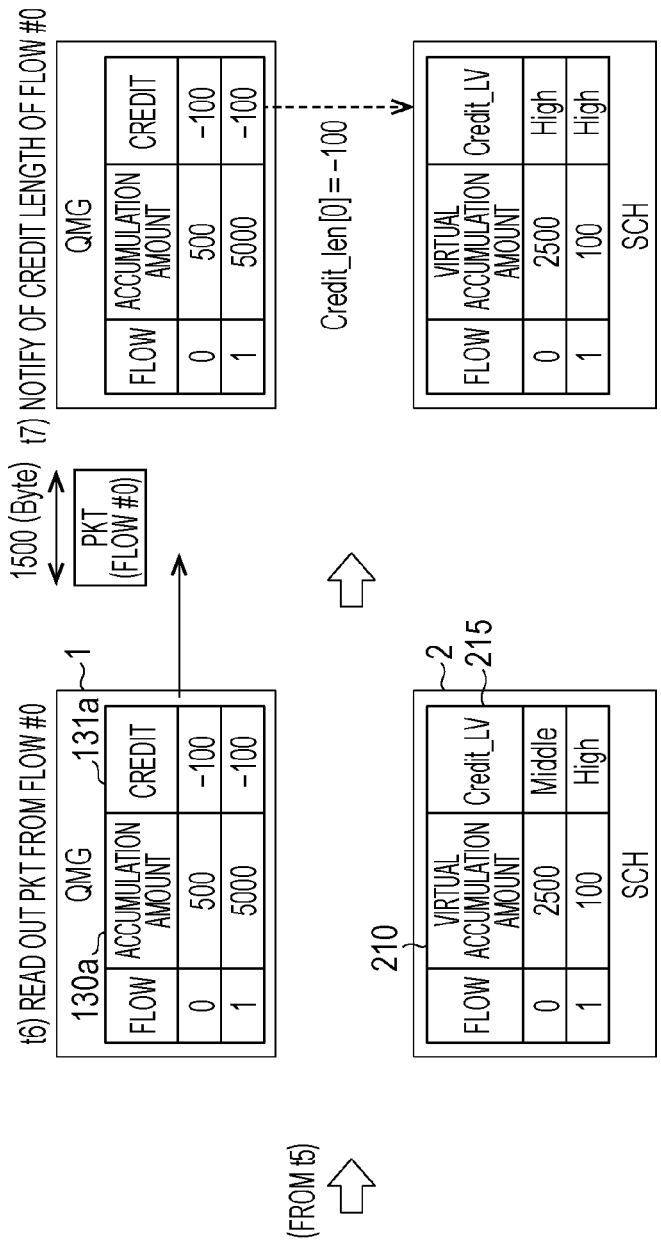

COMMUNICATION DEVICE AND PACKET SCHEDULING METHOD

CROSS-REFERENCE TO RELATED APPLICATION

This application is based upon and claims the benefit of priority of the prior Japanese Patent Application No. 2013-059050, filed on Mar. 21, 2013, the entire contents of which are incorporated herein by reference.

FIELD

The embodiments discussed herein are related to a communication device and a packet scheduling method.

BACKGROUND

With an increase in telecommunication demands, improved throughput of switching devices such as a layer 2 switch and a router, or in other words, improved throughput of packet switching devices that switch packets is expected. In order to improve the throughput, improvement in the scheduling function of managing traffic by controlling readout of packets from queues is being discussed.

For example, Japanese Laid-open Patent Publication No. 2001-223740 discusses that a proper grading is set on the basis of statistical observation information in a deficit round robin (DRR) method. Japanese Laid-open Patent Publication No. 2005-33408 discusses that the precision in a band of an algorithm that maintains band control is maintained in a case where data is read out from a queue that is selected through a different algorithm.

Japanese Laid-open Patent Publication No. 2005-286383 discusses that the processing time for accessing an external memory is reduced by scheduling packets in units of fixed segment lengths in each queue that store packets. U.S. Pat. No. 7,990,858 discusses that in a configuration in which an input controller and an output band controller are interconnected through fabric, the input controller outputs packets to the output band controller through the fabric on the basis of credits obtained from the output band controller in response to a request.

SUMMARY

According to an aspect of the invention, a communication device, includes: a plurality of queues each configured to accumulate a packet; a scheduler configured to provide a permissible readout amount to each of the plurality of queues in accordance with an order that is based on a priority of each queue; a read processor configured to read out the packet from the plurality of queues, the permissible readout amount being consumed according to amount of the packets read out; and an accumulation amount counter configured to count an accumulation amount of the packets accumulated in each of the plurality of queues, wherein the accumulation amount counter notifies the scheduler of a change in the accumulation amount, and wherein the scheduler adjusts the priority of, among the plurality of queues, the queue of which the accumulation amount has changed, in response to the notification from the accumulation amount counter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A illustrates an exemplary operation of the output processor when a packet of 10000 (bytes) arrives (part 1);

FIG. 5B illustrates an exemplary operation of the output processor when a packet of 10000 (bytes) arrives (part 2);

FIG. 10 is a table illustrating an order in which credits are provided;

FIG. 11 is a table illustrating an order in which credits are provided;

FIG. 16A illustrates an exemplary operation in the first embodiment (part 1);

FIG. 17 illustrates exemplary timings at which packets are inputted/outputted and an exemplary order in which credits are provided in an embodiment;

FIG. 21A illustrates an exemplary operation in a second embodiment (part 1);

FIG. 21B illustrates an exemplary operation in a second embodiment (part 2);

FIG. 26A illustrates an exemplary operation in the third embodiment (Part 1);

FIG. 26B illustrates an exemplary operation in the third embodiment (Part 2);

FIG. 30C illustrates an exemplary operation in the fourth embodiment (Part 3);

DESCRIPTION OF EMBODIMENTS

Figure 1:
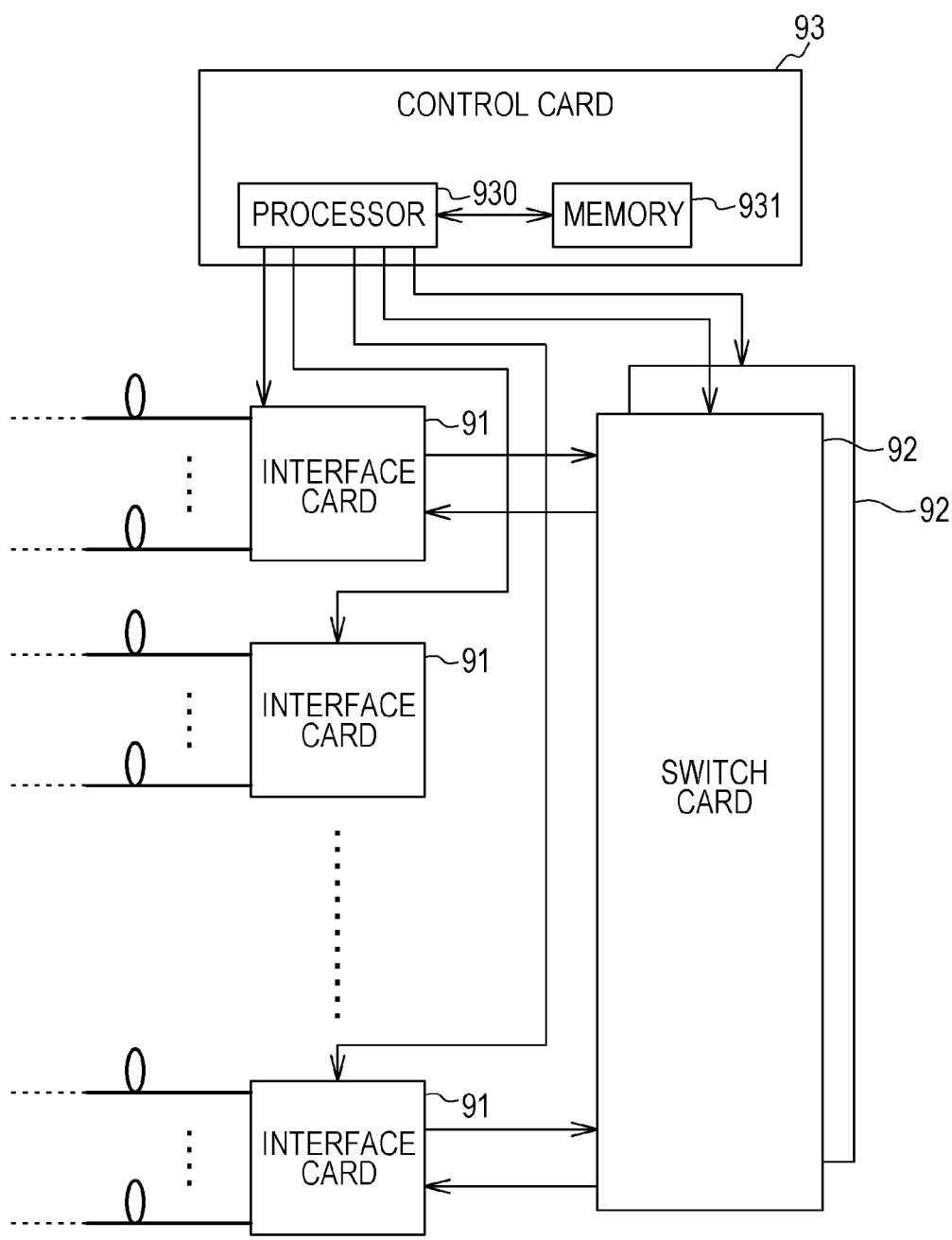
FIG. 1 is a configuration diagram illustrating a functional configuration of a communication device according to an embodiment.

In a case where, each time a single packet is read out from a queue, a subsequent packet to be read out is selected through scheduling, the time allowed for the scheduling processing is constrained by the time spent on the packet readout processing. Thus, the time allowed for the scheduling processing depends on the length (i.e., data amount) of a packet being read out if the packet length varies as in, for example, Ethernet (registered trademark, hereinafter, the same) frames.

For example, if the communication speed is 100 (Gbps), the time allowed for the scheduling processing is approximately 121 (ns) if the packet length is 1500 (bytes), whereas the time allowed for the scheduling processing is approximately 6.7 (ns) if the packet length is 64 (bytes). In other words, when short packets are to be read out successively, the time allowed for the scheduling processing is limited to a relatively short period of time, and thus high processing performance is demanded in the scheduling processing.

If, for example, only short packets are to be read out, the processing speed of approximately 148.8 (Mbps) is demanded in the scheduling processing. In such a case, if the operation frequency of processing packets is 300 (MHz), a single short packet is processed in two clocks (i.e., 300 (MHz)/2=150 (Mbps) 148.8 (Mbps)). The demanded processing speed increases further if the number of queues is large or if a complex algorithm is used for scheduling.

On the other hand, if packets are handled as burst-like traffic so that multiple packets can be read out successively and if the scheduling processing is carried out not in units of single packets but in units of predetermined data amounts, the constraint on the time allowed for the scheduling processing is alleviated. For example, if the scheduling processing is carried out in units of 2500 (bytes), setting the operation frequency to 300 (MHz) leads to achieving the throughput of 100 (Gbps) (=2500 (bytes)/200 (ns)) in the processing time of 60 clocks (200 (ns)). In other words, this method for scheduling packets in units of burst data makes it possible to alleviate the constraint on the time allowed for the scheduling processing.

In this method, a given data amount is provided to each queue in the form of a permissible readout amount, which indicates a data amount of packets that can be read out, so that the given amount of data is read out at a time from each queue. If the permissible readout amount held in a queue is greater than 0, packets accumulated in the queue are read out and the permissible readout amount is consumed accordingly.

When such control using the permissible readout amount is carried out, scheduling processing for selecting a queue to which a permissible readout amount is to be provided is carried out separately from scheduling processing for selecting a queue from which a packet is to be read out. Here, if permissible readout amounts are not provided to the queues in an appropriate order of priority, a delay may be generated in the readout of packets.

For example, if a permissible readout amount is provided to a queue in which packets are not accumulated preferentially over a queue in which packets are accumulated, the accumulated packets have to stand by until a permissible readout amount is provided to the corresponding queue, and thus a delay is generated. Note that such a problem is present not only in the Ethernet frames but also in other packets such as Internet Protocol (IP) packets. In addition, such a problem is present not only in packet switching devices but also in other communication devices such as a wavelength division multiplexing transmission device.

Hereinafter, a communication device and a packet scheduling method that reduce a packet delay will be described with reference to the drawings.

FIG. 1 is a configuration diagram illustrating a functional configuration of a communication device according to an embodiment. The communication device includes a plurality of network interface cards 91, two switch cards 92, and a control card 93. The network interface cards 91, the switch cards 92, and the control card 93 are each housed in an individual slot provided in a housing and are electrically connected to one another. Note that although a packet switching device such as a layer 2 switch and a router is illustrated as an example of the communication device herein, the embodiments are not limited thereto.

The communication device relays a packet received from an external device to another external device in accordance with the destination address of the packet. A packet herein refers to a unit of data (information) to be transmitted, and an Ethernet frame can be an example of a packet. The embodiments, however, are not limited thereto, and a packet may refer to other frames such as an IP packet.

Each of the network interface cards 91 transmits and receives packets to and from an external device. The external device may, for example, be a terminal device such as a personal computer, a server device, or a router. The network interface cards 91 are connected to optical fibers through a plurality of ports and carry out communication through, for example, the 1000Base-SX standard.

Each of the two switch cards 92 exchanges packets among the plurality of network interface cards 91. To be more specific, one of the switch cards 92 receives a packet from one of the network interface cards 91 and outputs that packet to another network interface card 91 corresponding to the destination address of that packet. The two switch cards 92 are used for an operation system and a backup system, respectively, in case of a fault such as a hardware failure.

The control card 93 controls the plurality of network interface cards 91 and the two switch cards 92. The control card 93 is connected to a network control device or the like and carries out processing related to a user interface, processing for configuring each of the network interface cards 91 and the switch cards 92, processing for collecting information from each of the network interface cards 91 and the switch cards 92, and so on. The control card 93 includes a processor 930 such as a central processing unit (CPU) for carrying out the above processes and a memory 931.

Figure 2:
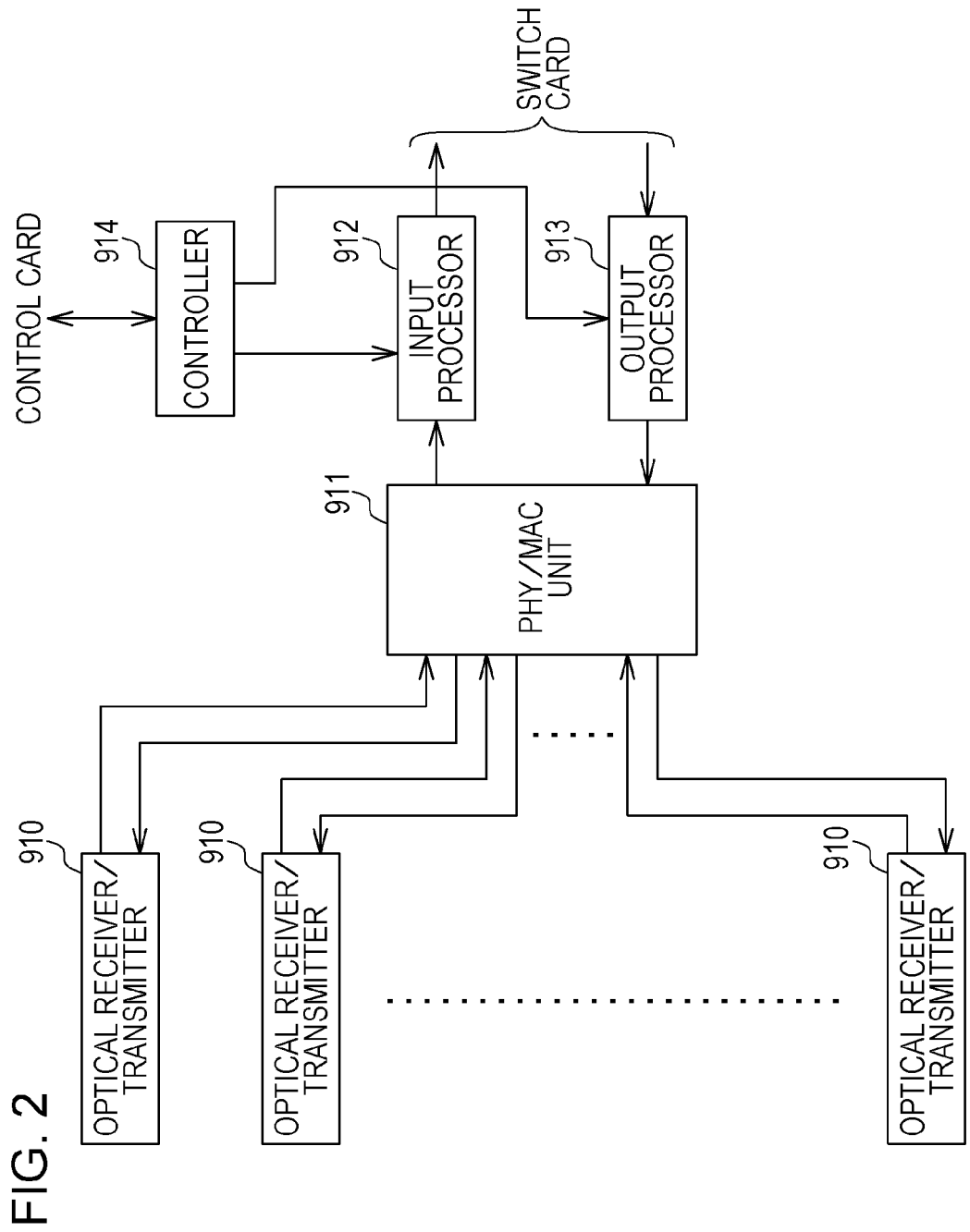
FIG. 2 is a configuration diagram illustrating a functional configuration of a network interface card.

FIG. 2 is a configuration diagram illustrating the functional configuration of the network interface card 91. The network interface card 91 includes a plurality of optical receivers/transmitters 910, a PHY/MAC unit 911, an input processor 912, an output processor 913, and a controller 914.

Each of the optical receivers/transmitters 910 converts an optical signal received from an external device through an optical fiber to an electrical signal and outputs the electrical signal to the PHY/MAC unit 911. In addition, each of the optical receivers/transmitters 910 converts an electrical signal inputted from the PHY/MAC unit 911 to an optical signal and outputs the optical signal to the external device through an optical fiber. In other words, the plurality of optical receivers/transmitters 910 function as ports for transmitting and receiving packets to and from the external device.

The PHY/MAC unit 911 carries out processing for establishing a link to the external device, processing for distributing packets among the plurality of optical receivers/transmitters 910, and so on. The PHY/MAC unit 911 outputs packets inputted from the plurality of optical receivers/transmitters 910 to the input processor 912 and outputs packets inputted from the output processor 913 to the plurality of optical receivers/transmitters 910.

The input processor 912 and the output processor 913 carry out ingress packet processing and egress packet processing, respectively. The input processor 912 carries out band control processing on a packet and outputs the packet to the switch card 92. The output processor 913 carries out band control processing on a packet inputted from the switch card 92 and outputs the packet to the PHY/MAC unit 911.

The controller 914 communicates with the control card 93 and controls the input processor 912 and the output processor 913. The controller 914 includes a processor (not illustrated) such as a CPU and a memory (not illustrated).

Figure 3:
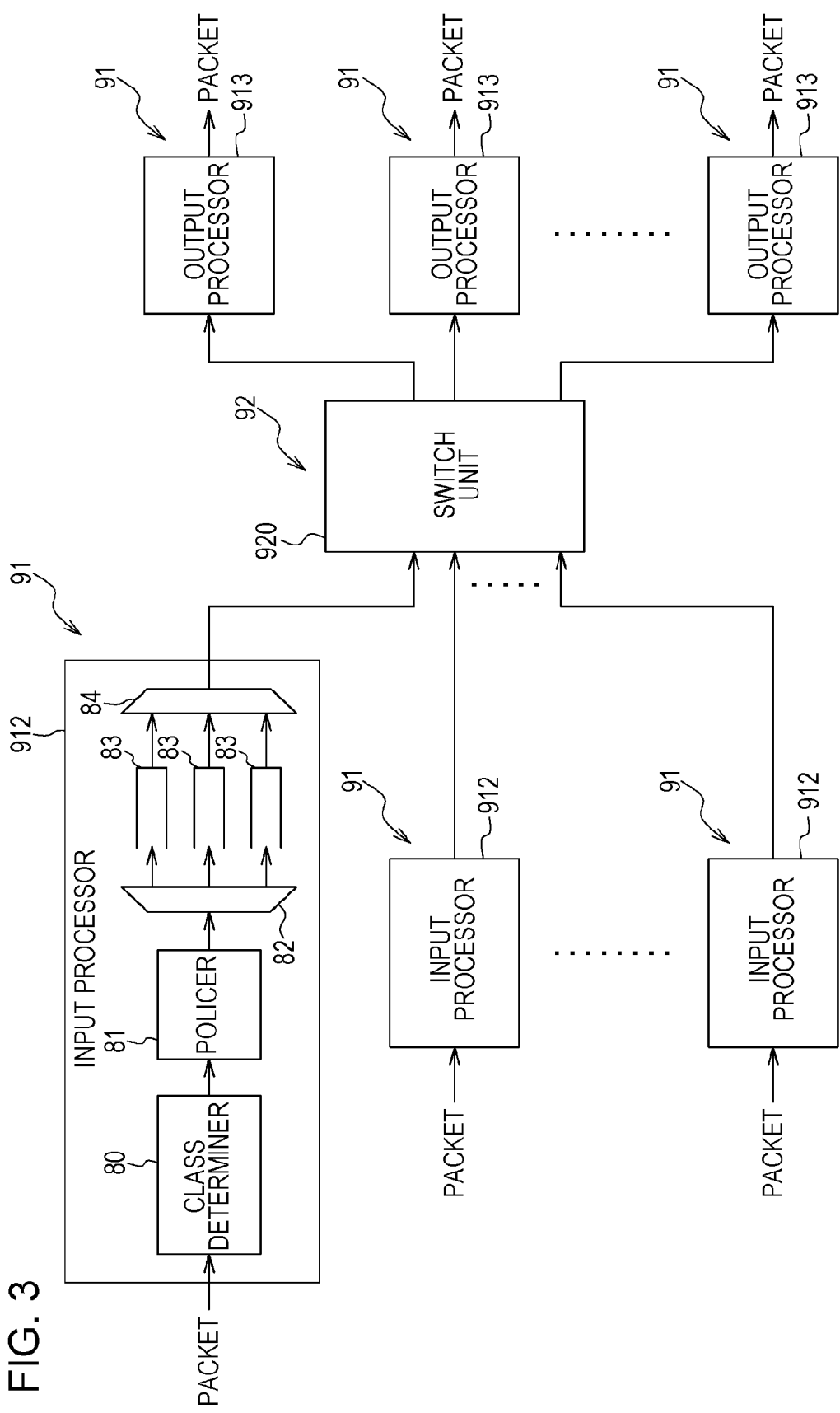
FIG. 3 illustrates a packet path in the communication device.

FIG. 3 illustrates a packet path in the communication device. Note that FIG. 3 illustrates the configuration of the input processor 912 as well.

A packet is first inputted to the input processor 912 of the network interface card 91. The input processor 912 includes a class determiner 80, a policer 81, a distribution unit 82, a plurality of input queues 83, and an output unit 84.

The class determiner 80 determines the class of communication quality (quality of service (QoS)) on a packet-by-packet basis and appends a flow ID corresponding to the determined class to a packet by, for example, embedding the flow ID into a device header. The class determiner 80, for example, determines the class on the basis of the destination address (DA) included in the header of the packet or on the basis of a virtual local area network (VLAN) ID.

The policer 81 discards packets of an amount that exceeds a predetermined band so that the traffic of inputted packets does not exceed the predetermined band. The distribution unit 82 distributes packets among the plurality of input queues 83 in accordance with the designated network interface cards 91. In other words, the input queues 83 are provided for the respective network interface cards 91 corresponding to the DA. The plurality of input queues 83 accumulate packets until the packets are read out by the output unit 84. The output unit 84 selects one of the input queues 83 and reads out a packet from the selected input queue 83. The output unit 84 then outputs the packet to a switch unit 920 of the switch card 92. The switch unit 920 outputs the inputted packet to the output processor 913 of the network interface card 91 corresponding to the destination address of the packet.

Figure 4:
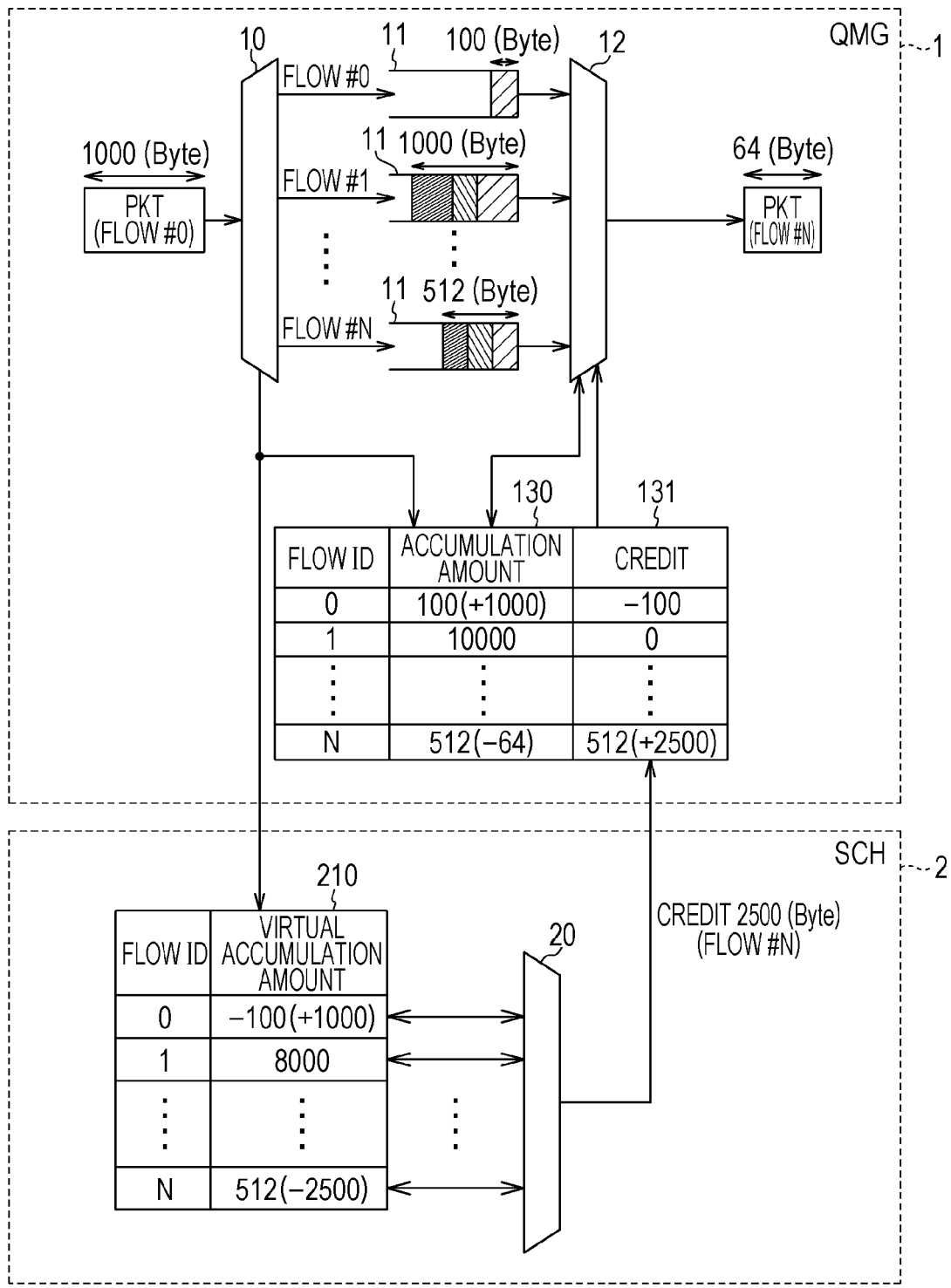
FIG. 4 is a configuration diagram illustrating a functional configuration of an output processor.

FIG. 4 is a configuration diagram illustrating a functional configuration of an output processor 913. The output processor 913 includes a queue manager (QMG) 1 and a scheduler (SCH) 2.

The queue manager 1 includes a distribution unit 10, a plurality of queues 11, a read processor 12, an accumulation amount counter 130, and a credit counter 131. The queue manager 1 manages the accumulation amount of packets accumulated in each of the queues 11 and controls readout of packets on the basis of credits provided to each of the queues 11 from the scheduler 2, or in other words, on the basis of a permissible readout amount that indicates a data amount of packets that can be read out.

The distribution unit 10 distributes packets (refer to "PKT" in FIG. 4) received from the switch card 92 among the plurality of queues 11 in accordance with the flow IDs. In the example illustrated in FIG. 4, a packet of a flow #0 (flow ID) arrives at the distribution unit 10 and is inputted to the queue 11 of the flow #0. Each time a packet arrives at the distribution unit 10, the distribution unit 10 notifies the scheduler 2 of the packet length of that packet, or in other words, the data amount of that packet.

Each of the queues 11 accumulates packets inputted from the distribution unit 10. The queues 11 are provided for the flow IDs (flows #0 to #N (N is a natural number)), respectively, and the number N of the flows is not limited.

The read processor 12 consumes credits (permissible readout amount) when reading out packets from the plurality of queues 11. The read processor 12 selects, of the queues 11 that each have a credit greater than 0 (bytes) among the plurality of queues 11, a queue 11 from which a packet is to be read out. In the example illustrated in FIG. 4, the read processor 12 reads out a packet of 64 (bytes) from the queue 11 of the flow #N in which packets of 512 (bytes) have been accumulated.

The accumulation amount counter 130 counts the amount of accumulated packets in each of the queues 11 (i.e., for each of the flows #0 to #N). When a packet is inputted to one of the queues 11 or when the read processor 12 reads out a packet from one of the queues 11, the accumulation amount counter 130 updates the accumulation amount of the corresponding queue 11.

In the example illustrated in FIG. 4, packets of 100 (bytes) are already accumulated in the queue 11 of the flow #0, and when packets of 1000 (bytes) arrive at the distribution unit 10, the accumulation amount of the queue 11 of the flow #0 becomes 1100 (bytes). Meanwhile, the accumulation amount of the queue 11 of the flow #2 is 10000 (bytes). The accumulation amount of the queue 11 of the flow #N becomes 448 (bytes) (=512−64) when a packet of 64 (bytes) is read out from the queue 11 of the flow #N in which packets of 512 (bytes) have been accumulated.

The credit counter 131 counts credits provided to each of the queues 11 (i.e., for each of the flows #0 to #N). Credits are provided in a given amount (2500 (bytes)) in this example) at a time to each of the queues 11 of the flows #0 to #N from the scheduler 2.

When credits are provided to one of the queues 11 from the scheduler 2, the credit counter 131 updates the credit count of the corresponding queue 11. In the example illustrated in FIG. 4, the scheduler 2 provides credits of 2500 (bytes) to the queue 11 of the flow #N. Thus, the credits of the queue 11 of the flow #N become 3012 (bytes) when 2500 (bytes) is added to the existing amount of 512 (bytes).

The read processor 12 carries out processing of selecting a queue 11 from which a packet is to be read out not on a packet-by-packet basis but in units of 2500 (bytes), which is a unit of credits provided at a time, and reads out one or more packets in burst-like traffic (i.e., in the forms of a block of data). Thus, the scheduling processing of the read processor 12, or in other words, time constraints on the processing of selecting a queue 11 is alleviated as compared with the case where the scheduling processing is carried out on a packet-by-packet basis.

In addition, when the read processor 12 consumes credits according to the packets having been read out from the queue 11, the credit counter 131 updates the credit count of the corresponding queue 11. In other words, when credits are consumed, the credit counter 131 subtracts, from the credits of the corresponding queue 11n the consumed credits, or in other words, the packet length of the packet that has been read out.

The read processor 12 reads out a single packet without dividing the packet into a plurality of sections, and thus some pieces of data in a packet are read out in an excess of the credited amount. In other words, even when credits are less than the packet length of a packet to be read out, as long as the credits of the queue 11 is greater than 0 (bytes), the read processor 12 reads out that packet. In such a case, the credits become a negative value.

For example, if a packet having a packet length of 2600 (bytes) is read from the queue 11 of the flow #0 having credits of 2500 (bytes), the credits of the queue 11 of the flow #0 become −100 (bytes), as indicated in FIG. 4. In this manner, if a packet is read out while the credits are less than the packet length of the packet to be read out, the credit counter 131 counts the data amount that is short of credits as a negative value.

Meanwhile, the scheduler 2 includes a virtual accumulation amount counter 210 and a credit providing unit 20. The virtual accumulation amount counter 210 counts the virtual accumulation amount of each of the queues 11 (i.e., each of the flows #0 to #N). The virtual accumulation amount differs from the accumulation amount, which is counted by the accumulation amount counter 130, and corresponds to an accumulation amount calculated virtually while assuming credits provided to a queue 11 is the packet length of a packet that is read out.

The virtual accumulation amount counter 210 is notified, from the distribution unit 10, of the packet length of a packet inputted to a queue 11 and is also notified, from the credit providing unit 20, that credits have been provided to a queue 11. When a packet is inputted to a queue 11, the virtual accumulation amount counter 210 adds the packet length of that packet to the virtual accumulation amount of the corresponding queue 11. In addition, when credits are provided to a queue 11, the virtual accumulation amount counter 210 subtracts the provided credits from the virtual accumulation amount of the corresponding queue 11. In other words, the virtual accumulation amount is a value obtained by subtracting credits provided to a queue 11 from the accumulation amount of that queue 11. On the other hand, the accumulation amount counter 130 subtracts the packet length from the existing accumulation amount when a packet is read out, and thus the accumulation amount and the virtual accumulation amount do not match for a certain period of time.

In the example illustrated in FIG. 4, the virtual accumulation amount of the queue 11 of the flow #0 becomes 900 (bytes) when a packet of 1000 (bytes) is inputted to the queue 11 of the flow #0 and 1000 (bytes) is thus added to the existing amount of −100 (bytes). Meanwhile, the virtual accumulation amount of the queue 11 of the flow #N becomes −1988 (bytes) when credits of 2500 (bytes) are provided to the queue 11 of the flow #N and 2500 (bytes) is thus subtracted from the existing amount of 512 (bytes).

The credit providing unit 20 provides a given amount of credits (2500 (bytes)) to each of the queues 11 in accordance with the virtual accumulation amount of each of the queues 11. The credit providing unit 20, for example, selects, among the plurality of queues 11, a queue 11 to which credits are to be provided, in accordance with the class priority determined by the class determiner 80. Note that the credit providing unit 20 selects a queue 11 to which credits are to be provided so as to bring the virtual accumulation amount thereof to 0.

In addition, the credit providing unit 20 adjusts the intervals at which credits are provided using shapers. The shapers are provided for the respective flows #0 to #N, and each shaper includes, for example, a token bucket for storing a token, which is treated as a transmission right, and regulates credits to be provided in accordance with the remaining amount of tokens. Thus, the intervals at which credits are provided are adjusted through the rate at which a token is supplied.

In this manner, the output processor 913 treats packets in burst-like traffic in the readout processing, and thus the functions thereof are divided between the queue manager 1 and the scheduler 2. Therefore, the scheduler 2 manages the virtual accumulation amount instead of the accumulation amount of each queue 11. As described above, the virtual accumulation amount does not necessarily match the accumulation amount and may take a value that differs from that of the accumulation amount, and thus the order in which the credit providing unit 20 provides credits may not follow the order of the accumulation amounts. This results in a problem that a delay is generated in reading out a packet. Specific reasons therefor will be described, hereinafter.

FIGS. 5A and 5B illustrate an exemplary operation of the output processor 913 when a packet of 10000 (bytes) arrives. FIGS. 5A and 5B illustrate, in a time series (times t0 to t5), the accumulation amounts of the accumulation amount counter 130, the credits of the credit counter 131, and the virtual accumulation amounts of the virtual accumulation amount counter 210 in the configuration illustrated in FIG. 4. In the description to follow, the value of the credits counted by the credit counter 131 is referred to as a "credit count value".

At a time t0, a packet of 10000 (bytes) arrives at the queue manager 1, and thus the accumulation amount and the virtual accumulation amount each become 10000 (bytes). Meanwhile, the credit count value is 0 (bytes). Here, the flow ID may be any one of #0 to #N.

At a time t1, the scheduler 2 (credit providing unit 20) provides credits of 2500 (bytes) to the queue manager 1. Thus, the credit count value becomes 2500 (bytes), and the virtual accumulation amount becomes 7500 (bytes).

At a time t2, a packet of 10000 (bytes) is read out from the queue manager 1. Thus, the credit count value becomes −7500 (bytes), the accumulation amount becomes 0 (bytes), and the virtual accumulation amount remains 7500 (bytes).

At a time t3, the scheduler 2 provides credits of 2500 (bytes) to the queue manager 1 (second instance of providing credits). Thus, the credit count value becomes −5000 (bytes), and the virtual accumulation amount becomes 5000 (bytes).

At a time t4, the scheduler 2 provides credits of 2500 (bytes) to the queue manager 1 (third instance of providing credits). Thus, the credit count value becomes −2500 (bytes), and the virtual accumulation amount becomes 2500 (bytes).

At a time t5, the scheduler 2 provides credits of 2500 (bytes) to the queue manager 1 (fourth instance of providing credits). Thus, the credit count value becomes 0 (bytes), and the virtual accumulation amount becomes 0 (bytes).

In this manner, although the accumulation amount becomes 0 (bytes) when the packet is read out at the time t2, the scheduler 2 provides credits at the times t3 to t5 so that the virtual accumulation amount becomes 0 (bytes). In this exemplary operation, since the packet length of the packet that has arrived is an integral multiple of the provided credits of 2500 (bytes) (i.e., 2500 (bytes)×4=10000 (bytes)), the credit count value becomes 0 (bytes) at the time t5.

In the meantime, if the packet length of a packet that arrives is not an integral multiple of the provided credits and includes fractions, credits are provided in excess even though the accumulation amount is 0 (bytes), which will be described, hereinafter.

Figure 6A:
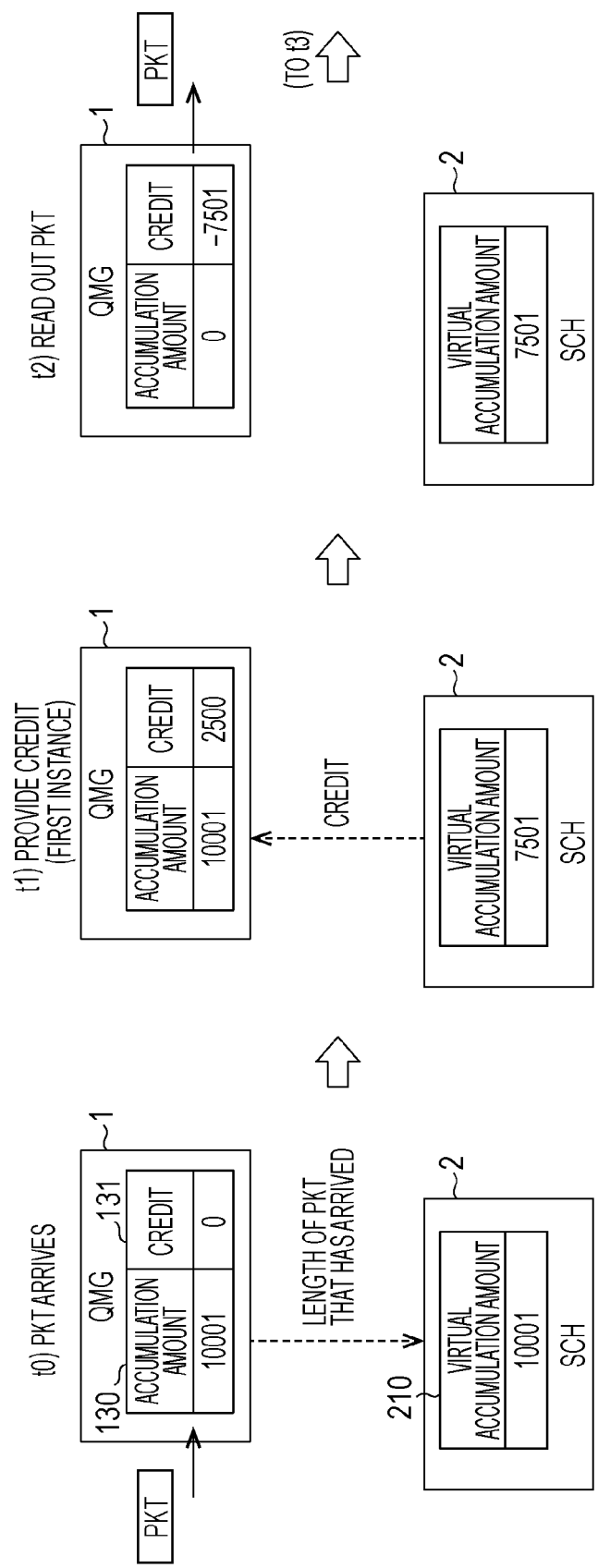
FIG. 6A illustrates an exemplary operation of the output processor when a packet of 10001 (bytes) arrives (part 1)
Figure 6B:
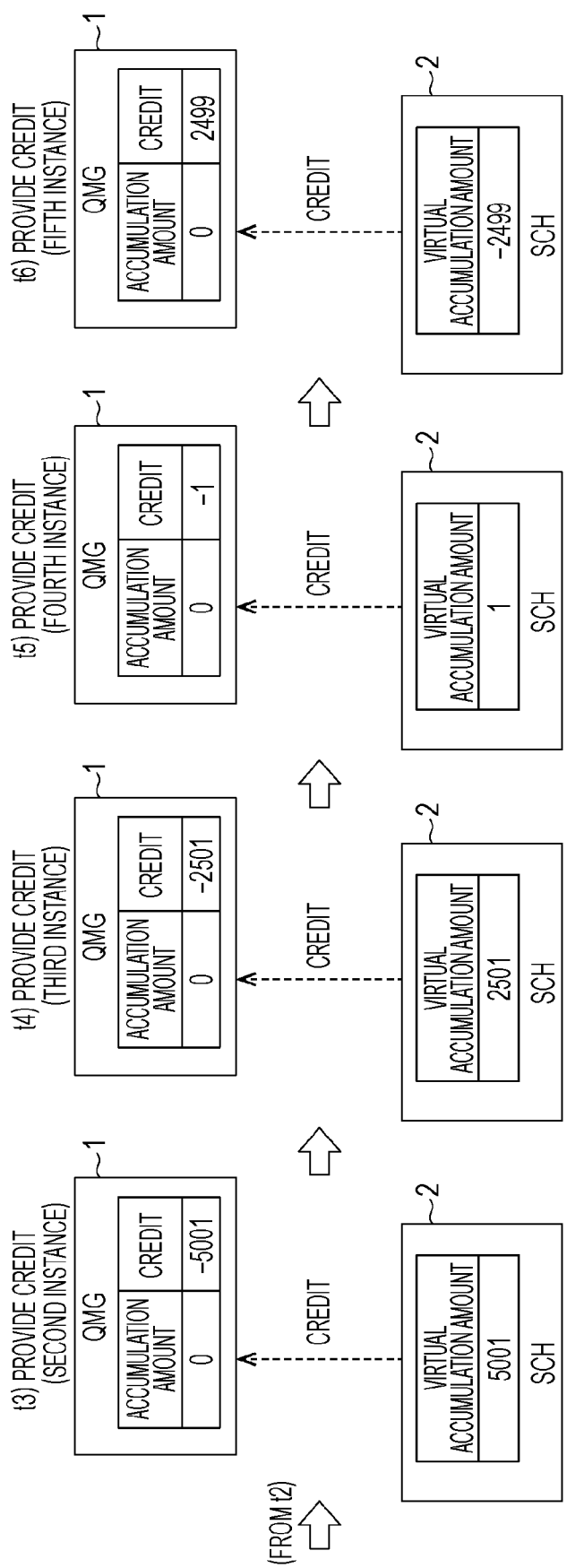
FIG. 6B illustrates an exemplary operation of the output processor when a packet of 10001 (bytes) arrives (part 2)

FIGS. 6A and 6B illustrate an exemplary operation of the output processor 913 when a packet of 10001 (bytes) arrives. FIGS. 6A and 6B illustrate, in a time series (times t0 to t6), the accumulation amounts of the accumulation amount counter 130, the credits of the credit counter 131, and the virtual accumulation amounts of the virtual accumulation amount counter 210 in the configuration illustrated in FIG. 4.

At a time t0, a packet of 10001 (bytes) arrives at the queue manager 1, and thus the accumulation amount and the virtual accumulation amount each become 10001 (bytes). Meanwhile, the credit count value is 0 (bytes). The flow ID may be any one of #0 to #N.

At a time t1, the scheduler 2 (credit providing unit 20) provides credits of 2500 (bytes) to the queue manager 1. Thus, the credit count value becomes 2500 (bytes), and the virtual accumulation amount becomes 7501 (bytes).

At a time t2, a packet of 10001 (bytes) is read out from the queue manager 1. Thus, the credit count value becomes −7501 (bytes), and the accumulation amount becomes 0 (bytes).

At a time t3, the scheduler 2 provides credits of 2500 (bytes) to the queue manager 1 (second instance of providing credits). Thus, the credit count value becomes −5001 (bytes), and the virtual accumulation amount becomes 5001 (bytes).

At a time t4, the scheduler 2 provides credits of 2500 (bytes) to the queue manager 1 (third instance of providing credits). Thus, the credit count value becomes −2501 (bytes), and the virtual accumulation amount becomes 2501 (bytes).

At a time t5, the scheduler 2 provides credits of 2500 (bytes) to the queue manager 1 (fourth instance of providing credits). Thus, the credit count value becomes −1 (byte), and the virtual accumulation amount becomes 1 (byte).

At a time t6, the scheduler 2 provides credits of 2500 (bytes) to the queue manager 1 (fifth instance of providing credits). Thus, the credit count value becomes 2499 (bytes), and the virtual accumulation amount becomes −2499 (bytes).

In this manner, in this exemplary operation, although the credits are provided so as to bring the virtual accumulation amount to 0 (bytes), since the packet length includes fractions relative to the credits of 2500 (bytes), the credit count value becomes 2499 (bytes) at the time t6. As described above, the read processor 12 reads out a packet from a queue 11 when the credit count value thereof is greater than 0. The accumulation amount, however, is already 0 (bytes) at the time t6, and thus there is no packet to be read out therefrom.

In other words, in this exemplary operation, credits have been provided in excess at the time t6 before another packet arrives. Providing credits in such a manner results in a delay in reading out a packet.

Figure 7:
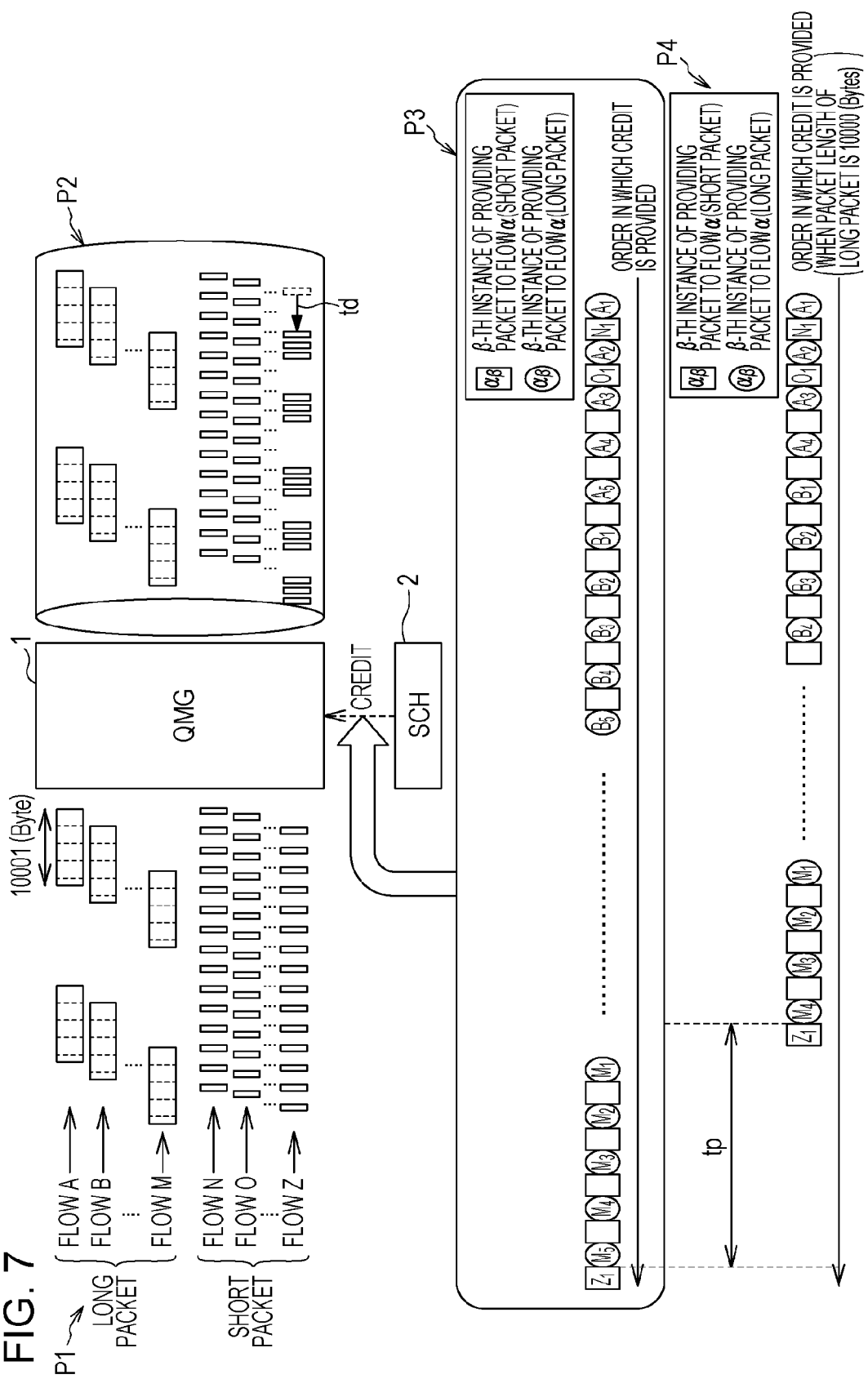
FIG. 7 illustrates exemplary timings at which packets are inputted/outputted and an exemplary order in which credits are provided.

FIG. 7 illustrates timings at which packets are inputted/outputted and the order in which credits are paid out. In FIG. 7, timings at which packets of flows A to Z (A to Z: flow IDs) arrive at the queue manager 1 are illustrated in a section P1, and timings at which packets are outputted to a port from the queue manager 1 are illustrated in a section P2.

Each of the packets of the flows A to M is a long packet having a packet length of 10001 (bytes) and is inputted to the queue manager 1 at the rate of 5 (Gbps) in total (e.g., 5 (Mbps)×1000 flows). Meanwhile, each of the packets of the flows N to Z is a short packet having a packet length of 100 (bytes) and is inputted to the queue manager 1 at the rate of 5 (Gbps) in total (e.g., 5 (Mbps)×1000 flows).

When the rate at the output side, that is, at the port of the queue manager 1 is 10 (Gbps), the total rate at the input side of the queue manager 1 matches the total rate at the output side thereof, and thus, in theory, a packet delay does not occur. In reality, however, when the packet length of a long packet is 10001 (bytes), unlike the case where the packet length is 10000 (bytes), credits are provided in excess as mentioned above, and thus a delay td is generated in a timing of outputting a short packet.

The order in which credits are provided in the case where the packet length of the long packet is 10001 (bytes) is illustrated in a section P3. Meanwhile, the order in which credits are provided in the case where the packet length of the long packet is 10000 (bytes) is illustrated in a section P4. The order in which the credits are provided is indicated by the types (A to Z) of the flows and the number of instances of providing credits. Note that the credits are provided in the order from right to left in FIG. 7.

As described above, when the packet length is 10001 (bytes), unlike the case where the packet length is 10000 (bytes), the scheduler 2 provides credits five times to each of the flows A to M of the long packets (see the arrows). Here, the intervals at which the credits are provided accord with the rate at which the tokens are supplied in the shapers of the credit providing unit 20, and thus the credits to be provided within a given unit of time are regulated to a predetermined amount in the entire flows.

Thus, if credits are provided in excess (i.e., fifth instance of providing credits) to the queues 11 of the flows A to M of the long packets before subsequent packets arrive at the queues 11, a delay is generated in providing credits to the queues 11 of the flows N to Z of the short packets, which are inputted afterwards. In other words, when the packet length of the long packet is 10001 (bytes), the order in which the credits are provided to a queue 11 of a short packet is delayed as compared with the case where the packet length of the long packet is 10000 (bytes) (see reference sign tp). In the long run, however, the total amount of credits provided to the queue 11 of each flow is the same.

In the communication device according to the embodiment, the queue manager 1 notifies the scheduler 2 of a change in the accumulation amount of the queue 11, and thus the order in which credits are provided is adjusted in accordance with the change in the accumulation amount.

First Embodiment

Figure 8:
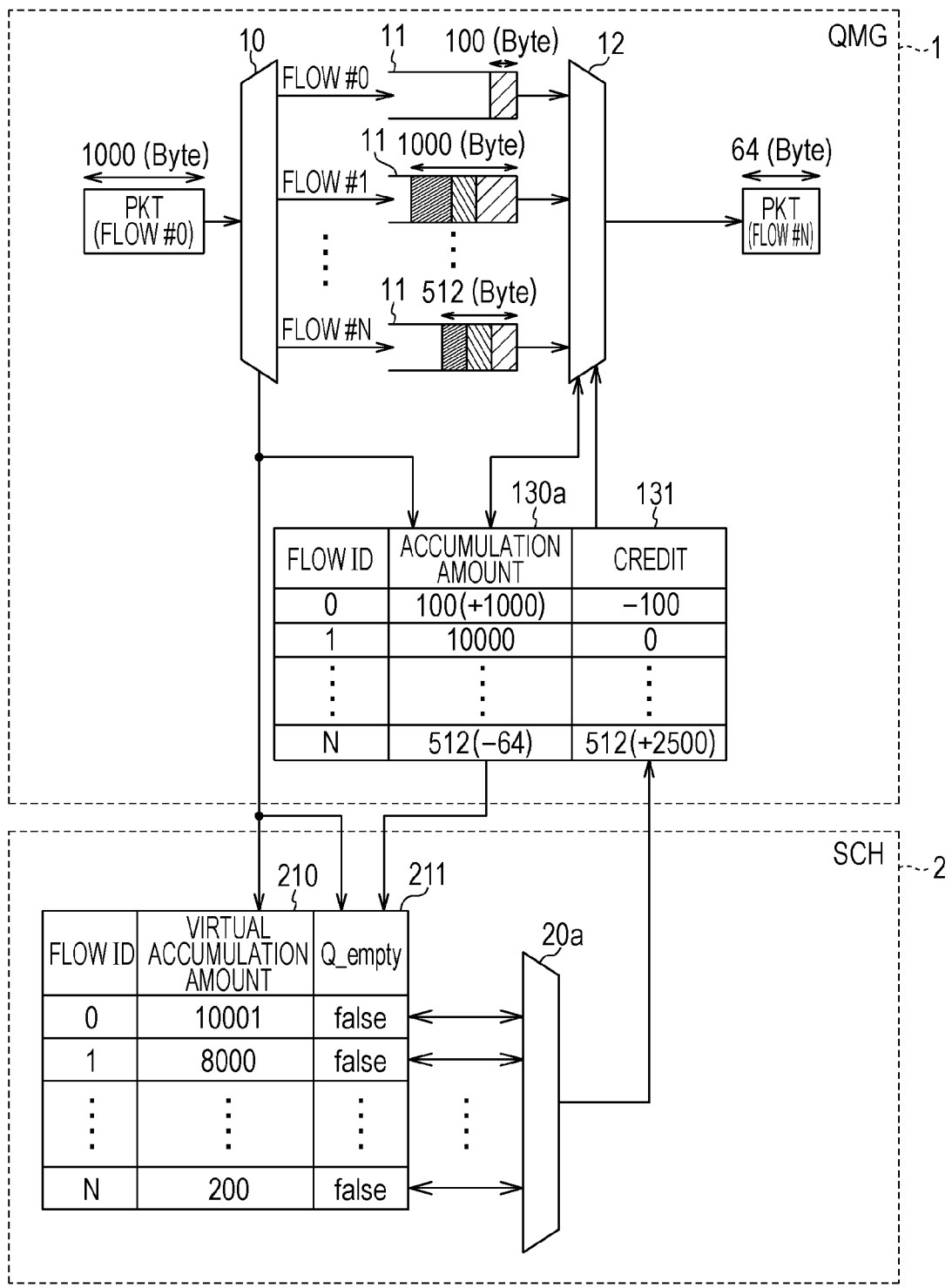
FIG. 8 is a configuration diagram illustrating a functional configuration of an output processor according to a first embodiment.

FIG. 8 is a configuration diagram illustrating a functional configuration of an output processor 913 according to a first embodiment. In FIG. 8, configurations identical to those illustrated in FIG. 4 are given identical reference characters, and descriptions thereof will be omitted.

The output processor 913 includes the queue manager (QMG) 1 and the scheduler (SCH) 2. The queue manager 1 includes the distribution unit (notification unit) 10, the plurality of queues 11, the read processor 12, an accumulation amount counter 130a, and the credit counter 131. Meanwhile, the scheduler 2 includes the virtual accumulation amount counter 210, an accumulation amount flag management unit 211, and a credit providing unit 20a.

The accumulation amount counter 130a includes not only the function similar to that of the accumulation amount counter 130 but also the function of notifying the scheduler 2 of a change in the accumulation amount. To be more specific, when any one of the queues 11 becomes empty, or in other words, when the accumulation amount in any one of the queues 11 becomes 0 as a packet is read out therefrom by the read processor 12, the accumulation amount counter 130a notifies the accumulation amount flag management unit 211 of that effect through an accumulation amount flag Q_empty.

The accumulation amount flag management unit 211 manages the accumulation amount flag Q_empty provided for each of the flows #0 to #N, or in other words, provided for each of the queues 11. The accumulation amount flag Q_empty is set to "true" when the accumulation amount of a corresponding queue 11 is 0 (empty); otherwise, the accumulation amount flag Q_empty is set to "false". The accumulation amount flag management unit 211 updates the accumulation amount flag Q_empty of the corresponding queue 11 in response to the aforementioned notification from the accumulation amount counter 130a. The accumulation amount flag management unit 211 updates the accumulation amount flag Q_empty upon being notified, from the accumulation amount counter 130a, of a change in the accumulation amount when a packet is read out and upon being notified, from the distribution unit 10, of arrival of a packet. Upon being notified of arrival of a packet, the accumulation amount flag management unit 211 updates the accumulation amount flag Q_empty to "false".

The credit providing unit 20a provides credits to the queues 11 in accordance not only with the virtual accumulation amount of each queue 11, as in the credit providing unit 20, but also with the order that is based on the priority of each queue 11. The credit providing unit 20a adjusts the priority in providing credits in accordance with the accumulation amount flag Q_empty. An exemplary operation will be described, hereinafter.

Figure 9:
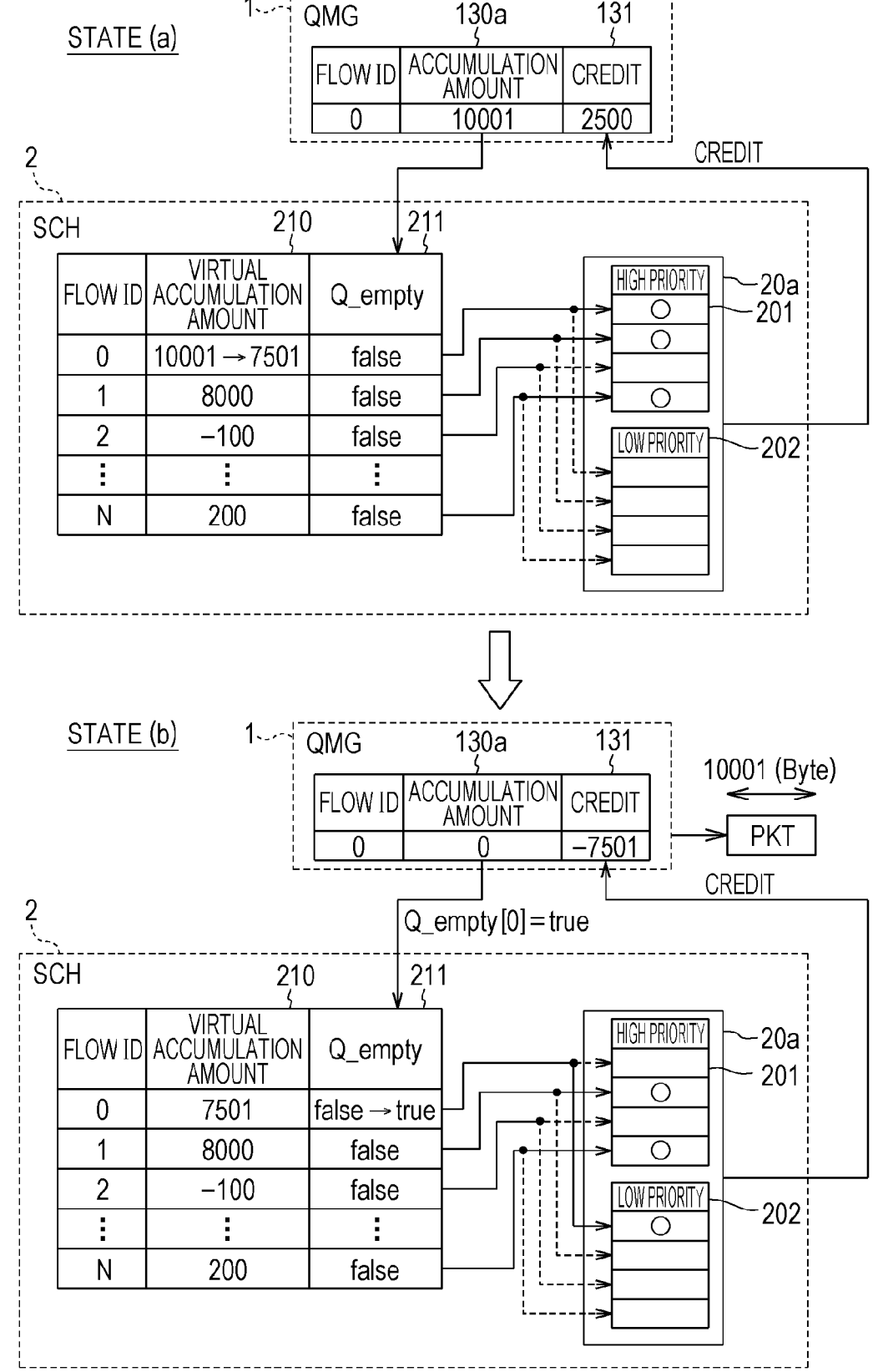
FIG. 9 illustrates an exemplary operation for adjusting the priority in accordance with an accumulation amount flag Q_empty.

FIG. 9 illustrates an exemplary operation for adjusting the priority in accordance with the accumulation amount flag Q_empty. A state (state (a)) prior to adjusting the priority is illustrated in the upper section of FIG. 9, and a state (state (b)) after adjusting the priority is illustrated in the lower section of FIG. 9. FIG. 9 illustrates, among the configurations illustrated in FIG. 8, the accumulation amount counter 130a, the credit counter 131, the virtual accumulation amount counter 210, the accumulation amount flag management unit 211, and the credit providing unit 20a.

The credit providing unit 20a includes a high priority list 201 and a low priority list 202 for managing the priority of each of the flows #0 to #N, or in other words, of each of the queues 11 in providing credits thereto. The credit providing unit 20a registers each of the flows #0 to #N into one of the high priority list 201 and the low priority list 202 in accordance with the accumulation amount flag Q_empty. The credit providing unit 20a evenly selects from the queues 11 of the flows #0 to #N having the equal priority through, for example, the round-robin method.

In the state (a), the virtual accumulation amounts of the flows #0, #1, #2, and #N are 10001 (bytes), 8000 (bytes), −100 (bytes), and 200 (bytes), respectively. The flows #0, #1, and #N are registered in the high priority list 201, which is the normal priority, and are treated evenly in selection of a queue 11 to which credits are to be provided. The virtual accumulation amount of the flow #2 is a negative value, and thus the flow #2 is not registered either of the high priority list 201 and the low priority list 202. Note that the registration state is indicated by an open circle.

The accumulation amount of the flow #0 is 10001 (bytes), and the credit providing unit 20a, for example, provides credits of 2500 (bytes) to the queue 11 of the flow #0. Thus, the credit count value of the flow #0 becomes 2500 (bytes), and the virtual accumulation amount of the flow #0 changes from 10001 (bytes) to 7501 (bytes).

Meanwhile, in the state (b), as a packet having a packet length of 10001 (bytes) is read out from the queue 11 of the flow #0, the accumulation amount of the flow #0 becomes 0 (bytes), and the credit count value of the flow #0 becomes −7501 (bytes). Thus, the accumulation amount counter 130a notifies the accumulation amount flag management unit 211 that the queue 11 of the flow #0 is empty. Such a notification is made through, for example, a 1-bit data format (i.e., by setting the accumulation amount flag Q_empty[0] of the flow #0 to true).

The accumulation amount flag management unit 211 updates the accumulation amount flag Q_empty[0] of the flow #0 from "false" to "true" in response to the notification from the accumulation amount counter 130a. Thus, the credit providing unit 20a registers the flow #0 into the low priority list 202 and gives a lower priority in providing credits to the flow #0 than to the other flows even though the virtual accumulation amount of the flow #0 is 7501 (bytes).

FIG. 10 illustrates the order in which credits are provided in this example. FIG. 10 illustrates the flow ID of each queue 11 in the order and the changes in the virtual accumulation amounts caused by credits being provided. The assumption here is that the queue 11 of the flow #1 does not become empty until the virtual accumulation amount thereof becomes a negative value.

The queue 11 of the flow #0 is provided with credits at the order "1" and becomes empty as a packet is read out therefrom. Therefore, the queue 11 of the flow #0 is given a lower priority in being provided with credits thereafter than the queue 11 of the flow #1, which is not empty. Note that the queue 11 of the flow #N is provided with credits at the order "3", and the virtual accumulation amount thereof becomes a negative value, and thus credits are not provided thereto thereafter.

FIG. 11 illustrates the order in which credits are provided. The queue 11 of the flow #0 is provided with credits at the order "1" and becomes empty as a packet is read out therefrom. The scheduler 2, however, is not aware that the queue 11 of the flow #0 has become empty, and thus the scheduler 2 provides credits to the queue 11 of the flow #0 and to the queue 11 of the flow #1 in an alternating manner.

In this manner, the scheduler 2 of the embodiment lowers the priority of, among the plurality of queues 11, a queue 11 of which the accumulation amount has become 0, in response to the notification from the accumulation amount counter 130a. Thus, the queue 11 of which the accumulation amount has become 0 is given a lower priority in being provided with credits than the other queues 11.

Figure 12:
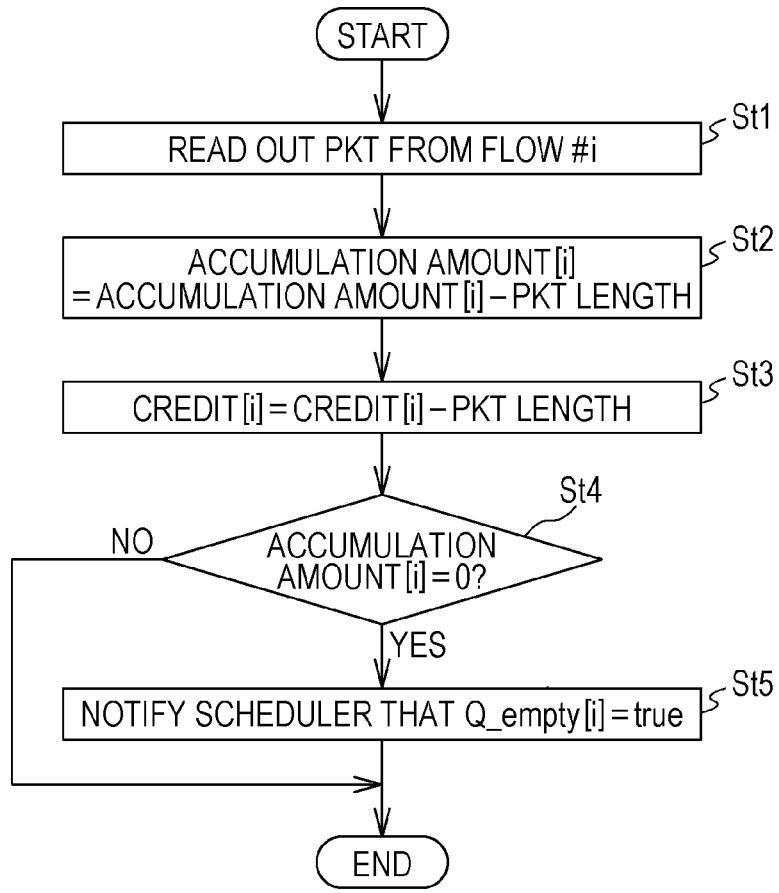
FIG. 12 is a flowchart illustrating an operation of a queue manager when a packet is read out.

The operations of the queue manager 1 and the scheduler 2 according to the first embodiment will now be described. FIG. 12 is a flowchart illustrating the operation of the queue manager 1 when a packet is read out.

When the read processor 12 reads out a packet from a queue 11 of a flow #i (i is a natural number) (operation St1), the accumulation amount counter 130a subtracts the packet length (PKT length) of the packet that has been read out from the accumulation amount of the flow #i (operation St2). The credit counter 131 then subtracts the packet length (PKT length) of the packet that has been read out from the credit count value of the flow #i (operation St3). Note that the processing in operation St3 may be carried out prior to the processing in operation St2.

Subsequently, the accumulation amount counter 130a determines whether or not the accumulation amount of the flow #i is 0 (operation St4). If the accumulation amount of the flow #i is 0 (Yes in operation St4), the accumulation amount counter 130a notifies the scheduler 2 that the accumulation amount flag Q_empty[i] is "true". Meanwhile, if the accumulation amount of the flow #i is not 0 (No in operation St4), the processing is terminated. The queue manager 1 operates as described above when a packet is read out.

Figure 13:
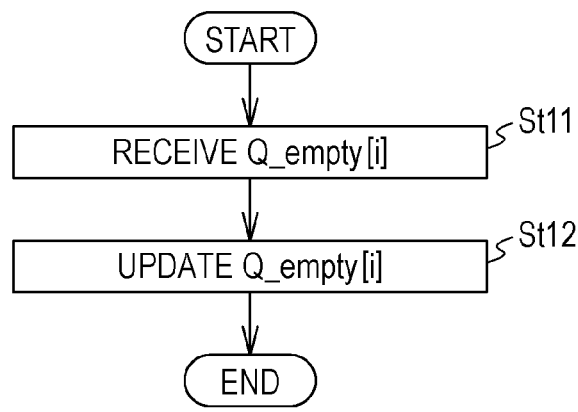
FIG. 13 is a flowchart illustrating an operation of a scheduler when a notification is received from the queue manager.

FIG. 13 is a flowchart illustrating the operation of the scheduler 2 when the scheduler 2 receives a notification from the queue manager 1. When the accumulation amount flag management unit 211 receives a notification of the accumulation amount flag Q_empty[i] from the accumulation amount counter 130a (operation St11), the accumulation amount flag management unit 211 updates the accumulation amount flag Q_empty[i] of the flow #i (operation St12). The scheduler 2 operates as described above when the scheduler 2 receives a notification from the queue manager 1.

Figure 14:
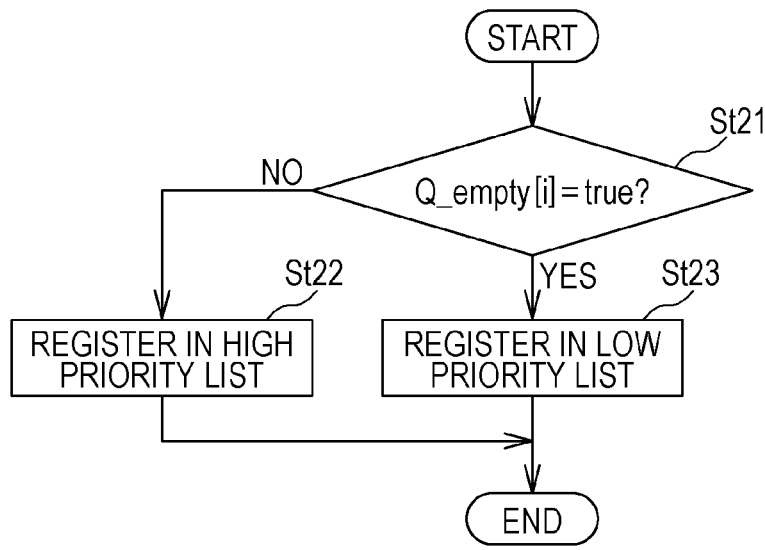
FIG. 14 is a flowchart illustrating an operation of the scheduler in scheduling processing.

FIG. 14 is a flowchart illustrating the operation of the scheduler 2 in the scheduling processing. When it is time to schedule the flow #i, the credit providing unit 20a determines whether or not the accumulation amount flag Q_empty[i] of the flow #i is "true" (operation St21).

If the accumulation amount flag Q_empty[i] of the flow #i is "true" (Yes in operation St21), the credit providing unit 20a registers the flow #i into the low priority list 202 (operation St23). Meanwhile, if the accumulation amount flag Q_empty[i] of the flow #i is "false" (No in operation St21), the credit providing unit 20a registers the flow #i into the high priority list 201 (operation St22). The scheduler 2 operates as described above in the scheduling processing.

Figure 15:
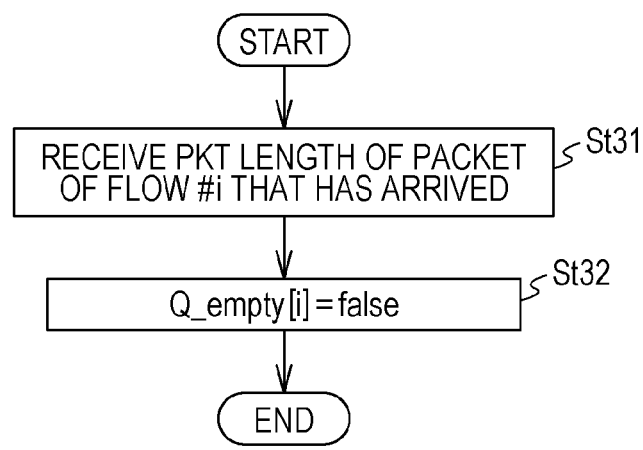
FIG. 15 is a flowchart illustrating an operation of the scheduler when a packet arrival notification is received.

FIG. 15 is a flowchart illustrating the operation of the scheduler 2 when the scheduler 2 receives a notification that a packet has arrived. When a packet of the flow #i arrives at the queue manager 1, the distribution unit 10 notifies the accumulation amount flag management unit 211 of the packet length of that packet (operation St31).

The accumulation amount flag management unit 211 then updates the accumulation amount flag Q_empty[i] of the flow #i to "false" (operation St32). The scheduler 2 operates as described above when the scheduler 2 receives a notification that a packet has arrived.

Figure 16B:
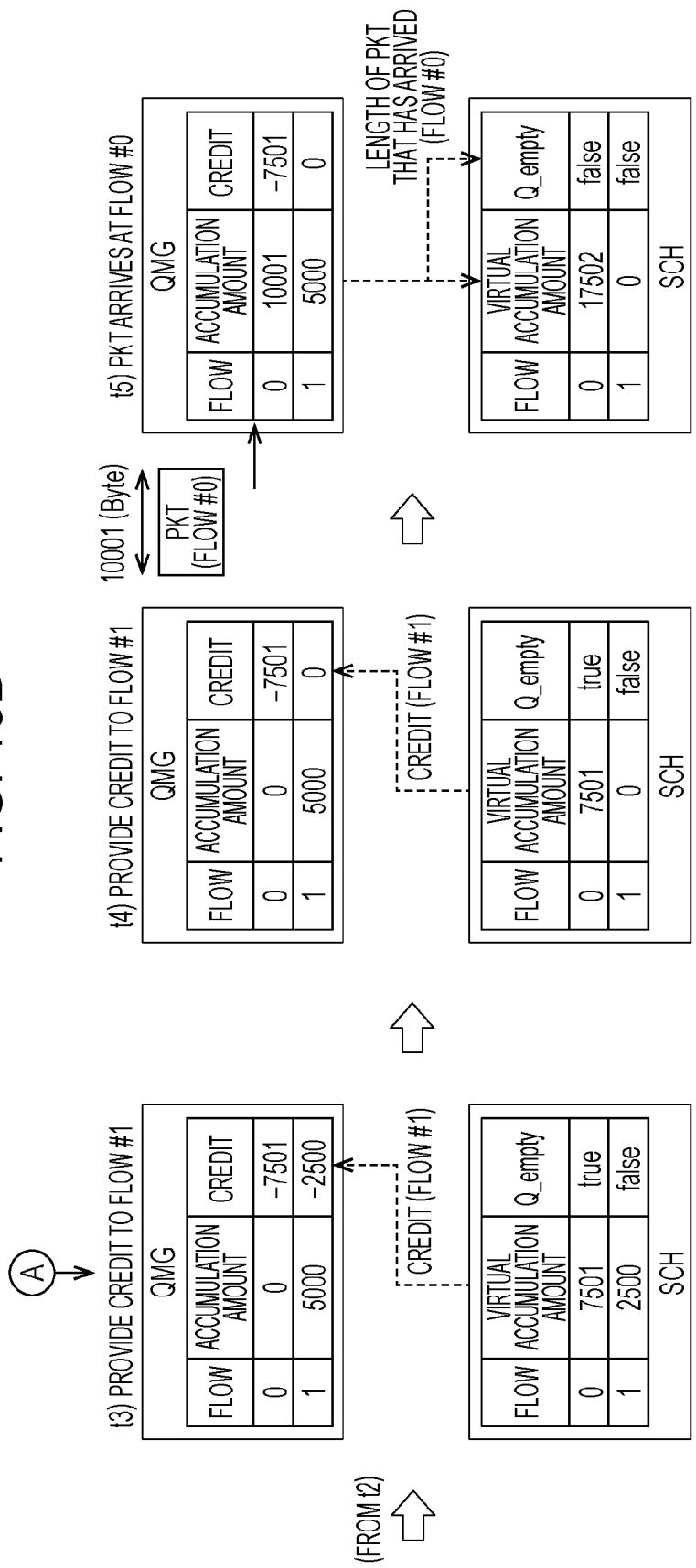
FIG. 16B illustrates an exemplary operation in the first embodiment (part 2)

FIGS. 16A and 16B illustrate an exemplary operation in the first embodiment. FIGS. 16A and 16B illustrate, in a time series (times t0 to t5), the accumulation amounts of the accumulation amount counter 130a, the credits of the credit counter 131, the virtual accumulation amounts of the virtual accumulation amount counter 210, and the accumulation amount flags Q_empty of the accumulation amount flag management unit 211 in the configuration illustrated in FIG. 8.

At a time t0, the credit providing unit 20a provides credits to the queue 11 of the flow #0; thus, the credit count value of the flow #0 becomes 2500 (bytes), and the virtual accumulation amount of the flow #0 becomes 7501 (bytes). At this point, the accumulation amount of the flow #0 is 10001 (bytes), and the accumulation amount of the flow #1 is 5000 (bytes). Meanwhile, the credit count value of the flow #1 is −5000 (bytes). Note that the accumulation amount flag Q_empty[0] of the flow #0 and the accumulation amount flag Q_empty[1] of the flow #1 are both "false".

At a time t1, a packet of 10001 (bytes) is read out from the queue 11 of the flow #0. Thus, the accumulation amount of the flow #0 becomes 0 (bytes), and the credit count value of the flow #0 becomes −7501 (bytes).

At a time t2, the accumulation amount counter 130a notifies the accumulation amount flag management unit 211 that the accumulation amount flag Q_empty[0] of the flow #0 is "true". Thus, the accumulation amount flag management unit 211 updates the accumulation amount flag Q_empty[0] to "true". The credit providing unit 20a thus registers the flow #0 into the low priority list 202 and gives a lower priority in providing credits to the queue 11 of the flow #0 than to the queue 11 of the flow #1.

At a time t3, the credit providing unit 20a provides credits to the queue 11 of the flow #1; thus, the credit count value of the flow #1 becomes −2500 (bytes), and the virtual accumulation amount of the flow #1 becomes 2500 (bytes). Note that the credit count value of the flow #1 is negative, and thus packets accumulated in the queue 11 of the flow #1 are not read out.

At a time t4, the credit providing unit 20a provides credits to the queue 11 of the flow #1; thus, the credit count value of the flow #1 becomes 0 (bytes), and the virtual accumulation amount of the flow #1 becomes 0 (bytes).

When a packet of 10001 (bytes) arrives at the flow #0 at a time t5, the distribution unit 10 notifies the virtual accumulation amount counter 210 and the accumulation amount flag management unit 211 of the flow ID and the packet length of the packet that has arrived. Thus, the virtual accumulation amount of the flow #0 becomes 17502 (bytes), and the accumulation amount flag Q_empty[0] of the flow #0 is updated to "false".

As the accumulation amount flag Q_empty[0] of the flow #0 becomes "false", the credit providing unit 20a registers the flow #0 into the high priority list 201 again and provides credits evenly to the queue 11 of the flow #0 and to the queue 11 of the flow #1. In this manner, the scheduler 2 brings back the priority of one of the queues 11, of which the priority has been lowered, to the original value held prior to having the priority thereof being lowered, in response to the notification from the distribution unit 10. Thus, the priority of the queue 11 is returned instantaneously and autonomously to the value held prior to being adjusted.

FIG. 17 illustrates timings at which packets are inputted/outputted and the order in which credits are provided in the first embodiment. In FIG. 17, timings at which packets of flows A to Z (A to Z: flow IDs) arrive at the queue manager 1 are illustrated in a section P5, and timings at which packets are outputted to a port from the queue manager 1 are illustrated in a section P6. Note that the flows A to Z are the same as those described with reference to FIG. 7.

The order in which the credits are provided in the first embodiment is illustrated in a section P7. In addition, the order in which the credits are provided is illustrated in a section P8, which is identical to the order illustrated in the section P3 of FIG. 7. Representation of the order is the same as that described with reference to FIG. 7.

In the order of the first embodiment illustrated in the section P7, "empty" indicated in the order indicates that the queue 11 of the corresponding flow is empty, or in other words, the accumulation amount thereof is 0. In the order of the first embodiment illustrated in the section P7, the second to fifth instances of providing credits to each of the flow A and the flow B (see FIGS. 6A and 6B) are delayed relative to the order illustrated in the section P8 (see arrows R1) due to the notification of the accumulation amount flag Q_empty described above. In other words, the second to fifth instances of providing credits to each of the flow A and the flow B are given a lower priority. Thus, the delay in providing credits to the queue 11 of the flow Z has been resolved (see arrow R2), and the delay in the short packet of the flow Z has also been resolved (see the section P6).

Note that the flow A and the flow B are each given a lower priority not only in being provided with credits in excess before a packet arrives, or in other words, in the fifth instance of being provided with credits but also in the second to fourth instances of being provided with credits. However, it is sufficient as long as credits are provided to the queue 11 before a packet arrives, and the priority of the corresponding queue 11 is adjusted back to the value held prior to being adjusted through the notification from the distribution unit 10 when a packet arrives as described above. Therefore, a problem does not arise.

In this manner, in the first embodiment, the accumulation amount counter 130a notifies the scheduler 2 that the accumulation amount has become 0. The scheduler 2 then lowers the priority of, among the plurality of queues 11, a queue 11 of which the accumulation amount has become 0, in response to the notification from the accumulation amount counter 130a.

According to the first embodiment, the scheduler 2 is notified that the accumulation amount has become 0 not by reading out but through event driven. Thus, the scheduler 2 can promptly give a lower priority in providing credits to the corresponding queue 11 than to the other queues 11 in response to the notification. Accordingly, credits are provided preferentially to a queue 11 of which the accumulation amount is not 0 (bytes), and the standby time of a packet in the queue 11 until the packet is read out by the read processor 12 is reduced. Thus, a delay in reading out a packet is reduced.

In addition, the scheduler 2 may provide credits to each of the queues 11 in accordance with the ratio of the weighted values of the flows #0 to #N through the weighted round robin method while adjusting the order that is based on the priority of each of the queues 11.

Figure 18:
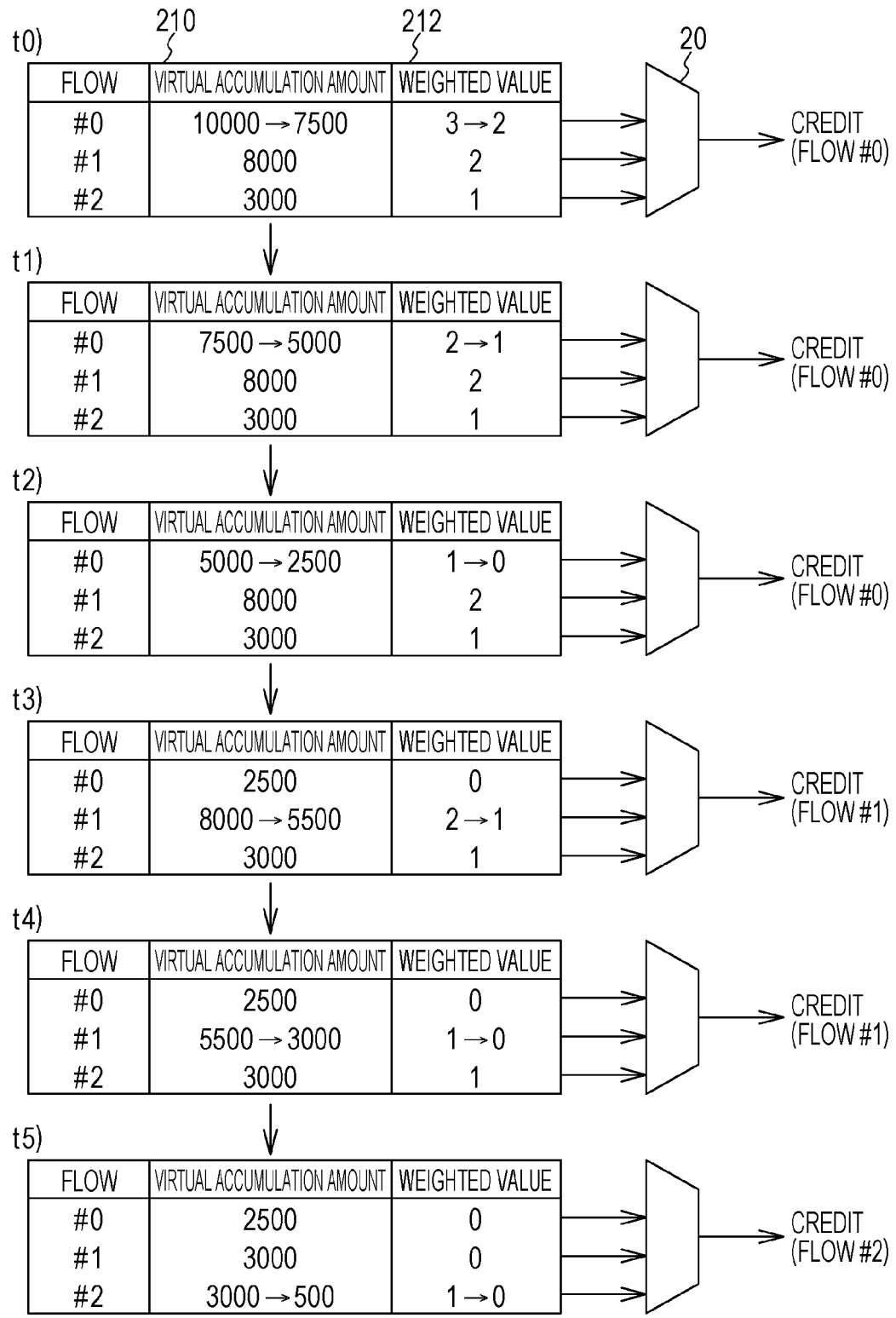
FIG. 18 illustrates an exemplary operation through a weighted round robin method.

FIG. 18 illustrates an exemplary operation through the weighted round robin method. In FIG. 18, in addition to the configurations illustrated in FIG. 4, a weighted value management unit 212 is provided for managing the weighted value of each of the flows #0 to #N. The weighted value management unit 212 sets the weighted values through a network management device or the like. FIG. 18 illustrates, in a time series (times t0 to t5), the virtual accumulation amounts of the virtual accumulation amount counter 210 and the weighted values of the weighted value management unit 212 for each of the flows #0 to #2.

In an initial state, the virtual accumulation amounts of the flows #0, #1, and #2 are 10000 (bytes), 8000 (bytes), and 3000 (bytes), respectively. The weighted values of the flows #0, #1, and #2 are 3, 2, and 1, respectively.

At a time t0, the credit providing unit 20 provides credits to the queue 11 of the flow #0. Thus, the virtual accumulation amount counter 210 updates the virtual accumulation amount of the flow #0 from 10000 (bytes) to 7500 (bytes). Meanwhile, the weighted value management unit 212 updates the weighted value of the flow #0 from 3 to 2.

At times t1 and t2 as well, the credit providing unit 20 provides credits to the queue 11 of the flow #0. Thus, the virtual accumulation amount counter 210 updates the virtual accumulation amount of the flow #0 from 7500 (bytes) to 2500 (bytes). Meanwhile, the weighted value management unit 212 updates the weighted value of the flow #0 from 2 to 0.

Here, the credit providing unit 20 has provided credits to the queue 11 of the flow #0 the number of times (three times) that is equal to the initial value of the weighted value of the flow #0, and the credit providing unit 20 switches a target to which credits are to be provided to the queue 11 of the flow #1 although the virtual accumulation amount of the flow #0 is greater than 0 (bytes).

At times t3 and t4, the credit providing unit 20 provides credits to the queue 11 of the flow #1. Thus, the virtual accumulation amount counter 210 updates the virtual accumulation amount of the flow #1 from 8000 (bytes) to 3000 (bytes). Meanwhile, the weighted value management unit 212 updates the weighted value of the flow #1 from 2 to 0.

Here, the credit providing unit 20 has provided credits to the queue 11 of the flow #1 the number of times (two times) that is equal to the initial value of the weighted value of the flow #1, and thus the credit providing unit 20 switches a target to which credits are to be provided to the queue 11 of the flow #2 although the virtual accumulation amount of the flow #1 is greater than 0 (bytes).

At a time t5, the credit providing unit 20 provides credits to the queue 11 of the flow #2. Thus, the virtual accumulation amount counter 210 updates the virtual accumulation amount of the flow #2 from 3000 (bytes) to 500 (bytes). Meanwhile, the weighted value management unit 212 updates the weighted value of the flow #2 from 1 to 0.

Here, the credit providing unit 20 has provided credits to the queue 11 of the flow #2 the number of times (one time) that is equal to the initial value of the weighted value of the flow #2, and thus the credit providing unit 20 finishes providing credits in a single scheduling cycle although the virtual accumulation amount of the flow #2 is greater than 0 (bytes).

Figure 19:
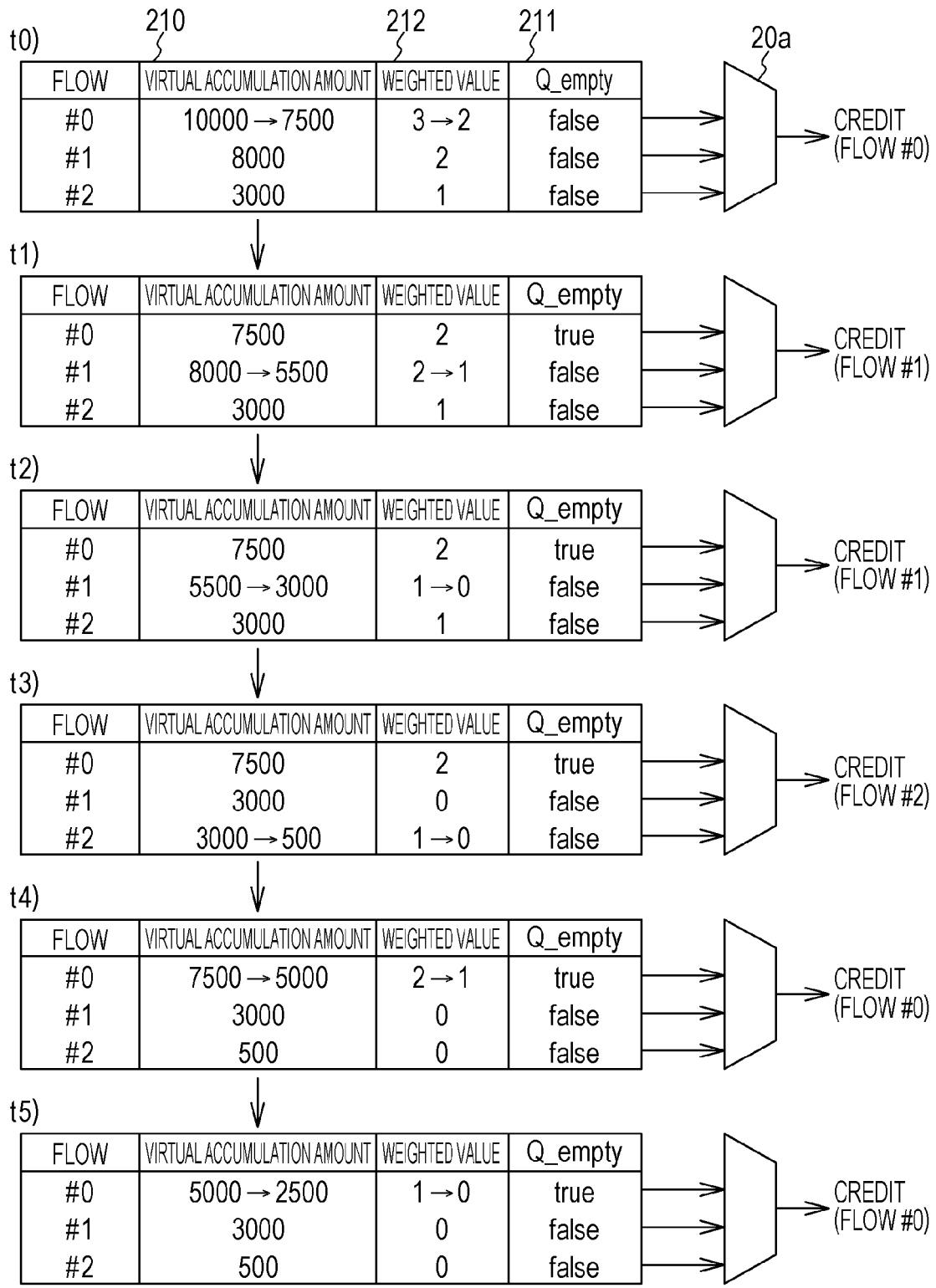
FIG. 19 illustrates an exemplary operation through the weighted round robin method in which the accumulation amount flag Q_empty is used.

FIG. 19 illustrates an exemplary operation through the weighted round robin method using the accumulation amount flag Q_empty. In this example, in addition to the configurations illustrated in FIG. 8, the weighted value management unit 212 is provided in the same manner as FIG. 18. FIG. 19 illustrates, in a time series (times t0 to t5), the virtual accumulation amounts of the virtual accumulation amount counter 210, the weighted values of the weighted value management unit 212, the accumulation amount flags Q_empty of the accumulation amount flag management unit 211.

The virtual accumulation amounts and the weighted values of the flows #0 #1, and #2 in an initial state are identical to those in FIG. 18 described above. In addition, the accumulation amount flag Q_empty of each of the flows #0, #1, and #2 is set to "false" in the initial state.

At a time t0, the credit providing unit 20a provides credits to the queue 11 of the flow #0. Thus, the virtual accumulation amount counter 210 updates the virtual accumulation amount of the flow #0 from 10000 (bytes) to 7500 (bytes). Meanwhile, the weighted value management unit 212 updates the weighted value of the flow #0 from 3 to 2. At this point, the accumulation amount of the flow #0 is assumed to have become 0 (bytes).

At a time t1, the accumulation amount flag management unit 211 updates the accumulation amount flag Q_empty[0] of the flow #0 to "true" in response to the notification from the accumulation amount counter 130a. Thus, the credit providing unit 20a registers the flow #0 into the low priority list 202.

The credit providing unit 20a gives a lower priority in providing credits to the queue 11 of the flow #0, of which the priority has been lowered, than to the other queues 11 of the flows #1 and #2 although the weighted value of the flow #0 is 2 (≠0). Thus, the credit providing unit 20a switches a target to which credits are to be provided to the queue 11 of the flow #1.

At times t1 and t2, the credit providing unit 20a provides credits to the queue 11 of the flow #1. Thus, the virtual accumulation amount counter 210 updates the virtual accumulation amount of the flow #1 from 8000 (bytes) to 3000 (bytes). Meanwhile, the weighted value management unit 212 updates the weighted value of the flow #1 from 2 to 0.

Here, the credit providing unit 20a has provided credits to the queue 11 of the flow #1 the number of times (two times) that is equal to the initial value of the weighted value of the flow #1, and thus the credit providing unit 20a switches a target to which credits are to be provided to the queue 11 of the flow #2 although the virtual accumulation amount of the flow #1 is greater than 0 (bytes).

At a time t3, the credit providing unit 20a provides credits to the queue 11 of the flow #2. Thus, the virtual accumulation amount counter 210 updates the virtual accumulation amount of the flow #2 from 3000 (bytes) to 500 (bytes). Meanwhile, the weighted value management unit 212 updates the weighted value of the flow #2 from 1 to 0.

Here, the credit providing unit 20a has provided credits to the queue 11 of the flow #2 the number of times (one time) that is equal to the initial value of the weighted value of the flow #2, and thus the credit providing unit 20a switches a target to which credits are to be provided to the queue 11 of the flow #0 again although the virtual accumulation amount of the flow #2 is greater than 0 (bytes).

At times t4 and t5, the credit providing unit 20a provides credits to the queue 11 of the flow #0. Thus, the virtual accumulation amount counter 210 updates the virtual accumulation amount of the flow #0 from 7500 (bytes) to 2500 (bytes). Meanwhile, the weighted value management unit 212 updates the weighted value of the flow #0 from 2 to 0. In other words, since the accumulation amount flag Q_empty[0] of the queue 11 of the flow #0 is "true", the queue 11 of the flow #0 is given a lower priority than the other flows #1 and #2, of each of which the accumulation amount flag Q_empty is "false".

Figure 20:
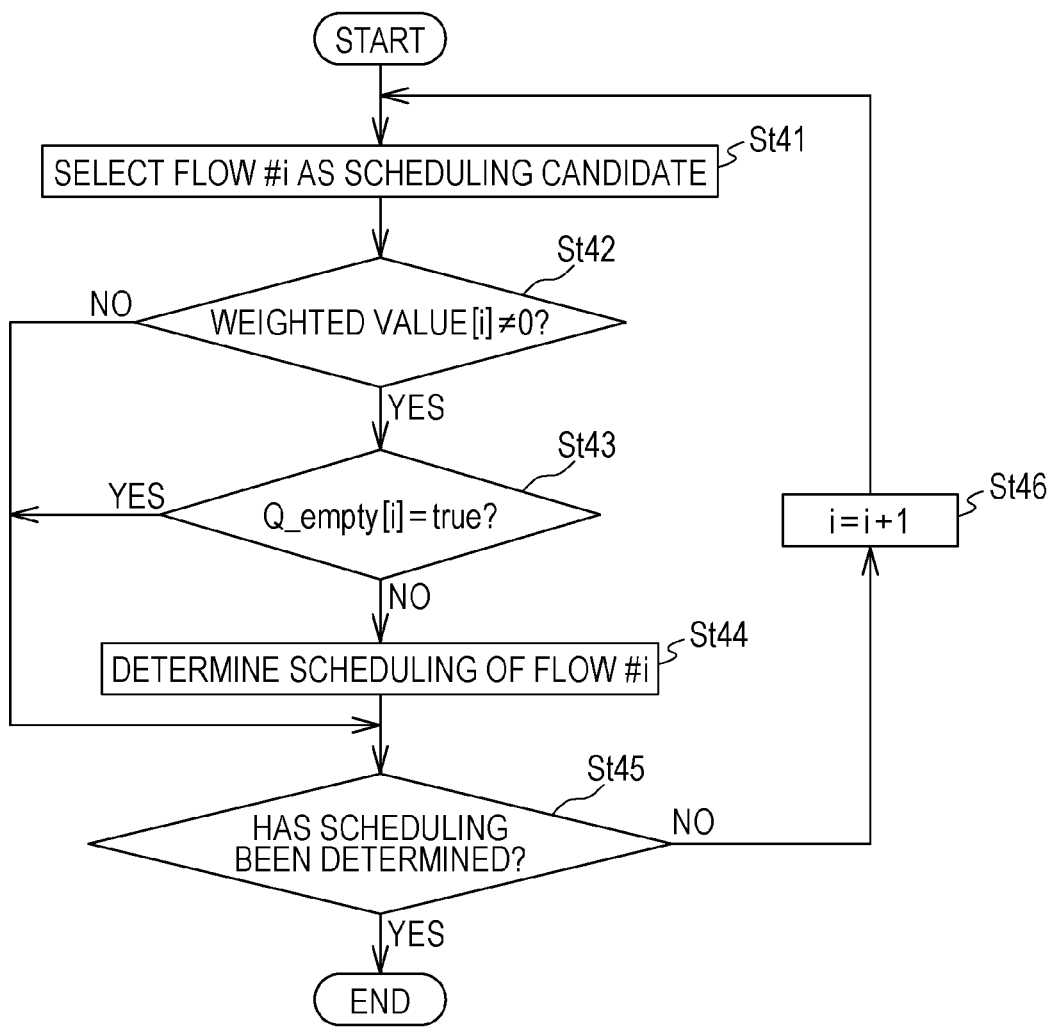
FIG. 20 is a flowchart illustrating an operation of a scheduler in scheduling processing.

FIG. 20 is a flowchart illustrating the operation of the scheduler 2 in the scheduling processing. The credit providing unit 20a selects a flow #i as a candidate for scheduling, or in other words, as a candidate to which credits are to be provided (operation St41).

The credit providing unit 20a then determines whether or not the weighted value[i] of the flow #i is 0 (operation St42). If the weighted value[i] of the flow #i is not 0, (Yes in operation St42), the credit providing unit 20a determines whether or not the accumulation amount flag Q_empty[i] of the flow #i is "true" (operation St43). Note that the determination processing in operation St43 may be carried out prior to the determination processing in operation St42.

If the accumulation amount flag Q_empty[i] of the flow #i is "false" (No in operation St43), the credit providing unit 20a determines scheduling of the flow #i (operation St44). In other words, the credit providing unit 20a provides credits to the queue 11 of the flow #i.

Meanwhile, if the weighted value[i] of the flow #i is 0 (No in operation St42), or if the accumulation amount flag Q_empty[i] of the flow #i is "true" (Yes in operation St43), it is determined whether or not the scheduling has been determined (operation St45). If the scheduling has been determined (Yes in operation St45), the credit providing unit 20a terminates the processing. Meanwhile, if the scheduling has not been determined (No in operation St45), the credit providing unit 20a increments i, which is the flow ID, by one and carries out the processing again from operation St41.

The credit providing unit 20a carries out the determination processing in operation St45 in a similar manner after the processing in operation St44. The scheduler 2 carries out the scheduling processing as described above.

In this manner, in this example, the credit providing unit 20a provides credits to the plurality of queues 11 in accordance with the weighted round robin method. To be more specific, the credit providing unit 20a provides credits to each flow the number of times that is equal to the weighted value thereof in one scheduling cycle.

In addition, the credit providing unit 20a gives a lower priority in providing credits to, among the plurality of queues 11, a queue 11 of which the priority has been lowered than to the other queues 11 regardless of the weighted value of the corresponding flow (or queue 11). Therefore, this example makes it possible not only to reduce the delay in reading out a packet but also to provide credits to each of the queues 11 on the basis of the ratio of the weighted values of the flows in accordance with the weighted round robin method.

Second Embodiment

In the first embodiment, the priority of a queue 11 has been lowered when that queue 11 becomes empty. Alternatively, the priority of a given queue 11 may be adjusted gradually when the accumulation amount of the queue 11 is updated, on the basis of the updated accumulation amount.

FIGS. 21A and 21B illustrate an exemplary operation in a second embodiment. As illustrated in FIGS. 21A and 21B, in the second embodiment, the scheduler 2 includes an accumulation level management unit 213 in place of the accumulation amount flag management unit 211. When an accumulation amount changes as a packet is read out from a queue 11, the accumulation amount counter 130a notifies the accumulation level management unit 213 of a changed accumulation amount Q_length.

The accumulation level management unit 213 manages the level Q_len_LV of the accumulation amount (hereinafter, referred to as "accumulation level") in three levels of, for example, "High", "Middle", and "Low" in accordance with the accumulation amount Q_length. For example, when the accumulation amount Q_length is equal to or greater than 2501 (bytes), the accumulation level management unit 213 makes a determination of a "High" level. When the accumulation amount Q_length falls within a range of 1 to 2500 (bytes), the accumulation level management unit 213 makes a determination of a "Middle" level. When the accumulation amount Q_length is 0 (bytes), the accumulation level management unit 213 makes a determination of a "Low" level.

In addition, the credit providing unit 20a includes a high priority list, a medium priority list, and a low priority list, which correspond to the "High" level, the "Middle" level, and the "Low" level, respectively. The credit providing unit 20a registers each of the flows #0 to #N into one of the aforementioned lists in accordance with the accumulation level Q_len_LV of the corresponding one of the flow #0 to #N.

FIGS. 21A and 21B illustrate, in a time series (times t0 to t5), the accumulation amounts of the accumulation amount counter 130a, the credit count values of the credit counter 131, the virtual accumulation amounts of the virtual accumulation amount counter 210, and the accumulation levels Q_len_LV of the accumulation level management unit 213.

At a time t0, the credit providing unit 20a provides credits to the queue 11 of the flow #0. Thus, the credit count value of the flow #0 becomes 2500 (bytes).

Meanwhile, the credit count value of the flow #1 is −5000 (bytes), and the accumulation amount of the flow #0 and the accumulation amount of the flow #1 are 10001 (bytes) and 5000 (bytes), respectively. The virtual accumulation amount of the flow #0 and the virtual accumulation amount of the flow #1 are 7501 (bytes) and 5000 (bytes), respectively. The accumulation level Q_len_LV of the flow #0 and the accumulation level Q_len_LV of the flow #1 are both "High" in accordance with the standard described above.

At a time t1, a packet of 10001 (bytes) is read out from the queue 11 of the flow #0. Thus, the credit count value of the flow #0 becomes −7501 (bytes), and the accumulation amount of the flow #0 becomes 0 (bytes).

At a time t2, the accumulation amount counter 130a notifies the accumulation level management unit 213 of the changed accumulation amount Q_length[0] (=0 (bytes)) of the flow #0. Thus, the accumulation level management unit 213 updates the accumulation level Q_len_LV of the flow #0 to "Low" in accordance with the standard described above.

Thus, the flow #0 is registered into the low priority list and is given a lower priority in being provided with credits than the queue 11 of the flow #1.

At a time t3, the credit providing unit 20a provides credits to the queue 11 of the flow #1. Thus, the credit count value of the flow #1 becomes −2500 (bytes). Meanwhile, the virtual accumulation amount of the flow #1 becomes 2500 (bytes).

At a time t4, the credit providing unit 20a provides credits to the queue 11 of the flow #1. Thus, the credit count value of the flow #1 becomes 0 (bytes). In addition, the virtual accumulation amount of the flow #1 becomes 0 (bytes).

At a time t5, a packet of 10001 (bytes) of the flow #0 arrives at the queue manager 1. Thus, the accumulation amount of the flow #0 becomes 10001 (bytes).

The distribution unit 10 then notifies the accumulation level management unit 213 of the packet length (10001 (bytes)) of the packet that has arrived. In addition, the accumulation amount counter 130a notifies the accumulation level management unit 213 of the changed accumulation amount Q_length[0] (=10001 (bytes)) of the flow #0. Thus, the accumulation level management unit 213 updates the accumulation level Q_len_LV of the flow #0 to "High" in accordance with the standard described above. Since the accumulation level Q_len_LV of the flow #0 is now "High", the credit providing unit 20a registers the flow #0 into the high priority list.

Figure 22:
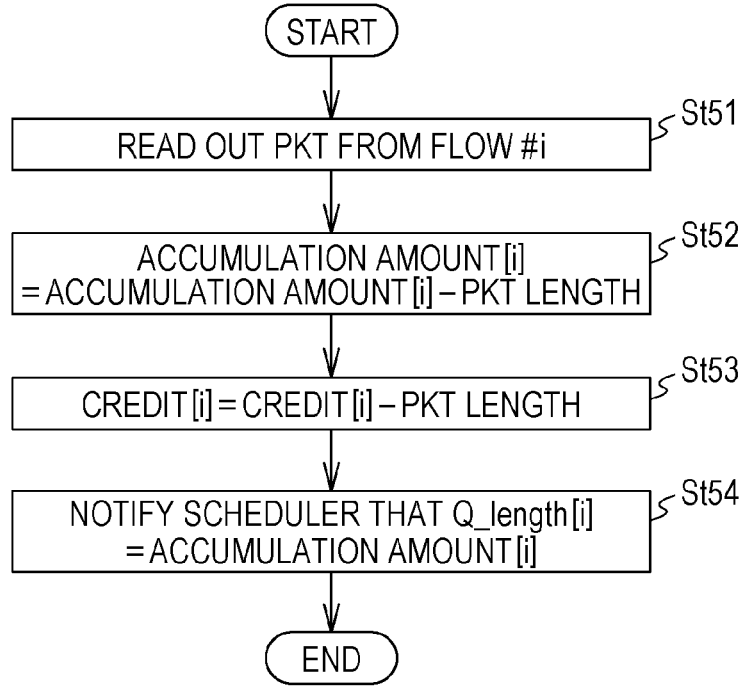
FIG. 22 is a flowchart illustrating an operation of a queue manager when a packet is read out.

The operations of the queue manager 1 and the scheduler 2 according to the second embodiment will now be described. FIG. 22 is a flowchart illustrating the operation of the queue manager 1 when a packet is read out.

When the read processor 12 reads out a packet from the queue 11 of the flow #i (operation St51), the accumulation amount counter 130a subtracts the packet length (PKT length) of the packet that has been read out from the accumulation amount of the flow #i (operation St52). The credit counter 131 then subtracts the packet length (PKT length) of the packet that has been read out from the credit count value of the flow #i (operation St53). Note that the processing in operation St53 may be carried out prior to the processing in operation St52.

The accumulation amount counter 130a then notifies the scheduler 2 of the changed accumulation amount Q_length of the flow #i (operation St54). The queue manager 1 operates as described above when a packet is read out.

Figure 23:
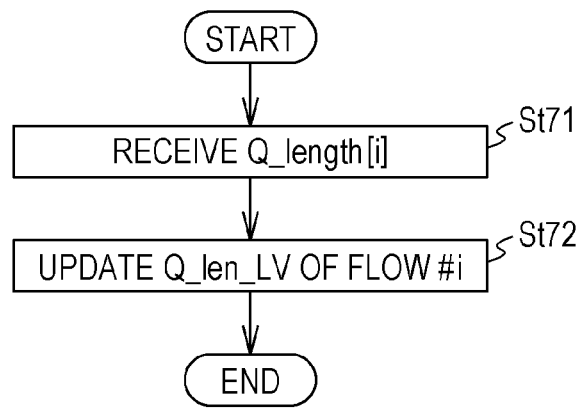
FIG. 23 is a flowchart illustrating an operation of a scheduler when a notification is received from the queue manager.

FIG. 23 is a flowchart illustrating the operation of the scheduler 2 when the scheduler 2 receives a notification from the queue manager 1. When the accumulation level management unit 213 receives the changed accumulation amount Q_length[i] from the accumulation amount counter 130a (operation St71), the accumulation level management unit 213 updates the accumulation level Q_len_LV[i] of the flow #i in accordance with the standard described above (operation St72). Note that when a packet arrives, the accumulation level management unit 213 receives the packet length of that packet of the flow #i from the distribution unit 10 and receives the changed accumulation amount Q_length[i] from the accumulation amount counter 130a. The scheduler 2 operates as described above when the scheduler 2 receives a notification from the queue manager 1.

Figure 24:
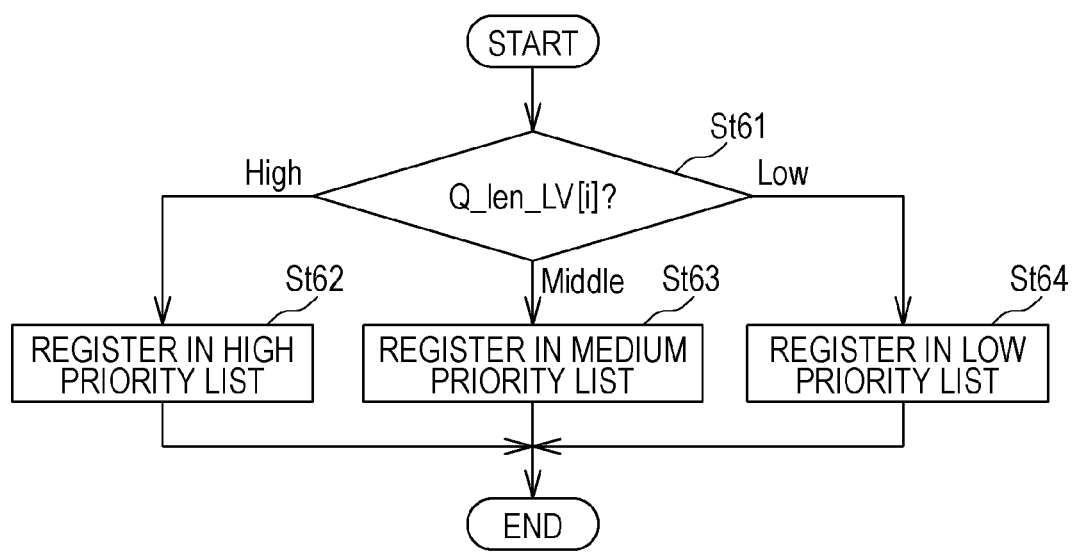
FIG. 24 is a flowchart illustrating an operation of the scheduler in scheduling processing.

FIG. 24 is a flowchart illustrating the operation of the scheduler 2 in the scheduling processing. When it is time to schedule the flow #i, the credit providing unit 20a determines the accumulation level Q_len_LV[i] of the flow #i (operation St61).

When the accumulation level Q_len_LV[i] is "High", the credit providing unit 20a registers the flow #i into the high priority list (operation St62). When the accumulation level Q_len_LV[i] is "Middle", the credit providing unit 20a registers the flow #i into the medium priority list (operation St63). When the accumulation level Q_len_LV[i] is "Low", the credit providing unit 20a registers the flow #i into the low priority list (operation St64). The scheduler 2 operates as described above in the scheduling processing.

In this manner, in the second embodiment, the accumulation amount counter 130a notifies the scheduler 2 of the changed accumulation amount Q_length. The scheduler 2 then adjusts the priority of, among the plurality of queues 11, a queue 11 of which the accumulation amount Q_length has changed, in accordance with the changed accumulation amount Q_length notified from the accumulation amount counter 130a.

To be more specific, the accumulation level management unit 213 compares the accumulation amount Q_length with a predetermined threshold value to thus make a determination of the accumulation level Q_len_LV among the three levels (i.e., "High", "Middle", and "Low"). The credit providing unit 20a then adjusts the priority of the corresponding one of the flows #0 to #N gradually using the three priority lists on the basis of the accumulation level Q_len_LV.

Accordingly, the second embodiment makes it possible to control the order in which credits are provided flexibly in accordance with the accumulation amount of each of the queues 11. Although an example where the accumulation level Q_len_LV and the priority lists are divided into three levels has been described in the second embodiment, the embodiment is not limited thereto, and the accumulation level Q_len_LV and the priority lists may be divided into four or more levels.

Third Embodiment

In the embodiment described above, the priority in providing credits is adjusted in accordance with the change in the accumulation amount. Alternatively, the priority may be adjusted in accordance not only with the change in the accumulation amount but also with the change in the credit count value. As described above, the read processor 12 reads out a packet if the credit count value is greater than 0. Therefore, the evenness among the flows, or in other words, among the queues 11 can be improved by giving a lower priority in providing credits to a queue 11 of which the credit count value is greater than 0 than to the queues 11 of which the credit count values indicate otherwise.

Figure 25:
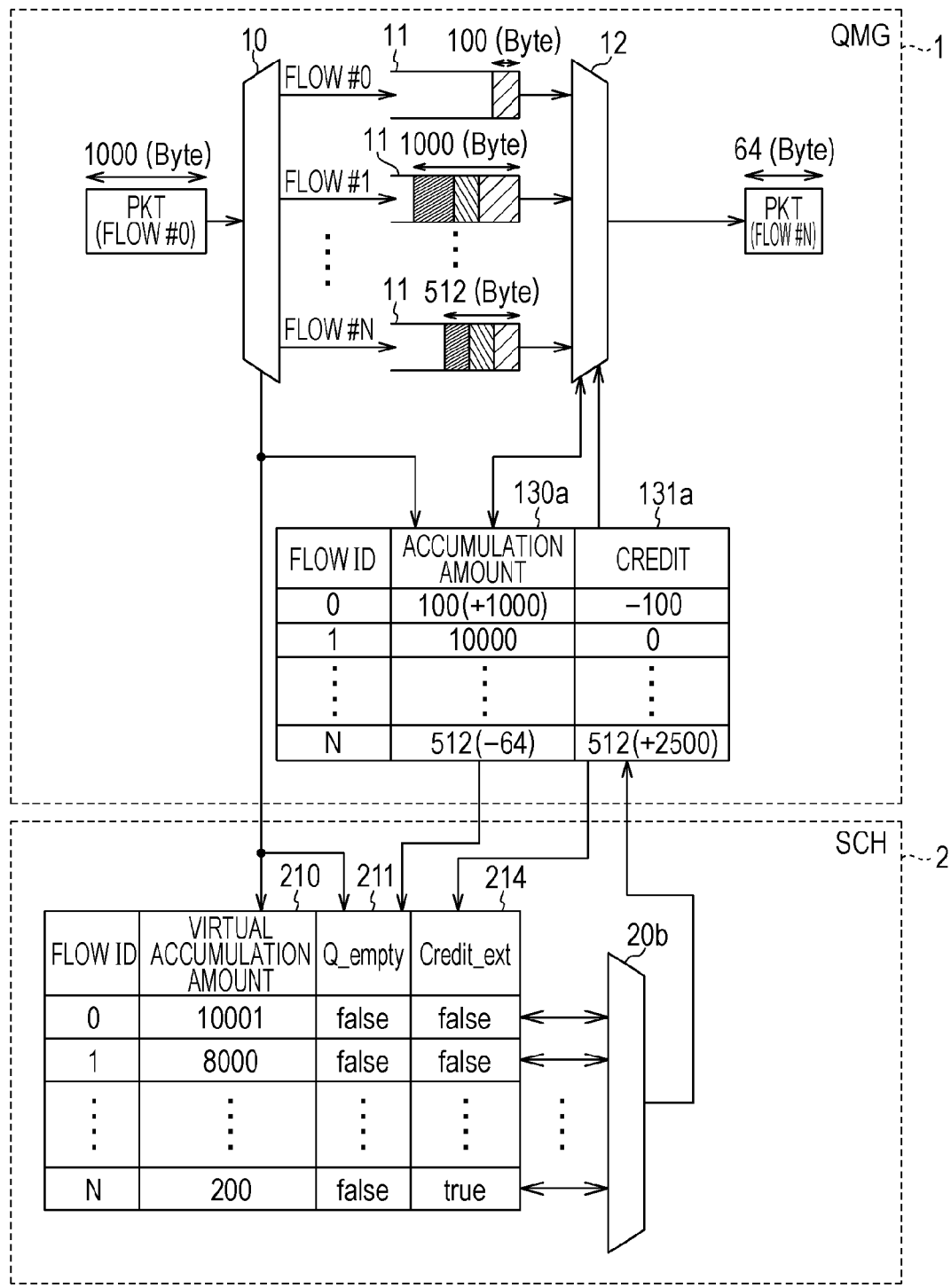
FIG. 25 is a configuration diagram illustrating a functional configuration of an output processor according to a third embodiment.

FIG. 25 is a configuration diagram illustrating the functional configuration of an output processor 913 according to a third embodiment. In FIG. 25, configurations identical to those in FIG. 8 are given identical reference characters, and descriptions thereof will be omitted.

The output processor 913 includes the queue manager 1 and the scheduler 2. The queue manager 1 includes the distribution unit 10, the plurality of queues 11, the read processor 12, the accumulation amount counter 130a, and a credit counter (permissible readout amount counter) 131a. Meanwhile, the scheduler 2 includes the virtual accumulation amount counter 210, the accumulation amount flag management unit 211, a credit flag management unit 214, and a credit providing unit 20b.

The credit counter 131a includes not only the function similar to that of the credit counter 131 of FIG. 8 but also the function of notifying the scheduler 2 of a change in the credits. To be more specific, when a packet is read out by the read processor 12, the credit counter 131a subtracts the packet length of that packet from the credit count value of a corresponding one of the flows #0 to #N and notifies the credit flag management unit 214 of a credit flag Credit_ext.

The credit flag management unit 214 manages the credit flag Credit_ext provided for each of the flows #0 to #N, or in other words, for each queue 11. The credit flag Credit_ext is set to "true" when the credit count value is greater than 0; otherwise, the credit flag Credit_ext is set to "false". The credit flag management unit 214 updates the credit flag Credit_ext of the corresponding queue 11 in response to the notification from the credit counter 131a.

The credit providing unit 20b provides credits to the queues 11 in accordance with the order that is based on the priority of each queue 11, as in the credit providing unit 20a described above. The credit providing unit 20b adjusts the priority in providing credits in accordance with the accumulation amount flag Q_empty as well as the credit flag Credit_ext. An exemplary operation will be described, hereinafter.

Figure 26C:
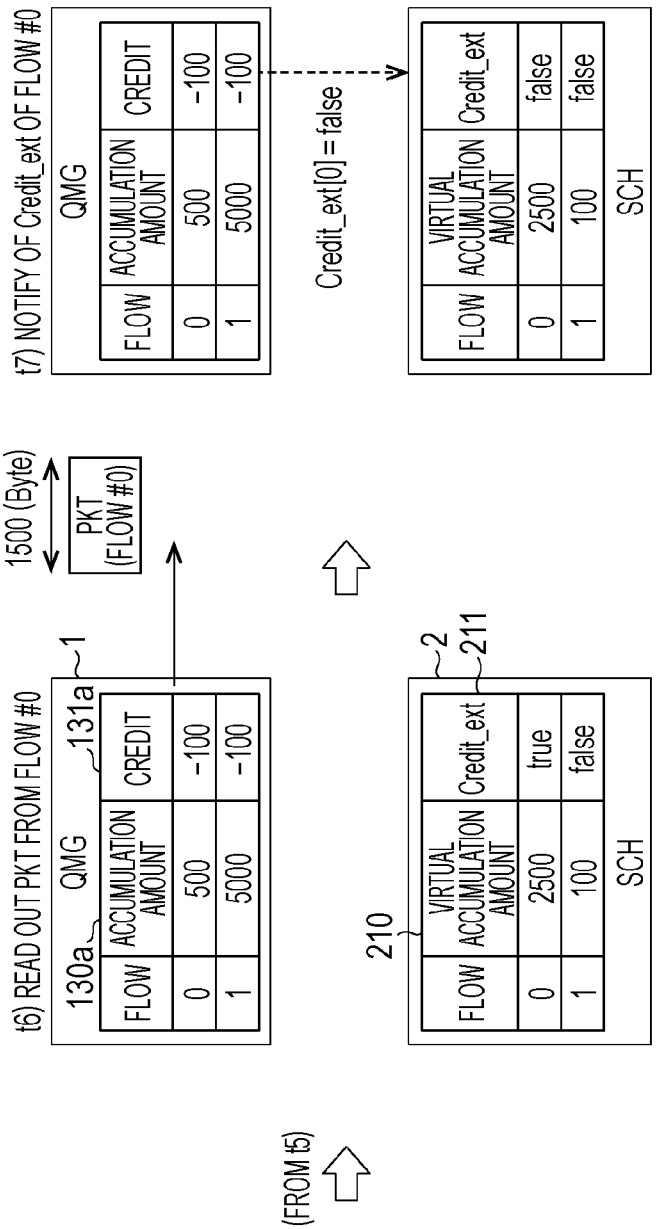
FIG. 26C illustrates an exemplary operation in the third embodiment (Part 3)

FIGS. 26A to 26C illustrate an exemplary operation in the third embodiment. FIGS. 26A to 26C illustrate, in a time series (times t0 to t7), the accumulation amounts of the accumulation amount counter 130a, the credits of the credit counter 131a, the virtual accumulation amounts of the virtual accumulation amount counter 210, and the credit flags Credit_ext of the credit flag management unit 214 in the configuration illustrated in FIG. 25.

At a time t0, the accumulation amounts of the flows #0 and #1 are 2100 (bytes) and 5000 (bytes), respectively, and the credits of the flows #0 and #1 are −1000 (bytes) and −5100 (bytes), respectively. Meanwhile, the virtual accumulation amounts of the flows #0 and #1 are 5000 (bytes) and 5100 (bytes), respectively. The credit flag Credit_ext of each of the flows #0 and #1 is "false" since the credit count value thereof is a negative value.

At a time t1, the credit providing unit 20b provides credits to the queue 11 of the flow #0; thus, the credit count value of the flow #0 becomes 1500 (bytes), and the virtual accumulation amount of the flow #0 becomes 2500 (bytes).

At a time t2, a packet of 100 (bytes) is read out from the queue 11 of the flow #0. Thus, the accumulation amount of the flow #0 becomes 2000 (bytes), and the credit count value of the flow #0 becomes 1400 (bytes).

At a time t3, the credit counter 131a notifies the credit flag management unit 214 that the credit flag Credit_ext[0] of the flow #0 is "true". Thus, the credit flag management unit 214 updates the credit flag Credit_ext[0] to "true". Accordingly, the credit providing unit 20b lowers the priority of the flow #0 and registers the flow #0 into a low priority list. Thus, the queue 11 of the flow #0 is given a lower priority in being provided with credits than the queue 11 of the flow #1.

At a time t4, the credit providing unit 20b provides credits to the queue 11 of the flow #1; thus, the credit count value of the flow #1 becomes −2600 (bytes), and the virtual accumulation amount of the flow #1 becomes 2600 (bytes).

At a time t5, the credit providing unit 20b provides credits to the queue 11 of the flow #1; thus, the credit count value of the flow #1 becomes −100 (bytes), and the virtual accumulation amount of the flow #1 becomes 100 (bytes).

At a time t6, a packet of 1500 (bytes) is read out from the queue 11 of the flow #0. Thus, the accumulation amount of the flow #0 becomes 500 (bytes), and the credit count value of the flow #0 becomes −100 (bytes).

At a time t7, the credit counter 131a notifies the credit flag management unit 214 that the credit flag Credit_ext[0] of the flow #0 is "false". Thus, the credit flag management unit 214 updates the credit flag Credit_ext[0] to "false".

Figure 27:
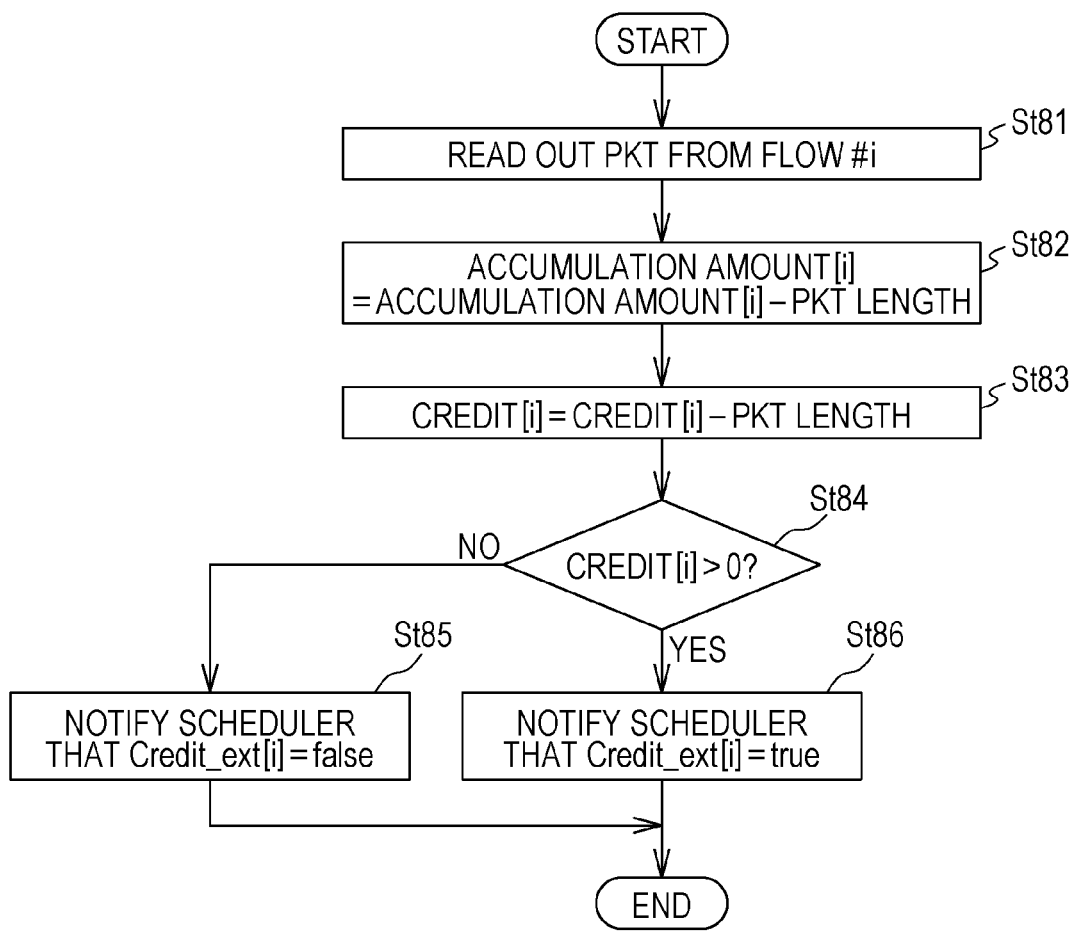
FIG. 27 is a flowchart illustrating an operation of a queue manager when a packet is read out.

The operations of the queue manager 1 and the scheduler 2 according to the third embodiment will now be described. FIG. 27 is a flowchart illustrating the operation of the queue manager 1 when a packet is read out.

When the read processor 12 reads out a packet from the queue 11 of the flow #i (operation St81), the accumulation amount counter 130a subtracts the packet length (PKT length) of the packet that has been read out from the accumulation amount of the flow #i (operation St82). The credit counter 131a then subtracts the packet length (PKT length) of the packet that has been read out from the credit count value of the flow #i (operation St83). Note that the processing in operation St83 may be carried out prior to the processing in operation St82.

The credit counter 131a then determines whether or not the credit count value of the flow #i is greater than 0 (operation St84). If the credit count value is greater than 0 (Yes in operation St84), the credit counter 131a notifies the credit flag management unit 214 that the credit flag Credit_ext[i] of the flow #i is "true".

Meanwhile, if the credit count value is equal to or less than 0 (No in operation St84), the credit counter 131a notifies the credit flag management unit 214 that the credit flag Credit_ext[i] of the flow #i is "false". The queue manager 1 operates as described above when a packet is read out.

In this manner, the credit counter 131a notifies the credit flag management unit 214 of the credit flag Credit_ext when a packet is read out, and thus the credit flag management unit 214 can update the credit flag Credit_ext independently of the timing at which credits are provided. Here, the credit flag management unit 214 may be notified of the credit flag Credit_ext not only when a packet is read out but also when credits are provided.

Figure 28:
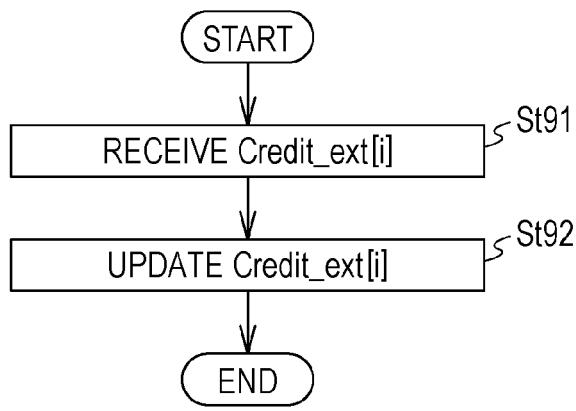
FIG. 28 is a flowchart illustrating an operation of a scheduler when a notification is received from the queue manager.

FIG. 28 is a flowchart illustrating the operation of the scheduler 2 when the scheduler 2 receives a notification from the queue manager 1. When the credit flag management unit 214 receives a notification of the credit flat Credit_ext[i] from the credit counter 131a (operation St91), the credit flag management unit 214 updates the credit flag Credit_ext[i] (operation St92). The scheduler 2 operates as described above when the scheduler 2 receives a notification from the queue manager 1.

Figure 29:
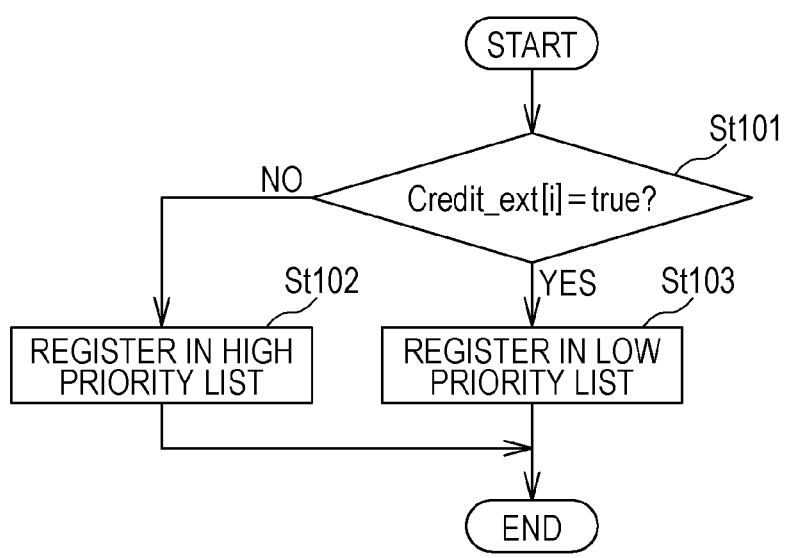
FIG. 29 is a flowchart illustrating an operation of the scheduler in scheduling processing.

FIG. 29 is a flowchart illustrating the operation of the scheduler 2 in the scheduling processing. When it is time to schedule the flow #i, the credit providing unit 20b determines whether or not the credit flag Credit_ext[i] of the flow #i is "true" (operation St101).

If the credit flag Credit_ext[i] of the flow #i is "true" (Yes in operation St101), the credit providing unit 20b registers the flow #i into the low priority list 202 (operation St103). Meanwhile, if the credit flag Credit_ext[i] of the flow #i is "false" (No in operation St101), the credit providing unit 20b registers the flow #i into the high priority list 201 (operation St102). The scheduler 2 operates as described above in the scheduling processing.

In this manner, in the third embodiment, the credit counter 131a notifies the scheduler 2 that the credit count value has become greater than 0. The scheduler 2 then lowers the priority of, among the plurality of queues 11, a queue 11 (flow) of which the credit count value has become greater than 0, in response to the notification from the credit counter 131a.

Thus, the third embodiment makes it possible to give a lower priority in providing credits to a queue 11 of which the credit count value is greater than 0 than to another queue 11 of which the credit count value is equal to or less than 0.

Accordingly, credits are provided preferentially to a queue 11 of which the credit count value is equal to or less than 0, and the standby time of a packet in the queue 11 until the packet is read out by the read processor 12 is reduced. Thus, a delay in reading out a packet is reduced.

Fourth Embodiment

In the embodiment described above, the priority of the queue 11 has been lowered if the credit count value updated when a packet is read out is greater than 0. Alternatively, the priority of a queue 11 may be adjusted gradually in accordance with an updated credit count value.

Figure 30A:
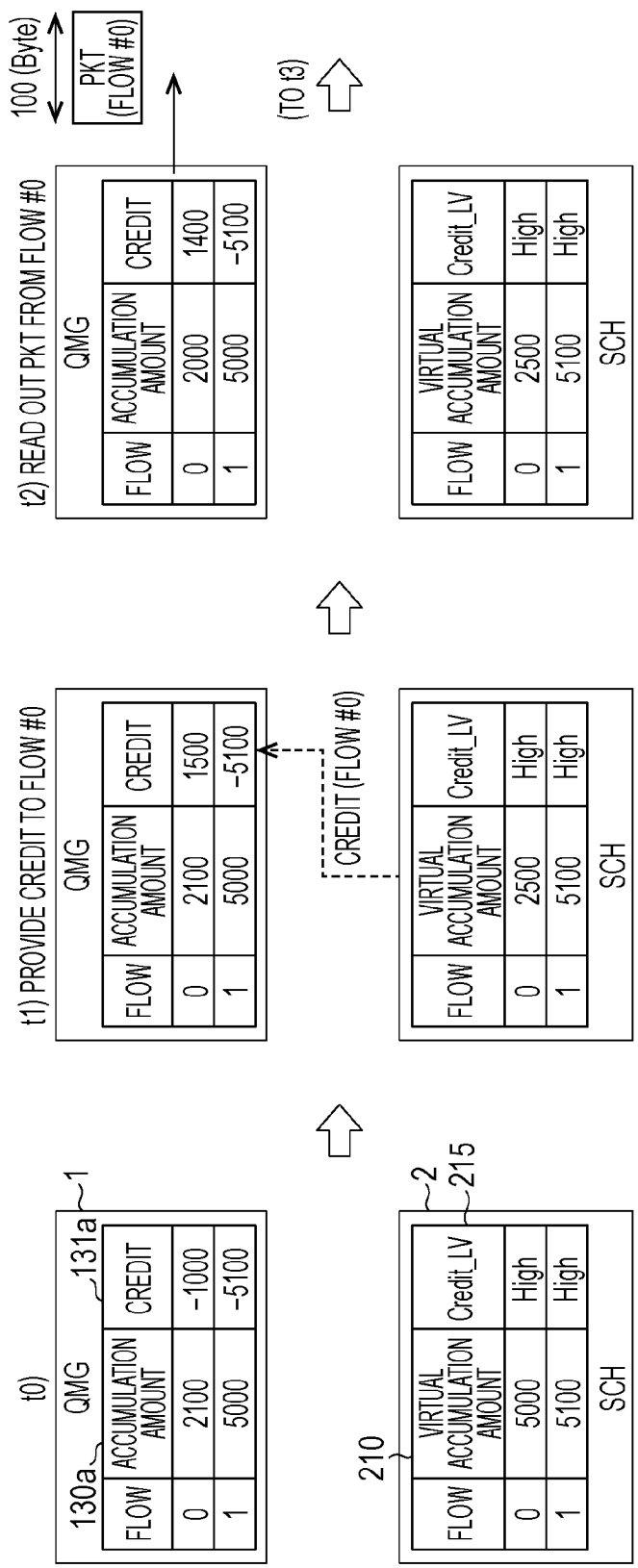
FIG. 30A illustrates an exemplary operation in a fourth embodiment (Part 1)
Figure 30B:
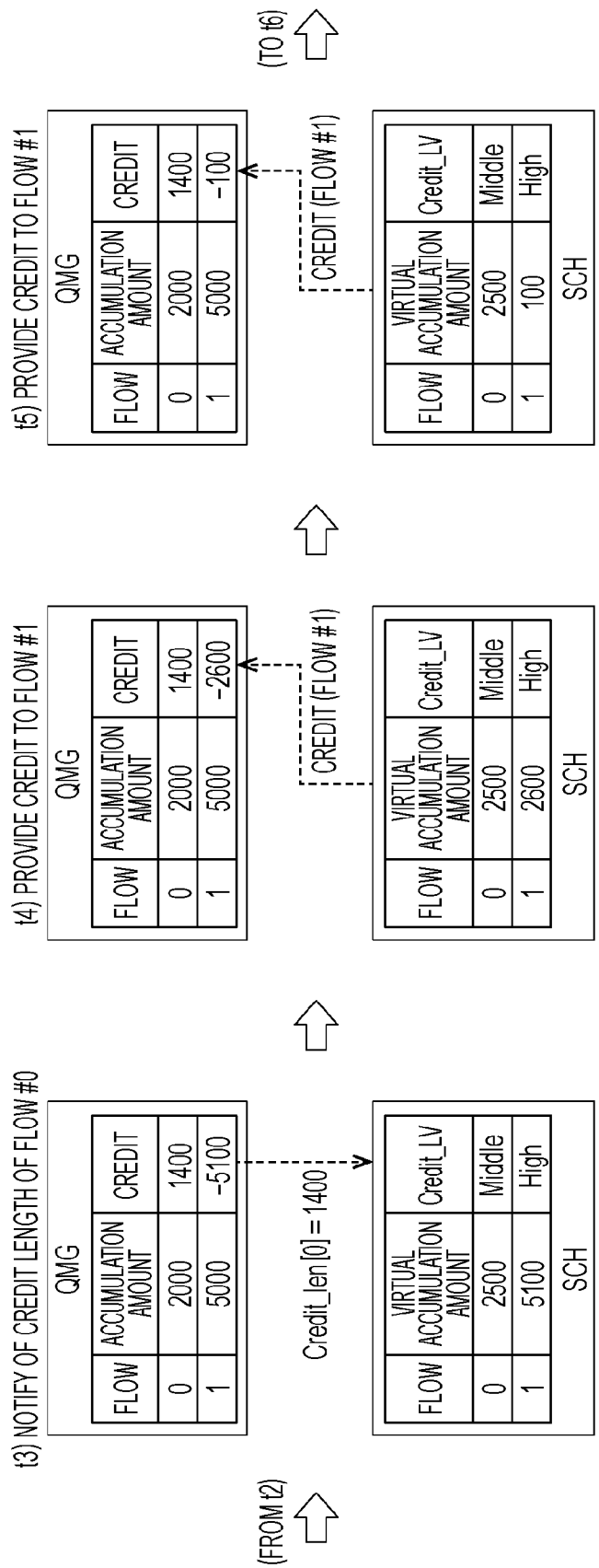
FIG. 30B illustrates an exemplary operation in the fourth embodiment (Part 2)

FIGS. 30A to 30C illustrate an exemplary operation in a fourth embodiment. As illustrated in FIGS. 30A to 30C, in the fourth embodiment, the scheduler 2 includes a credit level management unit 215 in place of the credit flag management unit 214. When a packet is read out from a queue 11 and the credit count value thereof changes, the credit counter 131a notifies the credit level management unit 215 of the changed credit count value Credit_len.

The credit level management unit 215, for example, manages the level Credit_LV of the credit count value (hereinafter, referred to as "credit level") in the three levels of, for example, "High", "Middle", and "Low" in accordance with the credit count value Credit_len. The credit level management unit 215, for example, makes a determination of a "Low" level if the credit count value Credit_len is equal to or greater than 2501 (bytes), and makes a determination of a "Middle" level if the credit count value Credit_len falls within a range of 1 to 2500 (bytes). In addition, the credit level management unit 215 makes a determination of a "High" level if the credit count value Credit_len is equal to or less than 0 (bytes).

The credit providing unit 20b includes a high priority list, a medium priority list, and a low priority list, which correspond to the "High" level, the "Middle" level, and the "Low" level, respectively. The credit providing unit 20b registers each of the flows #0 to #N into one of the aforementioned lists in accordance with the credit level Credit_LV thereof.

FIGS. 30A to 30C illustrate, in a time series (times t0 to t7), the accumulation amounts of the accumulation amount counter 130a, the credit count values of the credit counter 131a, the virtual accumulation amounts of the virtual accumulation amount counter 210, and the credit levels Credit_LV of the credit level management unit 215.

At a time t0, the accumulation amounts of the flows #0 and #1 are 2100 (bytes) and 5000 (bytes), respectively, and the credits of the flows #0 and #1 are −1000 (bytes) and −5100 (bytes), respectively. Meanwhile, the virtual accumulation amounts of the flows #0 and #1 are 5000 (bytes) and 5100 (bytes), respectively. The credit level Credit_LV of each of the flows #0 and #1 is "High" in accordance with the standard described above.

At a time t1, the credit providing unit 20b provides credits to the queue 11 of the flow #0; thus, the credit count value of the flow #0 becomes 1500 (bytes), and the virtual accumulation amount of the flow #0 becomes 2500 (bytes).

At a time t2, a packet of 100 (bytes) is read out from the queue 11 of the flow #0. Thus, the accumulation amount of the flow #0 becomes 2000 (bytes), and the credit count value of the flow #0 becomes 1400 (bytes).

At a time t3, the credit counter 131a notifies the credit level management unit 215 that the credit count value Credit_len[0] of the flow #0 is 1400 (bytes). Thus, the credit level management unit 215 updates the credit level Credit_LV of the flow #0 to "Middle" in accordance with the standard described above. The credit providing unit 20b thus lowers the priority of the flow #0 and registers the flow #0 into the medium priority list. Thus, the queue 11 of the flow #0 is given a lower priority in being provided with credits than the queue 11 of the flow #1.

At a time t4, the credit providing unit 20b provides credits to the queue 11 of the flow #1; thus, the credit count value of the flow #1 becomes −2600 (bytes), and the virtual accumulation amount of the flow #1 becomes 2600 (bytes).

At a time t5, the credit providing unit 20b provides credits to the queue 11 of the flow #1; thus, the credit count value of the flow #1 becomes −100 (bytes), and the virtual accumulation amount of the flow #1 becomes 100 (bytes).

At a time t6, a packet of 1500 (bytes) is read out from the queue 11 of the flow #0. Thus, the accumulation amount of the flow #0 becomes 500 (bytes), and the credit count value of the flow #0 becomes −100 (bytes).

At a time t7, the credit counter 131a notifies the credit level management unit 215 that the credit count value Credit_len[0] of the flow #0 is −100 (bytes). Thus, the credit level management unit 215 updates the credit level Credit_LV of the flow #0 to "High" in accordance with the standard described above.

Figure 31:
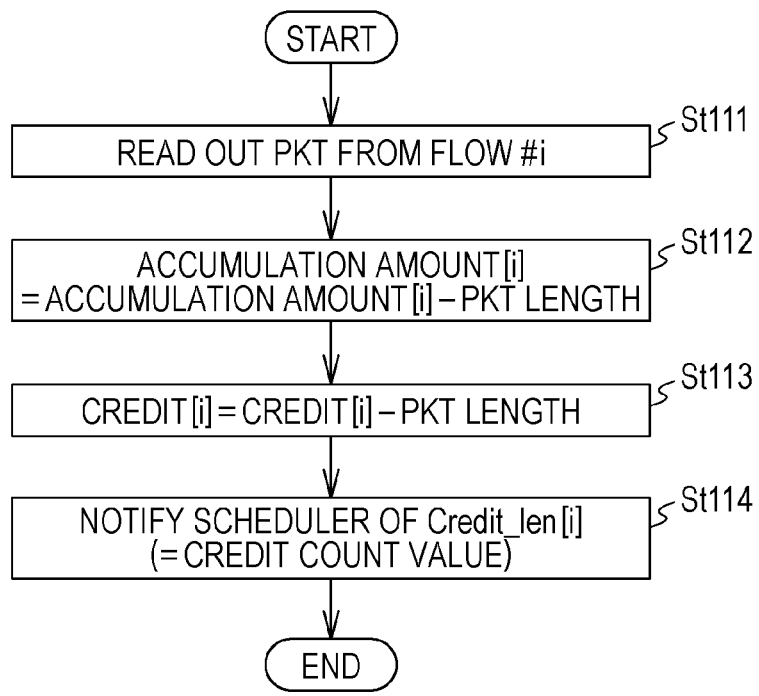
FIG. 31 is a flowchart illustrating an operation of a queue manager when a packet is read out.

The operations of the queue manager 1 and the scheduler 2 according to the fourth embodiment will now be described. FIG. 31 is a flowchart illustrating the operation of the queue manager 1 when a packet is read out.

When the read processor 12 reads out a packet from the queue 11 of the flow #i (operation St111), the accumulation amount counter 130a subtracts the packet length (PKT length) of the packet that has been read out from the accumulation amount of the flow #i (operation St112). The credit counter 131a then subtracts the packet length (PKT length) of the packet that has been read out from the credit count value of the flow #i (operation St113). Note that the processing in operation St113 may be carried out prior to the processing in operation St112.

The credit counter 131a then notifies the scheduler 2 of the changed credit count value Credit_len[i] of the flow #i (operation St114). The queue manager 1 operates as described above when a packet is read out.

Figure 32:
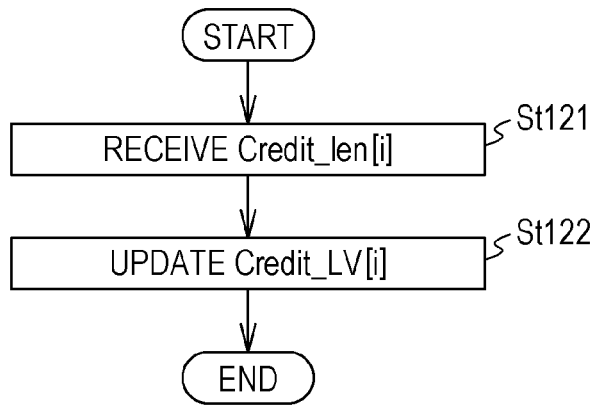
FIG. 32 is a flowchart illustrating an operation of a scheduler when a notification is received from the queue manager.

FIG. 32 is a flowchart illustrating the operation of the scheduler 2 when the scheduler 2 receives a notification from the queue manager 1. When the credit level management unit 215 receives the changed credit count value Credit_len[i] from the credit counter 131a (operation St121), the credit level management unit 215 updates the credit level Credit_LV[i] of the flow #i in accordance with the standard described above (operation St122). The scheduler 2 operates as described above when the scheduler 2 receives a notification from the queue manager 1.

Figure 33:
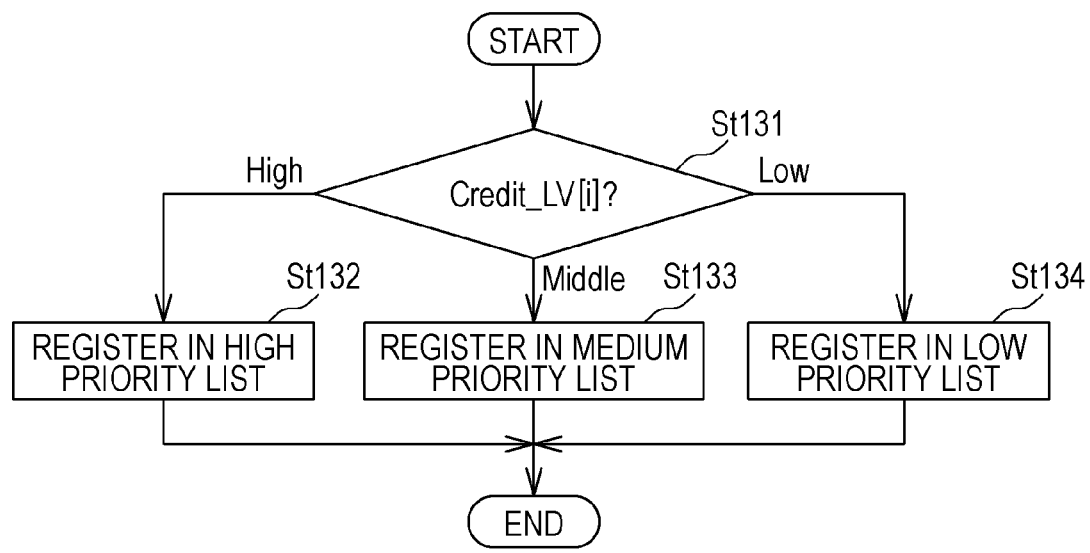
FIG. 33 is a flowchart illustrating an operation of the scheduler in scheduling processing.

FIG. 33 is a flowchart illustrating the operation of the scheduler 2 in the scheduling processing. When it is time to schedule the flow #i, the credit providing unit 20b determines the credit level Credit_LV[i] of the flow #i (operation St131).

When the credit level Credit_LV[i] is "High", the credit providing unit 20b registers the flow #i into the high priority list (operation St132). When the credit level Credit_LV[i] is "Middle", the credit providing unit 20b registers the flow #i into the medium priority list (operation St133). When the credit level Credit_LV[i] is "Low", the credit providing unit 20b registers the flow #i into the low priority list (operation St134). The scheduler 2 operates as described above in the scheduling processing.

In this manner, in the fourth embodiment, the credit counter 131a notifies the scheduler 2 of the changed credit count value Credit_len. The scheduler 2 then adjusts the priority of, among the plurality of queues 11, a queue 11 of which the credit count value Credit_len has changed, in accordance with the changed credit count value Credit_len notified from the credit counter 131a.

To be more specific, the credit level management unit 215 compares the credit count value Credit_len with a predetermined threshold value to thus make a determination of the credit level Credit_LV among the three levels (i.e., "High", "Middle", and "Low"). The credit providing unit 20b then adjusts the priority of a corresponding one of the flows #0 to #N gradually using the three priority lists on the basis of the credit level Credit_LV.

Thus, the fourth embodiment makes it possible to control the order in which credits are provided flexibly in accordance with the accumulation amount of each of the queues 11. Although an example where the credit level Credit_LV and the priority lists are divided into three levels has been described in the fourth embodiment, the embodiment is not limited thereto, and the credit level Credit_LV and the priority lists may be divided in four or more levels.

Fifth Embodiment

As described above, the read processor 12 reads out a packet from a queue 11 of which the credit count value is greater than 0. At this time, if the packet length (data amount) of the packet that has been read out is greater than the credit count value, the credit count value falls below 0 (i.e., becomes a negative value) as the packet length is subtracted therefrom. Then, as described with reference to FIGS. 5A to 6B, the scheduler 2 provides credits to a queue 11 a plurality of times so that the virtual accumulation amount thereof becomes 0 as long as the virtual accumulation amount is greater than 0, even if the credit count value is a negative value.

Here, when the accumulation amount becomes 0 (bytes), the credit count value may be forced to become 0 (bytes), and the absolute value of the credit count value may be subtracted from the virtual accumulation amount so as to cancel out each other. Thus, the frequency at which credits are provided may be reduced.

Figure 34:
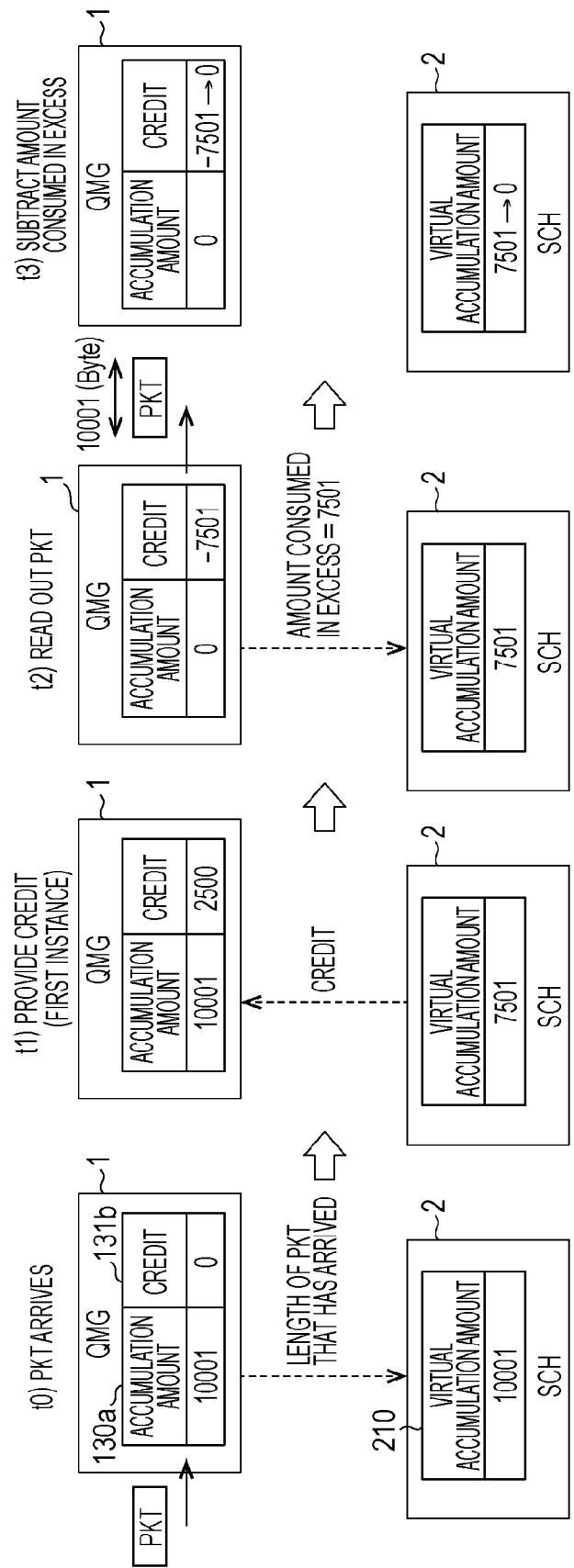
FIG. 34 illustrates an exemplary operation in a fifth embodiment.

FIG. 34 illustrates an exemplary operation in a fifth embodiment. A credit counter 131b includes not only the function similar to that of the credit counter 131 described above but also the function of notifying a virtual accumulation amount counter 210a of an amount consumed in excess when the accumulation amount is 0 (bytes). The amount consumed in excess corresponds to an absolute value of the credit count value when the credit count value is less than 0, or in other words, when the credit count value is a negative value. Upon being notified of the amount consumed in excess, the virtual accumulation amount counter 210a sets the corresponding credit count value to 0 (bytes).

In addition, the virtual accumulation amount counter 210a includes not only the function similar to that of the virtual accumulation amount counter 210 described above but also the function of subtracting the amount consumed in excess from the virtual accumulation amount of a corresponding one of the flows #0 to #N upon being notified from the credit counter 131b. Thus, the virtual accumulation amount is cancelled out and becomes 0 (bytes).

FIG. 34 illustrates, in a time series (times t0 to t3), the accumulation amounts of the accumulation amount counter 130a, the credit count values of the credit counter 131b, and the virtual accumulation amounts of the virtual accumulation amount counter 210a.

At a time t0, a packet of 10001 (bytes) arrives at the queue manager 1, and thus the accumulation amount and the virtual accumulation amount each become 10001 (bytes). Meanwhile, the credit count value is 0 (bytes). The flow ID may be any one of #0 to #N.

At a time t1, the scheduler 2 provides credits of 2500 (bytes) to the queue manager 1. Thus, the credit count value becomes 2500 (bytes), and the virtual accumulation amount becomes 7501 (bytes).

At a time t2, a packet of 10001 (bytes) is read out from the queue manager 1. Thus, the credit count value becomes −7501 (bytes), and the accumulation amount becomes 0 (bytes).

The credit counter 131b notifies the scheduler 2 that the amount consumed in excess is 7501 (bytes) since the accumulation amount is 0 (bytes) and the credit count value is a negative value.

At a time t3, the credit counter 131b sets the credit count value to 0 (bytes). In addition, in response to the notification from the credit counter 131b, the virtual accumulation amount counter 210a subtracts the amount consumed in excess from the virtual accumulation amount so as to set the virtual accumulation amount to 0. Thus, with the fifth embodiment, the second to fifth instances of providing credits are omitted as can be understood by comparing the fifth embodiment with the examples illustrated in FIGS. 5A to 6B.

Figure 35:
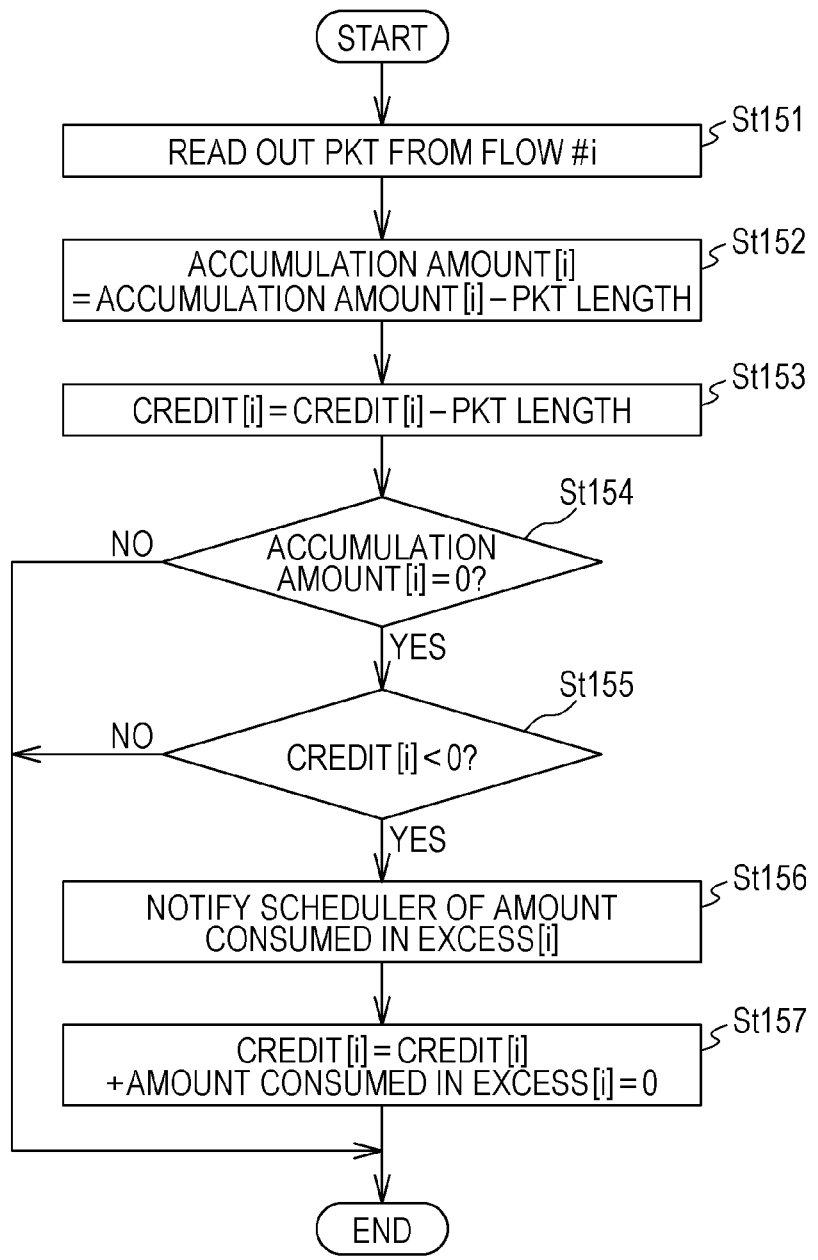
FIG. 35 is a flowchart illustrating an operation of a queue manager when a packet is read out.

The operations of the queue manager 1 and the scheduler 2 according to the fifth embodiment will now be described. FIG. 35 is a flowchart illustrating the operation of the queue manager 1 when a packet is read out.

When the read processor 12 reads out a packet from the queue 11 of the flow #i (operation St151), the accumulation amount counter 130a subtracts the packet length (PKT length) of the packet that has been read out from the accumulation amount of the flow #i (operation St152). The credit counter 131b then subtracts the packet length (PKT length) of the packet that has been read out from the credit count value of the flow #i (operation St153). Note that the processing in operation St153 may be carried out prior to the processing in operation St152.

Subsequently, the credit counter 131b determines whether or not the accumulation amount of the flow #i is 0 (operation St154). If the accumulation amount is not 0 (No in operation St154), the processing is terminated. Meanwhile, if the accumulation amount is 0 (Yes in operation St154), the credit counter 131b determines whether or not the credit count value of the flow #i is less than 0 (i.e., whether or not the credit count value is a negative value) (operation St155).

If the credit count value is equal to or greater than 0 (No in operation St155), the credit counter 131b terminates the processing. Meanwhile, if the credit count value is less than 0 (Yes in operation St155), the credit counter 131b notifies the virtual accumulation amount counter 210a of the absolute value of the credit count value as the amount consumed in excess (operation St156). Note that the processing in operation St155 may be carried out prior to the processing in operation St154.

The credit counter 131b then adds the amount consumed in excess to the credit count value of the flow #i so as to set the credit count value of the flow #i to 0 (bytes) (operation St157). The queue manager 1 operates as described above when a packet is read out.

Figure 36:
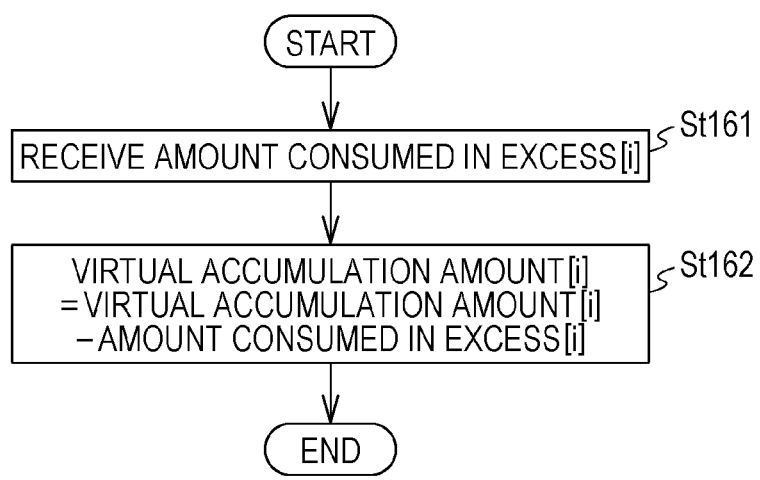
FIG. 36 is a flowchart illustrating an operation of a scheduler when a notification is received from the queue manager.

FIG. 36 is a flowchart illustrating the operation of the scheduler 2 when the scheduler 2 receives a notification from the queue manager 1. Upon receiving the amount consumed in excess from the credit counter 131b (operation St161), the virtual accumulation amount counter 210a subtracts the amount consumed in excess from the virtual accumulation amount (operation St162). The scheduler 2 operates as described above when the scheduler 2 receives a notification from the queue manager 1.

In this manner, in the fifth embodiment, when the accumulation amount of a queue 11 becomes 0 and when the credit count value of that queue 11 falls below 0, the credit counter 131b notifies the virtual accumulation amount counter 210a of the credit count value of that queue 11 as the amount consumed in excess. In addition, the credit counter 131b sets the credit count value of the corresponding queue 11 to 0. Furthermore, when the virtual accumulation amount counter 210a is notified of the credit count value from the credit counter 131b, the virtual accumulation amount counter 210a subtracts the amount consumed in excess from the virtual accumulation amount.

Thus, the credit counter 131b can set the credit count value to 0 at once without the credit providing unit 20a providing credits over a plurality of times. In addition, since the credit counter 131b notifies the virtual accumulation amount counter 210a of the amount consumed in excess, which is an absolute value of the credit count value, and since the virtual accumulation amount counter 210a subtracts the amount consumed in excess from the virtual accumulation amount, provision of credits to the corresponding queue 11 is omitted.

Sixth Embodiment

Figure 37:
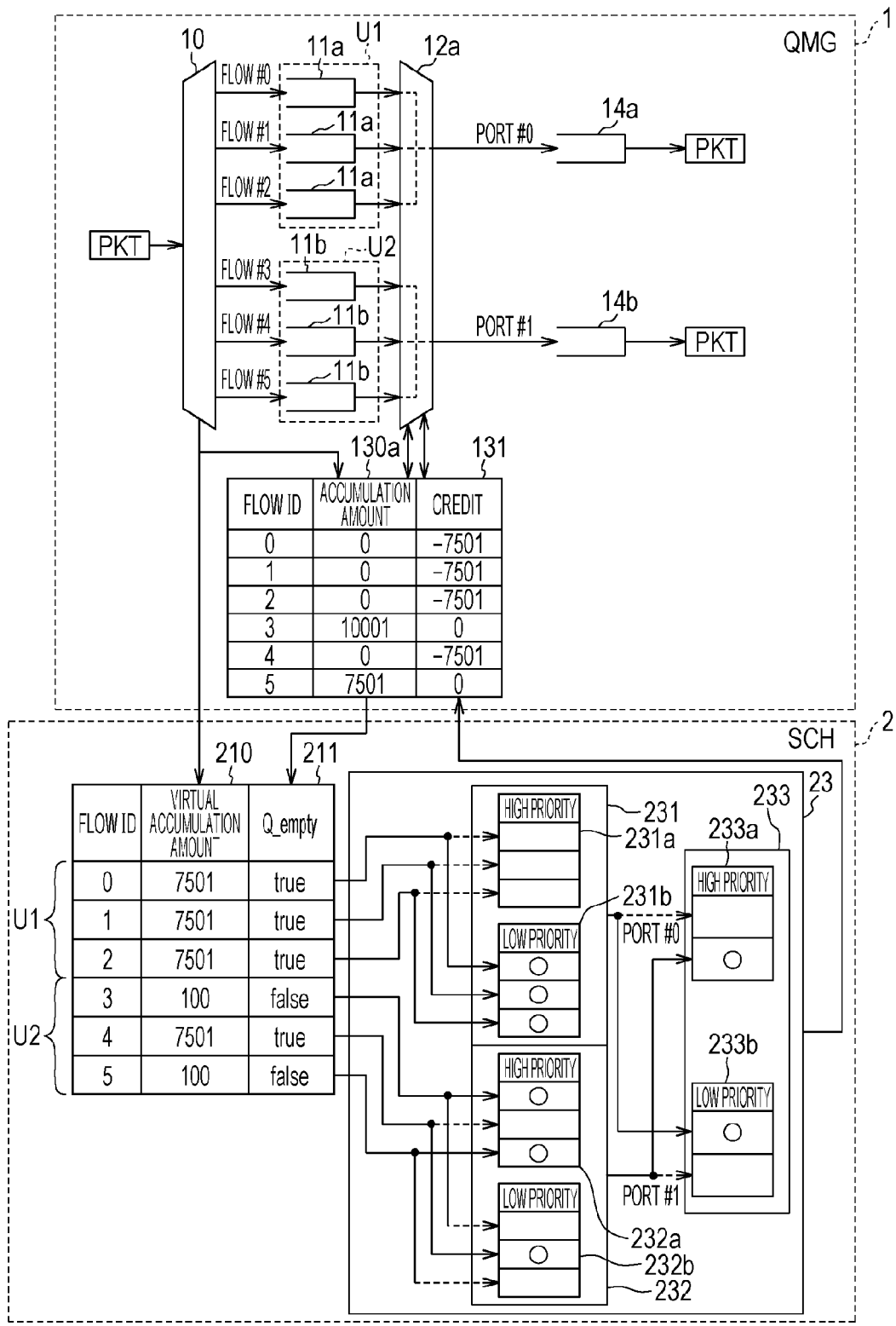
FIG. 37 is a configuration diagram illustrating a functional configuration of an output processor according to a sixth embodiment.

The content described thus far can be applied to a hierarchical queue configuration in which a plurality of low-side queues are divided into a plurality of groups and high-side queues are provided so as to correspond to the respective groups. FIG. 37 is a configuration diagram illustrating a functional configuration of an output processor 913 according to a sixth embodiment. In FIG. 37, configurations identical to those in FIG. 8 are given identical reference characters, and descriptions thereof will be omitted.

The output processor 913 includes the queue manager 1 and the scheduler 2. The queue manager 1 includes the distribution unit 10, a plurality of low-side queues 11a and 11b, a plurality of high-side queues 14a and 14b, a read processor 12a, the accumulation amount counter 130a, and the credit counter 131.

The plurality of low-side queues 11a and 11b are divided into a first group U1 and a second group U2. The first group U1 includes the low-side queues 11a of the flows #0 to #2, and the second group U2 includes the low-side queues 11b of the flows #3 to #5.

The read processor 12a reads out a packet from one of the low-side queues 11a and 11b while consuming credits. The read processor 12a then outputs the packet that has been read out to one of the high-side queues 14a and 14b which corresponds to the low-side queue 11a or 11b from which the packet has been read out. Note that other functions of the read processor 12a are the same as those of the read processor 12 of the above-described embodiments.

The high-side queues 14a and 14b are provided so as to correspond to distinct ports #0 and #1, respectively. The high-side queue 14a of the port #0 accumulates packets read out from the low-side queues 11a of the first group U1, and the high-side queue 14b of the port #1 accumulates packets read out from the low-side queues 11b of the second group U2. Note that the ports #0 and #1 are the optical receivers/transmitters 910 illustrated in FIG. 2.

Meanwhile, the scheduler 2 includes the virtual accumulation amount counter 210, the accumulation amount flag management unit 211, and a credit providing unit 23. When the credit providing unit 23 provides credits to the plurality of low-side queues 11a and 11b, the credit providing unit 23 first selects one of the high-side queues 14a and 14b in accordance with the order that is based on the priority (high-side priority) of the high-side queues 14a and 14b. The credit providing unit 23 then provides credits to one of the low-side queues 11a and 11b of the respective groups U1 and U2 which corresponds to the selected one of the high-side queues 14a and 14b in accordance with the order that is based on the priority of the low-side queues 11a and 11b.

The credit providing unit 23 includes a first processor 231 and a second processor 232. The first processor 231 selects one of the low-side queues 11a from the first group U1 to which credits are to be provided, and the second processor 232 selects one of the low-side queues 11b from the second group U2 to which credits are to be provided. The first processor 231 includes a high priority list 231a and a low priority list 231b, and the second processor 232 includes a high priority list 232a and a low priority list 232b.

Similarly to the credit providing unit 20a of the first embodiment, the first processor 231 registers one of the flows #0 to #2 into one of the high priority list 231a and the low priority list 231b in accordance with the accumulation amount flag Qempty of the corresponding low-side queue 11a, and the second processor 232 registers one of the flows #3 to #5 into one of the high priority list 232a and the low priority list 232b in accordance with the accumulation amount flag Q_empty of the corresponding low-side queue 11b. Note that the registration state is indicated by an open circle.

The credit providing unit 23 further includes a third processor 233 that selects a group from the first group U1 and the second group U2 to which credits are to be provided. In other words, the third processor 233 selects one of the high-side queue 14a of the port #0 and the high-side queue 14b of the port #1.

The third processor 233 selects one of the high-side queues 14a and 14b in accordance with the order that is based on the priority of each of the high-side queues 14a and 14b. The third processor 233 includes a high priority list 233a and a low priority list 233b for distinguishing the priority levels. Each of the ports #0 and #1 of the respective high-side queues 14a and 14b is registered into one of the high priority list 233a and the low priority list 233b. Note that the registration state is indicated by an open circle.

When the accumulation amounts of all of the low-side queues 11a or 11b included in either of the first group U1 and the second group U2 become 0 (bytes), the third processor 233 lowers the priority of one of the high-side queues 14a and 14b which corresponds to that group. To be more specific, when the accumulation amount flags Q_empty of all of the low-side queues 11a or 11b included in either of the first group U1 and the second group U2 become "true", the third processor 233 lowers the priority of one of the high-side queues 14a and 14b which corresponds to that group.

In the example illustrated in FIG. 37, the accumulation amount of each of the low-side queues 11a in the first group U1 is 0 (bytes), and thus the accumulation amount flag Q_empty thereof is "true". Thus, the first processor 231 registers the flows #0 to #2 into the low priority list 231b, and the third processor 233 registers the port #0 into the low priority list 233b.

Meanwhile, since only the accumulation amount of the low-side queue 11b of the flow #4 is 0 (bytes) in the second group U2, the accumulation amount flag Q_empty of the flow #4 is "true", and the accumulation amount flags Q_empty of the flows #3 and #5 are "false". Thus, the second processor 232 registers only the flow #4 into the low priority list 232b, and the third processor 233 registers the port #1 into the high priority list 233a. In other words, as long as at least one accumulation amount flag Q_empty is "false" in each of the groups U1 and U2, the third processor 233 registers the port #0 or #1 which corresponds to that group into the high priority list 233a.

Thus, credits are provided in the example illustrated in FIG. 37 in the order of, for example, the flow #3 (port #1), the flow #5 (port #1), the flow #4 (port #1), the flow #0 (port #0), the flow #1 (port #1), and the flow #2 (port #0). Among these, the accumulation amount flag Q_empty of each of the last four flows (flows #4, #0, #1, and #2) is "true". In other words, in the sixth embodiment, an influence caused by the accumulation amount flags Q_empty of the low-side queues 11a and 11b can be given to the high-side queues 14a and 14b.

Meanwhile, if it is the case that the third processor 233 simply selects the two high-side queues 14a and 14b (ports #0 and #1) in an alternating manner regardless of the accumulation amount flag Q_empty, credits are provided in the order of, for example, the flow #0 (port #0), the flow #3 (port #1), the flow #1 (port #0), the flow #5 (port #1), the flow #2 (port #0), and the flow #4 (port #1). Among these, the accumulation amount flag Q_empty of each of the first, third, fifth, and sixth flows #0, #1, #2, and #4 is "true". In other words, in this example, credits are provided to the low-side queue 11a of the flow #0 of which the accumulation amount is 0 prior to the other low-side queues 11b of the flows #3 and #5 of which the accumulation amounts are each greater than 0.

Figure 38:
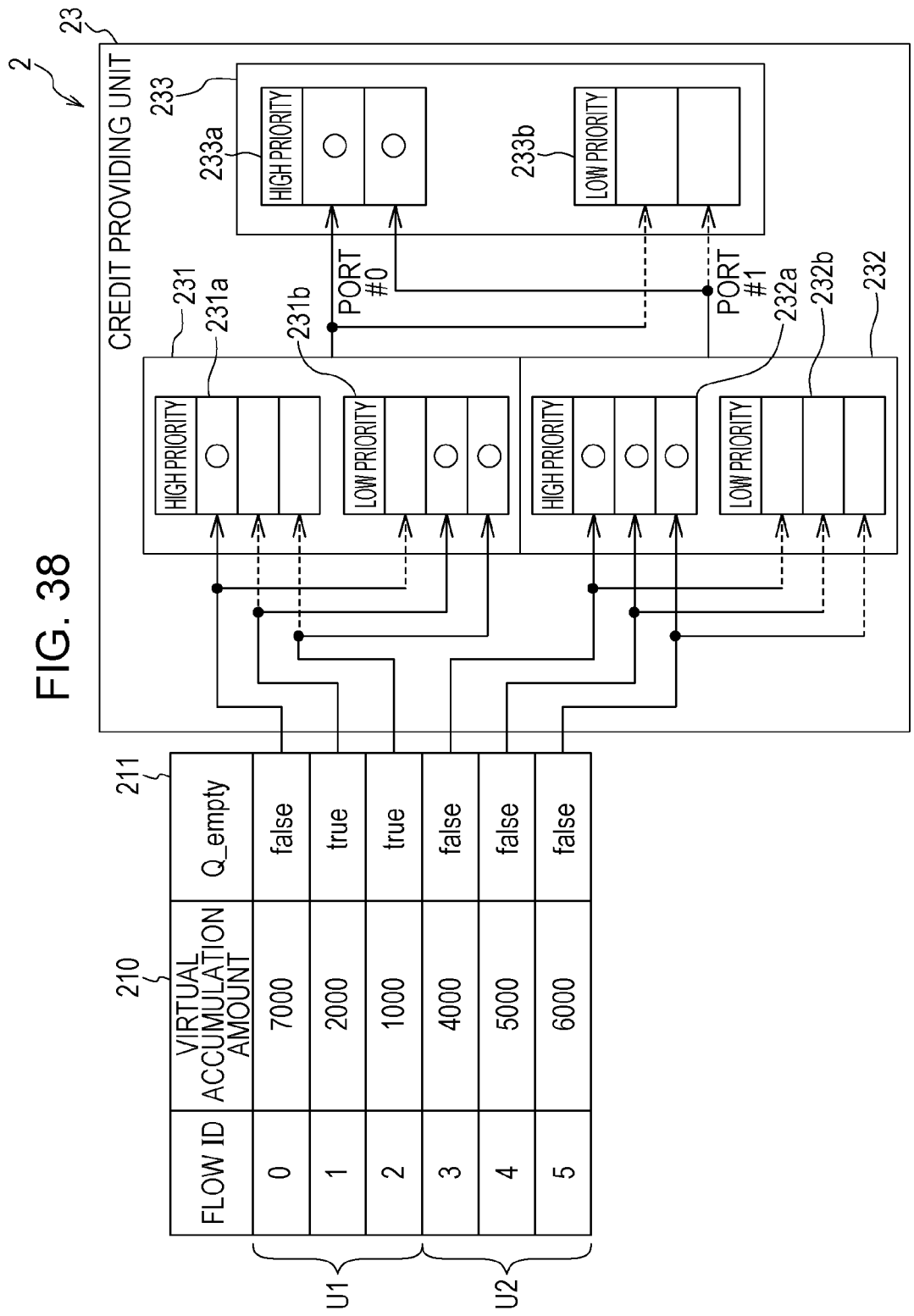
FIG. 38 illustrates an exemplary operation in the sixth embodiment.

FIGS. 38 to 41 illustrate an exemplary operation in the sixth embodiment in a time series. As illustrated in FIG. 38, the virtual accumulation amounts of the flows #0 to #5 are set to 7000 (bytes), 2000 (bytes), 1000 (bytes), 4000 (bytes), 5000 (bytes), and 6000 (bytes), respectively. The accumulation amount flag Q_empty of each of the flows #1 and #2 is "true", and the accumulation amount flag Q_empty of each of the flows #0, and #3 to #5 is "false".

At this point, at least one accumulation amount flag Q_empty in each of the groups U1 and U2 is "false", and thus the ports #0 and #1 are both registered in the high priority list 233a. In addition, the flow #0 is registered in the high priority list 231a, and the flows #1 and #2 are registered in the low priority list 231b. The flows #3 to #5 are registered in the high priority list 232a.

Figure 39:
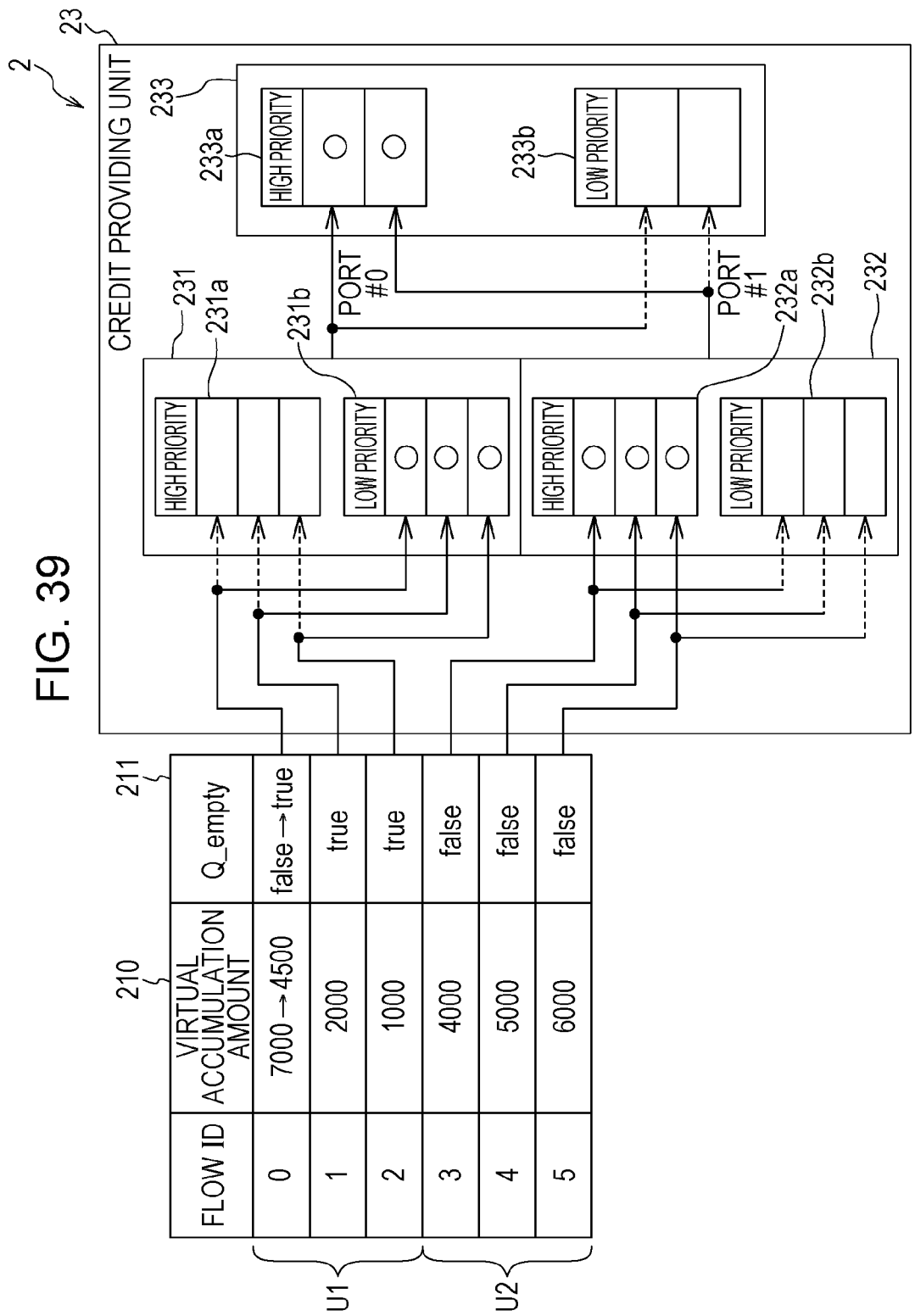
FIG. 39 illustrates an exemplary operation in the sixth embodiment.

When credits are provided to the low-side queue 11a of the flow #0 and a packet is read out therefrom so as to bring the accumulation amount of the low-side queue 11a of the flow #0 to 0 (bytes), as illustrated in FIG. 39, the accumulation amount flag Q_empty of the flow #0 becomes "true". Therefore, the first processor 231 registers the flow #0 into the low priority list 231b. Note that the virtual accumulation amount of the flow #0 becomes 4500 (bytes).

Figure 40:
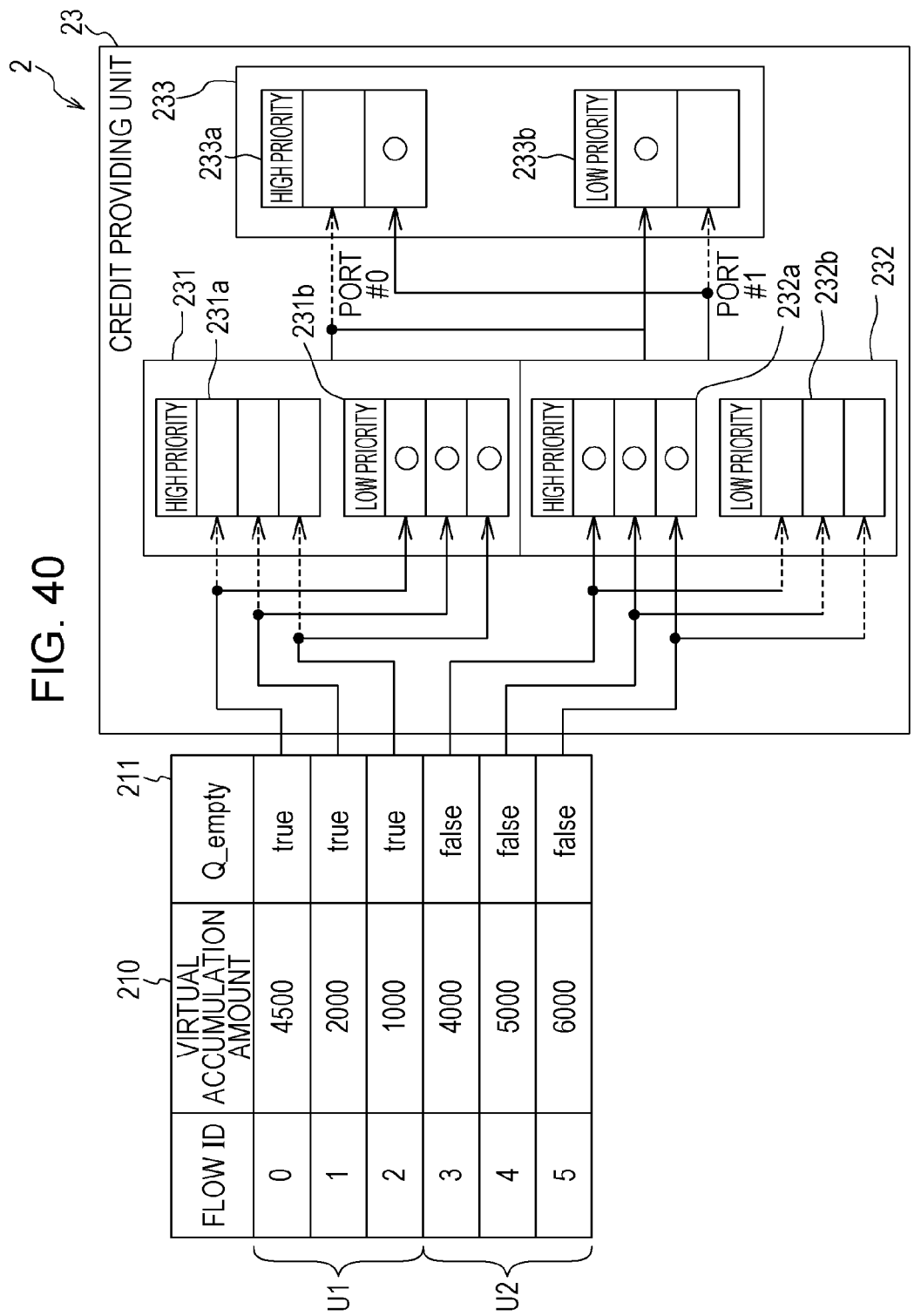
FIG. 40 illustrates an exemplary operation in the sixth embodiment.

As illustrated in FIG. 40, all of the accumulation amount flags Q_empty in the first group U1 have become "true", and thus the third processor 233 registers the port #0, which corresponds to the first group U1, into the low priority list 233b. Thus, the third processor 233 gives a lower priority in selecting the high-side queue 14a of the port #0 than the high-side queue 14b of the port #1.

Figure 41:
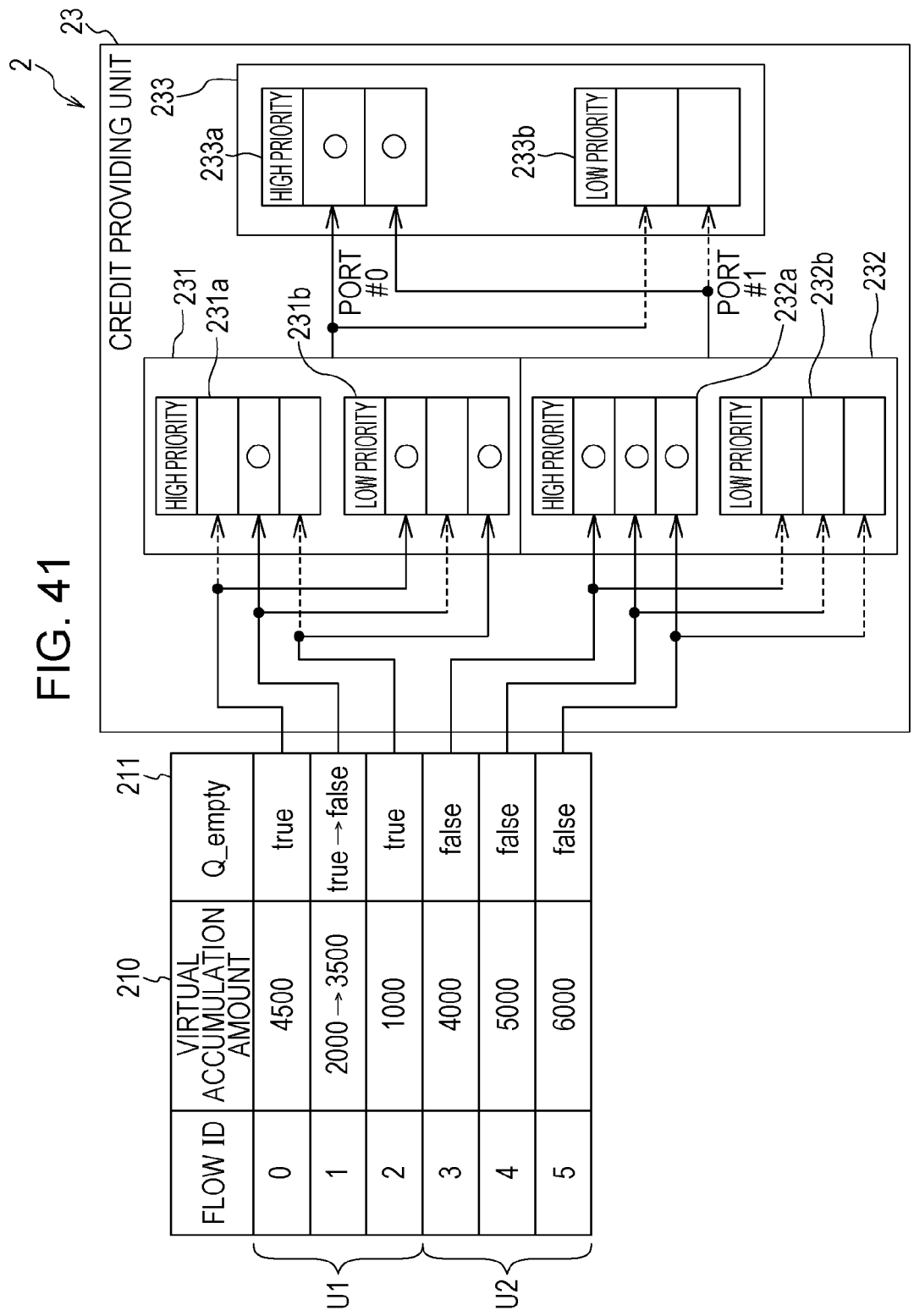
FIG. 41 illustrates an exemplary operation in the sixth embodiment.

Thereafter, as illustrated in FIG. 41, a packet of 1500 (bytes) arrives and is inputted to the low-side queue 11a of the flow #1. The virtual accumulation amount of the flow #1 then becomes 3500 (bytes), and the accumulation amount flag Q_empty of the flow #1 becomes "false". Therefore, the first processor 231 registers the flow #1 into the high priority list 231a.

In addition, since at least one accumulation amount flag Q_empty has become "false" in the first group U1, the third processor 233 registers the port #0, which corresponds to the first group U1, into the high priority list 233a. Thus, the third processor 233 evenly selects between the high-side queues 14a and 14b of the respective ports #0 and #1.

Figure 42:
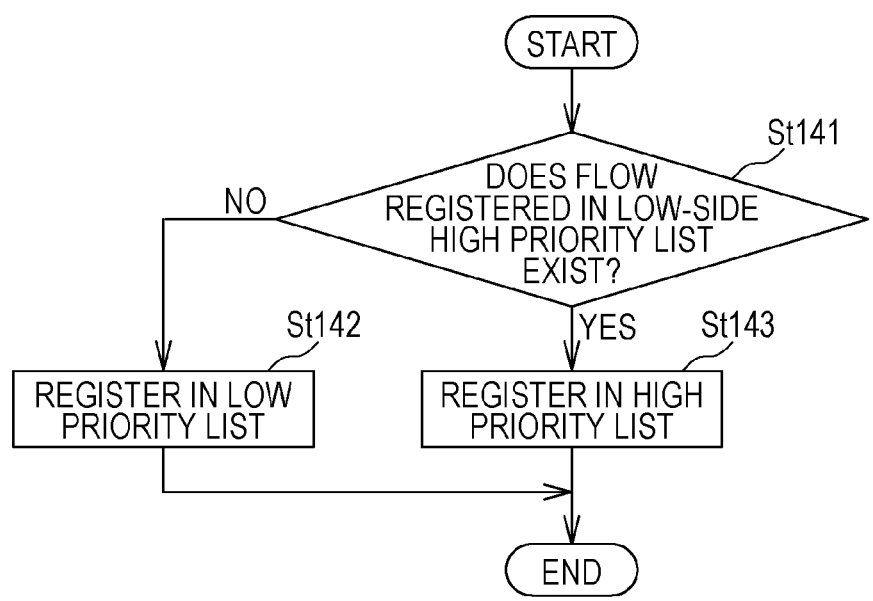
FIG. 42 is a flowchart illustrating an operation of the scheduler in scheduling processing.

FIG. 42 is a flowchart illustrating the operation of the scheduler 2 in the scheduling processing. To be more specific, FIG. 42 illustrates the operation of the third processor 233.

When the registration processing of the low-side high priority lists 231a and 232a or low priority lists 231b and 232b is carried out, the third processor 233 determines whether or not the flows #0 to #5 are registered in the high priority lists 231a and 232a (operation St141). If none of the flows #0 to #5 are registered in the low-side high priority lists 231a and 232a (No in operation St141), the third processor 233 registers the ports #0 and #1 corresponding to the high priority lists 231a and 232a into the low priority list 233b of the third processor 233 (operation St142).

Meanwhile, if at least one of the flows #0 to #5 is registered in the low-side high priority lists 231a and 232a (Yes in operation St141), the third processor 233 registers the port #0 or #1 which corresponds to the one of the high priority lists 231a and 232a into the high priority list 233a of the third processor 233 (operation St143). The scheduler 2 operates as described above in the scheduling processing.

In this manner, in the sixth embodiment, the scheduler 2 selects one of the high-side queues 14a and 14b in accordance with the order that is based on the high-sigh priority of each of the high-side queues 14a and 14b. The scheduler 2 then provides credits to one of the low-side queues 11a and 11b which corresponds to the selected one of the high-side queues 14a and 14b. In addition, when the accumulation amounts of all of the low-side queues 11a or 11b included in either of the first group U1 and the second group U2 become 0, the scheduler 2 lowers the high-side priority of one of the high-side queues 14a and 14b which corresponds to the first group U1 or the second group U2.

Thus, the scheduler 2 can give a lower priority in selecting one of the high-side queues 14a and 14b which corresponds to the group U1 or U2 of which the accumulation amounts of all of the low-side queues 11a or 11b have become 0 and thus can give a lower priority in providing credits to the corresponding low-side queue 11a or 11b.

As described thus far, the communication device according to the embodiments includes the plurality of queues 11 that accumulate packets, the scheduler 2, the read processor 12, and the accumulation amount counter 130. The scheduler 2 provides credits (permissible readout amount) to the plurality of queues 11 in accordance with the order that is based on the priority of each of the queues 11.

The read processor 12 reads out a packet from the plurality of queues 11 while consuming the credits. The accumulation amount counter 130 counts the amount of accumulated packets in the plurality of queues 11 for each of the queues 11.

The accumulation amount counter 130 notifies the scheduler 2 of a change in the accumulation amount. The scheduler 2 then adjusts the priority of, among the plurality of queues 11, a queue 11 of which the accumulation amount has changed, in response to the notification from the accumulation amount counter 130.

In this manner, upon being notified of the change in the accumulation amount from the accumulation amount counter 130, the scheduler 2 adjusts the priority of the queue 11 of which the accumulation amount has changed, and thus the order in which credits are provided to the corresponding queue 11 is adjusted in accordance with the change in the accumulation amount thereof. The read processor 12 consumes credits when reading out a packet from the plurality of queues 11, and thus as the order in which credits are provided is adjusted, the wait time until a packet is read out from the queue 11 is also adjusted. Accordingly, the communication device according to the embodiments reduces a packet delay.

In addition, the packet scheduling method according to the embodiments includes the following processes (1) to (3).
(1) Providing credits (permissible readout amount) to the plurality of queues 11 that accumulate packets in accordance with the order that is based on the priority of each of the queues 11.
(2) Reading out a packet from the plurality of queues 11 while consuming the credits.
(3) Adjusting the priority of, among the plurality of queues 11, a queue 11 of which the accumulation amount has changed, in response to the change in the accumulation amount of packets accumulated in the plurality of queues 11.

Thus, according to the packet scheduling method of the embodiments, an effect similar to that of the communication device of the embodiments can be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A communication device, comprising:
    a plurality of queues each configured to accumulate one or more packets;
    a scheduler configured to provide a permissible readout amount to each of the plurality of queues in accordance with an order that is based on a priority of each queue;
    a read processor configured to read out the one or more packets from the plurality of queues, the permissible readout amount being consumed according to an amount of the packets read out; and
    an accumulation amount counter configured to count an accumulation amount of the packets accumulated in each of the plurality of queues,
    wherein the scheduler includes a virtual accumulation amount counter configured to count a virtual accumulation amount of each of the plurality of queues, the virtual accumulation amount corresponding to an amount calculated virtually when credits are provided to a queue, wherein the accumulation amount counter notifies the scheduler of a change in the accumulation amount, wherein the scheduler adjusts the priority of, among the plurality of queues, the queue of which the accumulation amount has changed, in response to the notification from the accumulation amount counter and a change in the virtual accumulation amount, and wherein the scheduler is configured to provide the permissible readout amount to each of the plurality of queues so that the virtual accumulation amount of each queue obtained by subtracting the permissible readout amount provided to the plurality of queues from the accumulation amount becomes 0, and subtract an absolute value of the permissible readout amount from the virtual accumulation amount upon being notified of the permissible readout amount from the permissible readout amount counter so as to cancel each other out.

* * * * *